United States Patent
Park et al.

(10) Patent No.: US 12,250,530 B2
(45) Date of Patent: Mar. 11, 2025

(54) PORTABLE PLAYBACK DEVICES WITH NETWORK OPERATION MODES

(71) Applicant: Sonos, Inc., Santa Barbara, CA (US)

(72) Inventors: Sangah Park, Somerville, MA (US); Ryan Myers, Santa Barbara, CA (US); John Tolomei, Renton, WA (US)

(73) Assignee: Sonos, Inc., Goleta, CA (US)

( * ) Notice: Subject to any disclaimer, the term of this patent is extended or adjusted under 35 U.S.C. 154(b) by 0 days.

(21) Appl. No.: 17/931,164

(22) Filed: Sep. 12, 2022

(65) Prior Publication Data

US 2023/0082116 A1 Mar. 16, 2023

Related U.S. Application Data

(63) Continuation of application No. 17/174,753, filed on Feb. 12, 2021, now Pat. No. 11,445,301.

(60) Provisional application No. 62/975,472, filed on Feb. 12, 2020.

(51) Int. Cl.
| | |
|---|---|
| H04R 5/04 | (2006.01) |
| G10L 15/08 | (2006.01) |
| G10L 15/22 | (2006.01) |
| H04R 1/02 | (2006.01) |
| H04R 3/00 | (2006.01) |

(52) U.S. Cl.
CPC ............ *H04R 5/04* (2013.01); *G10L 15/083* (2013.01); *G10L 15/22* (2013.01); *H04R 1/025* (2013.01); *H04R 3/005* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | Dilorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |

(Continued)

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

Audio Tron Quick Start Guide, Version 1.0, Mar. 2001, 24 pages.
Audio Tron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.

(Continued)

*Primary Examiner* — Paul W Huber
(74) *Attorney, Agent, or Firm* — Akerman LLP

(57) ABSTRACT

Examples described herein relate to portable playback devices, such as smart headphones and earbuds, and ultra-portable devices having built-in voice assistants. Some example techniques relate to user interaction with voice assistants. Further example techniques relate to voice guidance played back by the headphones to guide the user under certain conditions.

20 Claims, 52 Drawing Sheets

(56) References Cited

U.S. PATENT DOCUMENTS

| | | |
|---|---|---|
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington |
| 8,483,853 B1 | 7/2013 | Lambourne |
| 8,942,252 B2 | 1/2015 | Balassanian et al. |
| 10,714,081 B1* | 7/2020 | Miller .................... G10L 15/08 |
| 11,330,335 B1* | 5/2022 | Loritsch ................. G06F 3/165 |
| 11,651,100 B2* | 5/2023 | Dunjic ............... H04L 65/1096 726/4 |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty, Jr. |
| 2004/0024478 A1 | 2/2004 | Hans et al. |
| 2007/0142944 A1 | 6/2007 | Goldberg et al. |
| 2017/0243587 A1* | 8/2017 | Plagge ............... H04L 12/2803 |
| 2018/0154514 A1* | 6/2018 | Angle .................... G05D 1/021 |
| 2021/0328824 A1 | 10/2021 | Strutt et al. |
| 2021/0409240 A1 | 12/2021 | Li |
| 2022/0013122 A1* | 1/2022 | Nadkar .................. G10L 15/22 |
| 2022/0028397 A1 | 1/2022 | Thomson et al. |
| 2022/0179670 A1* | 6/2022 | Liu ........................ G10L 15/22 |

OTHER PUBLICATIONS

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Notice of Allowance mailed on Apr. 19, 2022, issued in connection with U.S. Appl. No. 17/174,753, filed Feb. 12, 2021, 8 pages.

Palm, Inc., "Handbook for the Palm VII Handheld," May 2000, 311 pages.

Presentations at WinHEC 2000, May 2000, 138 pages.

United States Patent and Trademark Office, U.S. Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

* cited by examiner

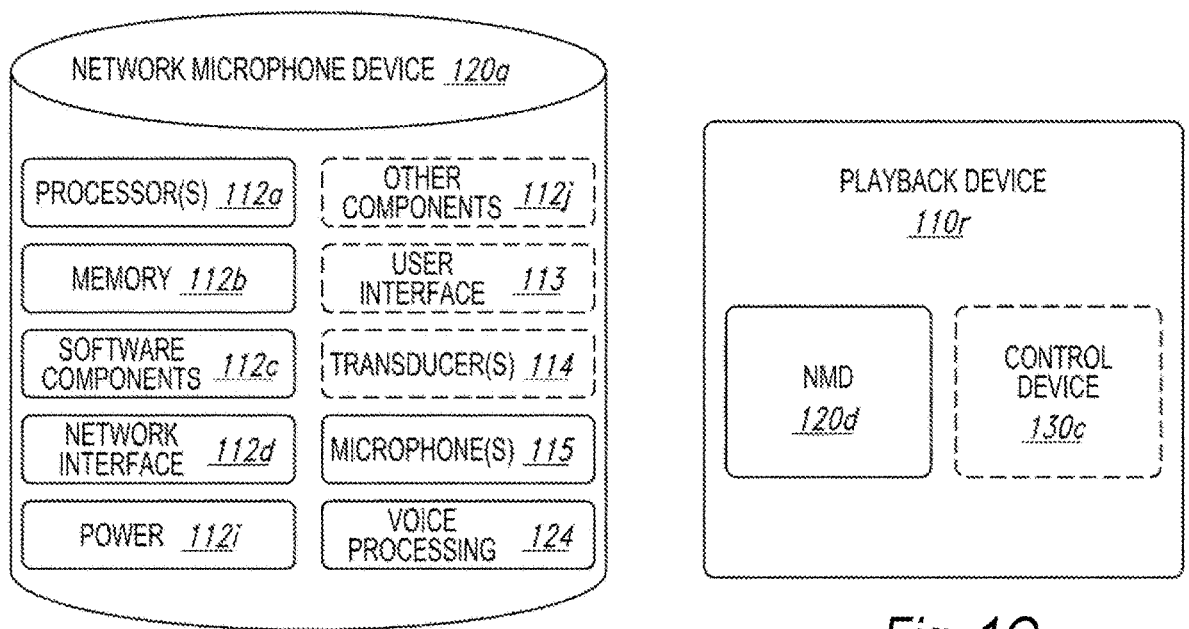
Fig. 1F
Fig. 1G
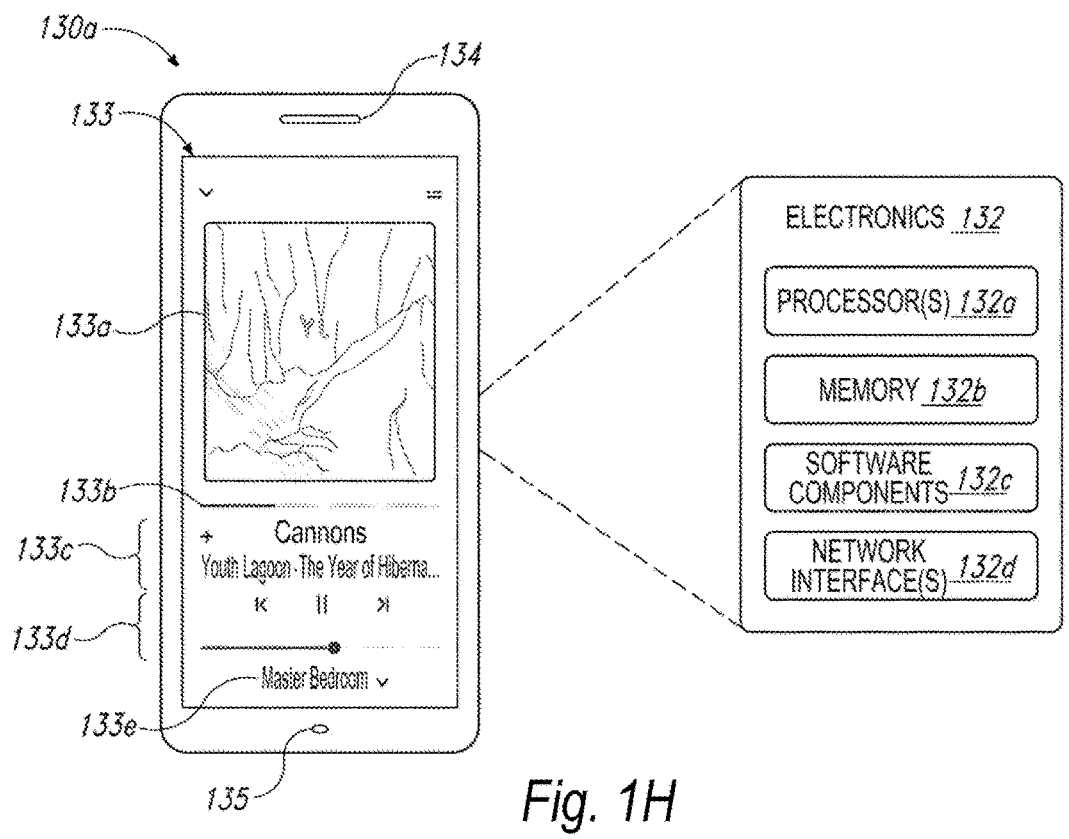
Fig. 1H

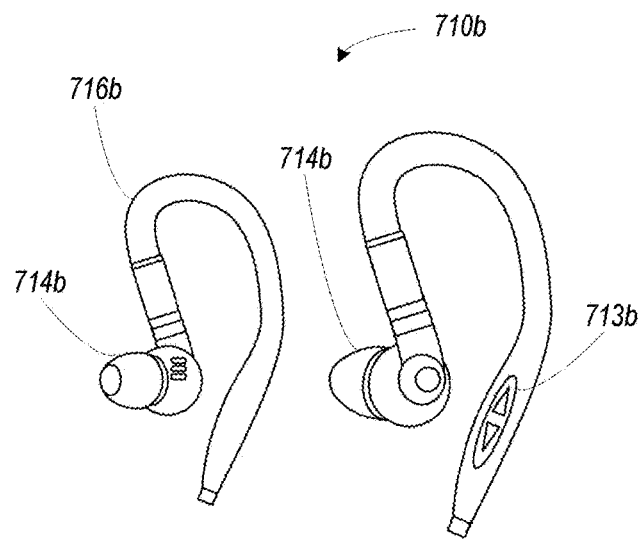
Fig. 7D
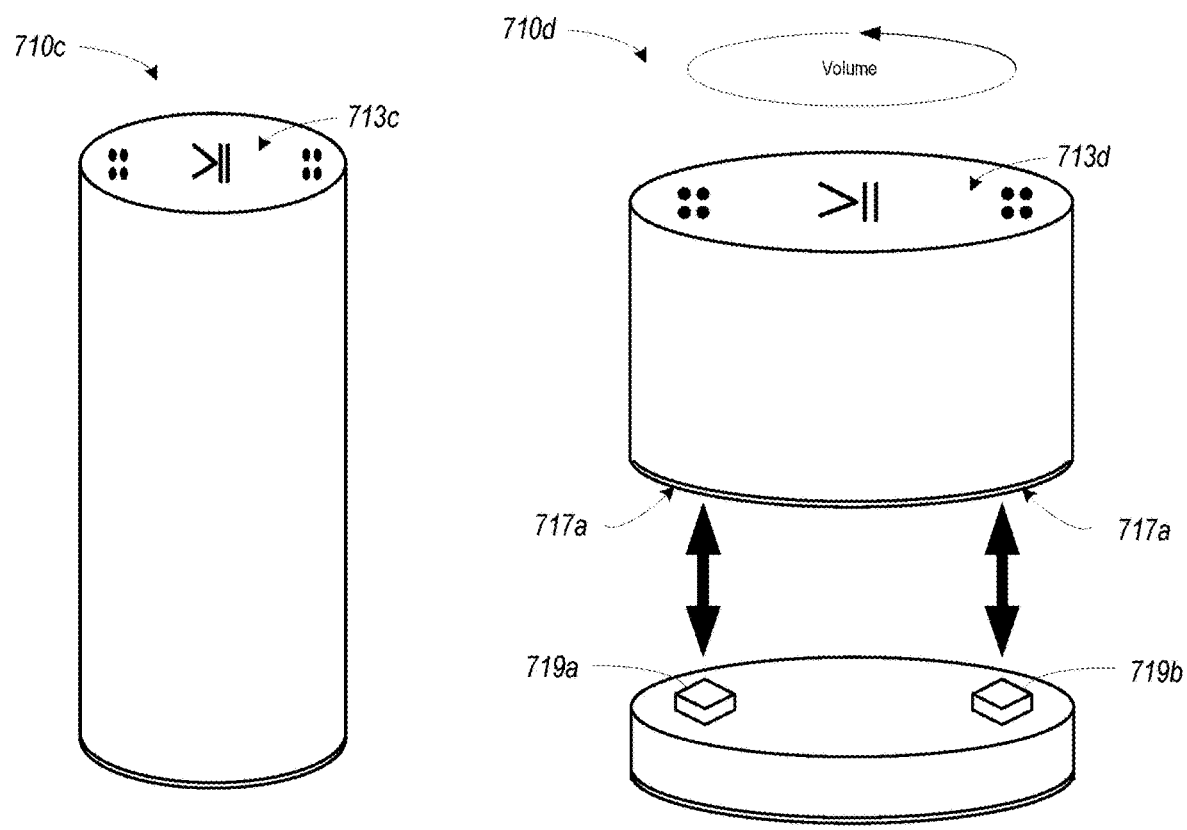
Fig. 7E
Fig. 7F

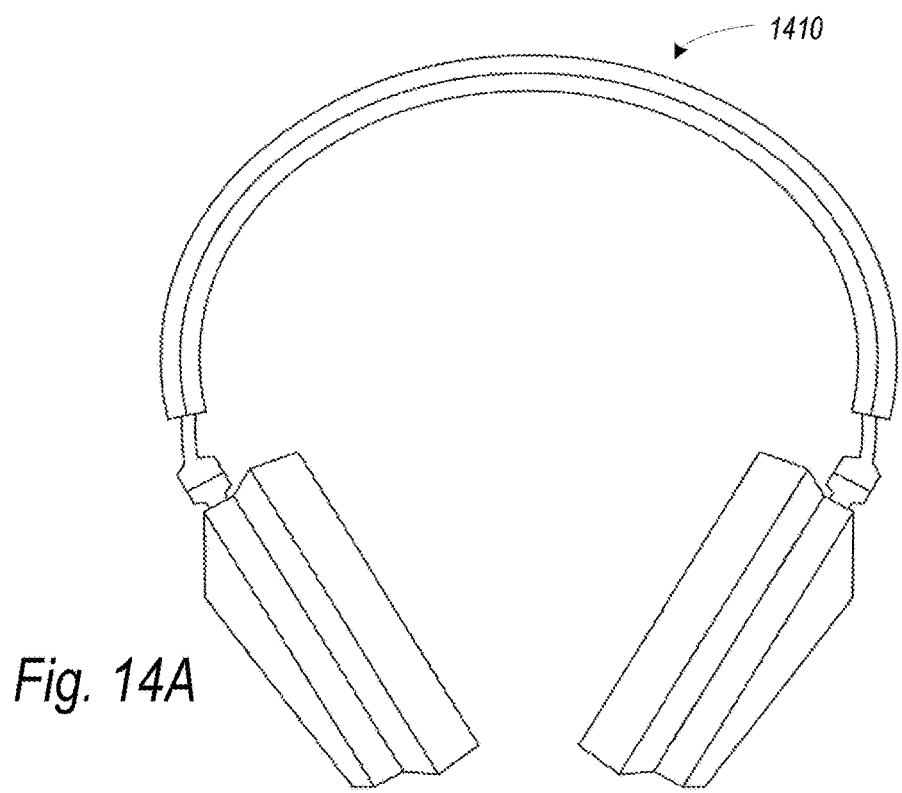
Fig. 14A
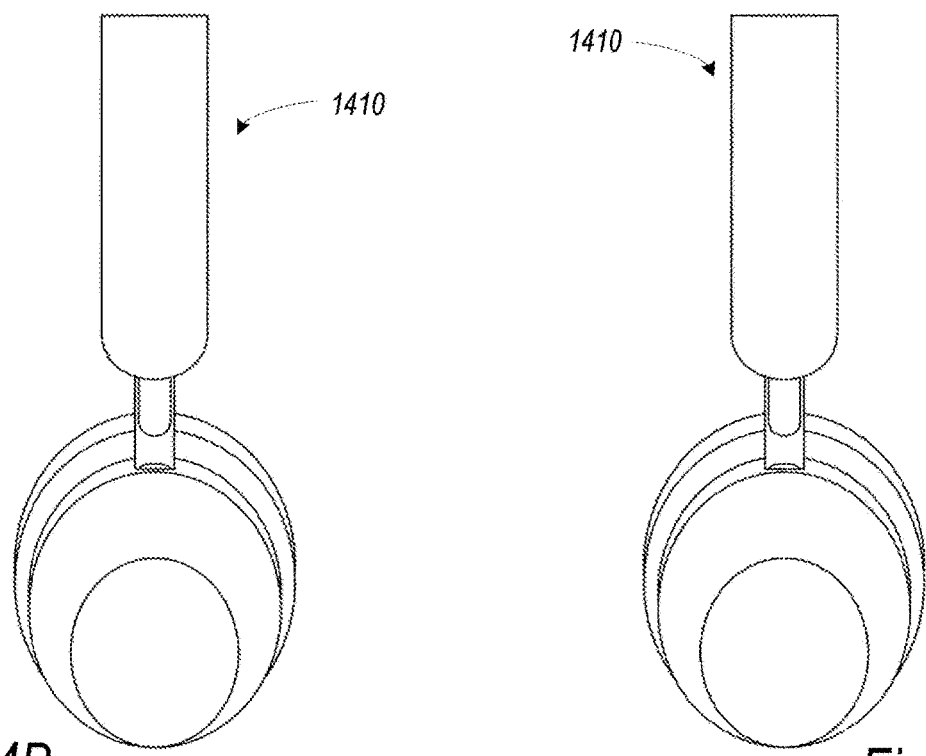
Fig. 14B
Fig. 14C

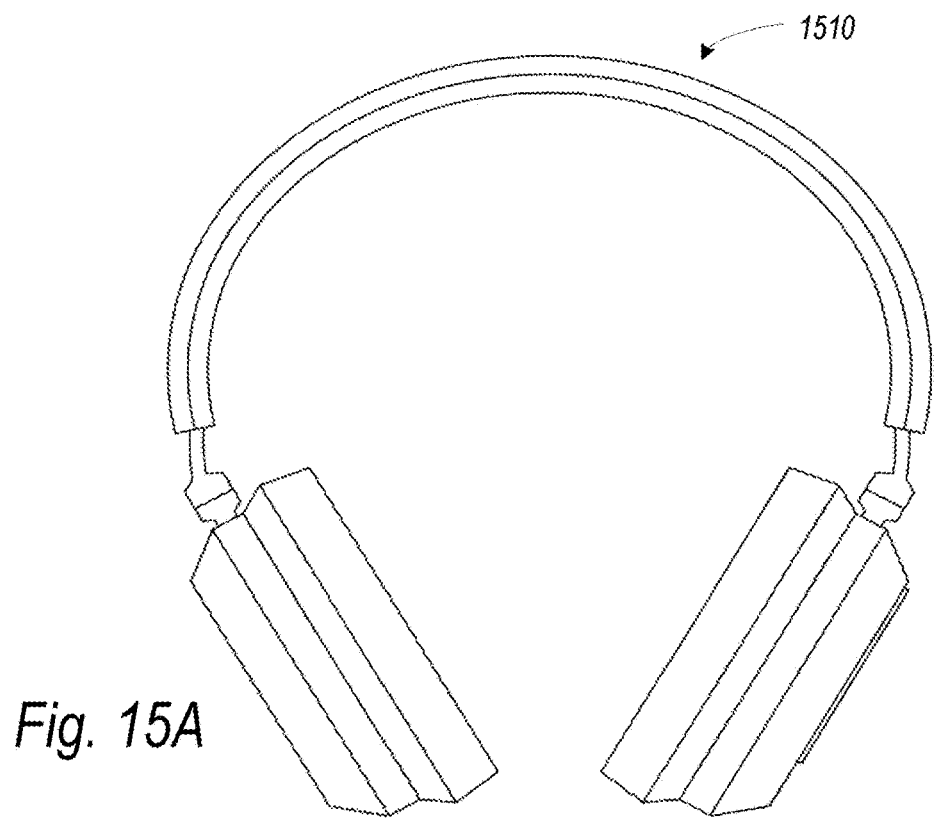
Fig. 15A
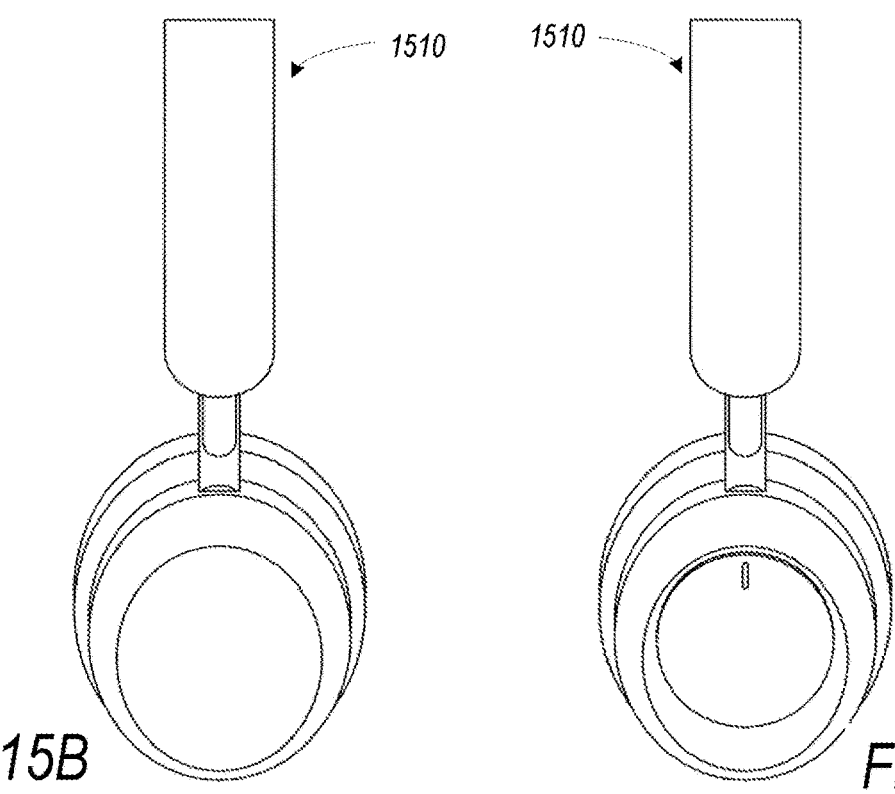
Fig. 15B
Fig. 15C

Headphones Housing UI

Voice Assistant on Headphones

All voice interaction will be on the left ear cup surface.

- It's easy for users to find.
- It's easier than a physical button to hold down.

Headphones Housing UI

Gesture for Built-in VA, End Interaction

On either ear cup to:

- Close the mic if it's open.
- End alarms & announcements (both earcup)
- Cancel TTS (both earcup)

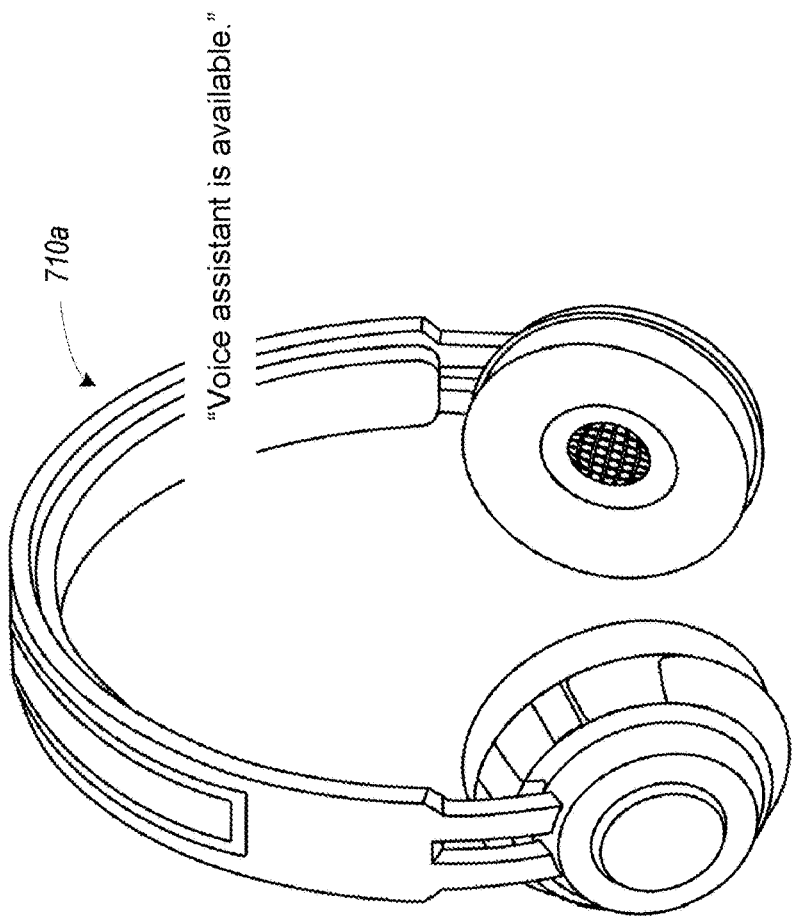

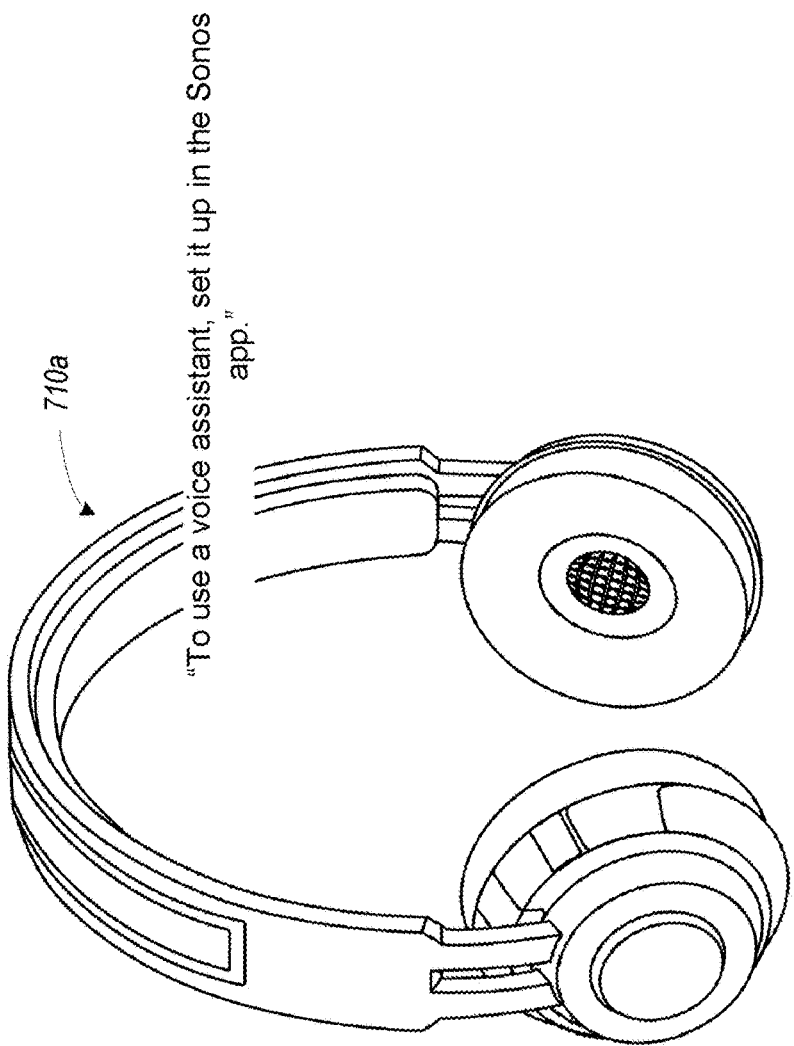

Headphones
Vocal Guidance

Conditions

Trigger: Left earcup surface on HW

Built-in VA setup: Yes

Connectivity: WiFi or WiFi + BT

Other: Taking longer time than expected (need to define "expected time")

Headphones
Vocal Guidance

Conditions
Trigger: Left earcup surface on HW
Built-in VA setup: No
Connectivity: WiFi or WiFi + BT
Other: None

Headphones
Vocal Guidance

Conditions

Trigger: Left earcup surface on HW
Built-in VA setup: No
Connectivity: None
Other: None

PORTABLE PLAYBACK DEVICES WITH NETWORK OPERATION MODES

CROSS REFERENCE TO RELATED APPLICATIONS

This application is a continuation of U.S. application Ser. No. 17/174,753, titled "Portable Playback Devices with Network Operation Modes," filed on Feb. 12, 2021, and U.S. application Ser. No. 17/174,753 claims priority to U.S. Provisional App. No. 62/975,472, titled "Voice Guidance for Wearable Playback Devices," filed on Feb. 12, 2020. The entire contents of U.S. application Ser. No. 17/174,753 and 62/975,472 are incorporated herein by reference.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 7D is a front isometric view of a wearable playback device implemented as earbuds configured in accordance with aspects of the disclosed technology.

FIG. 7E is a front isometric view of an ultra-portable playback device configured in accordance with aspects of the disclosed technology.

FIG. 7F is a front isometric view of an ultra-portable playback device with a device base configured in accordance with aspects of the disclosed technology.

FIG. 12F is an isometric view of the earbud.

FIG. 14A is a front view of headphones configured in accordance with aspects of the disclosed technology.

FIG. 14B is a first side view of the headphones.

FIG. 14C is a second side view of the headphones.

FIG. 15A is a front view of headphones configured in accordance with aspects of the disclosed technology.

FIG. 15B is a first side view of the headphones.

FIG. 15C is a second side view of the headphones.

FIG. 17C is a diagram illustrating example voice guidance corresponding to a second condition of the first model.

FIG. 17E is a diagram illustrating example voice guidance corresponding to a fourth condition of the first model.

Figure 1A:
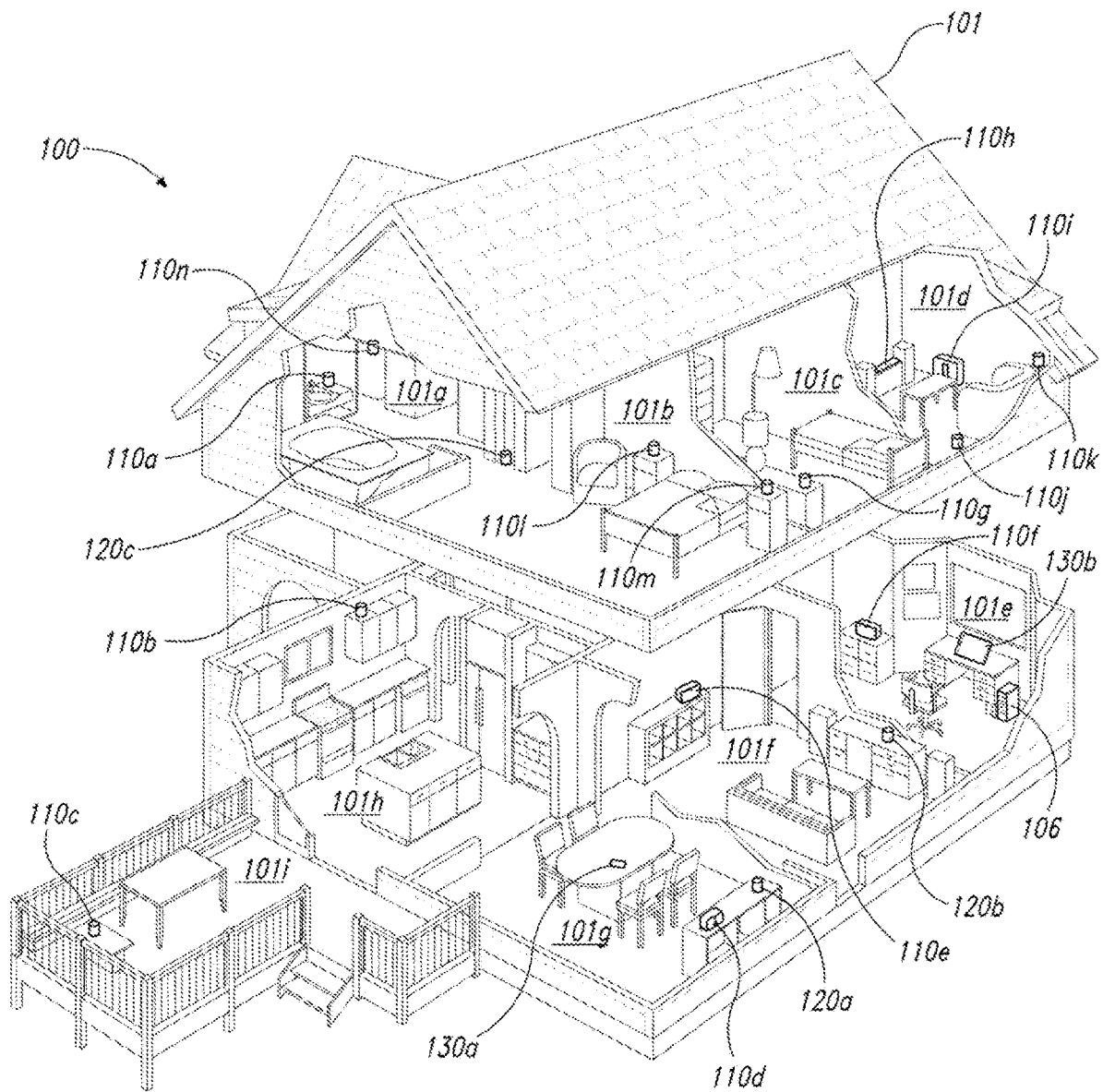
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Examples described herein relate to operations based on connectivity of portable playback devices, such as wearable wireless headphones and earbuds, as well as portable battery-powered speakers. Exemplary portable playback devices may include multiple network interfaces for connection to different types of networks, such as an 802.11-compatible network interface for connection to wireless local area networks (e.g., Wi-Fi® networks) and an 802.15-compatible network interface for connection to a mobile device via a personal area network (Bluetooth®). Depending on the networks available, a portable playback device may establish connections to a wireless local area network (WLAN), a personal area network (PAN), both, or neither. The portable playback device may use such connections for various features such as streaming audio content or interacting with voice assistant services.

In an example, a portable playback device may operate in one of a plurality of connection modes based on the types of connections that are currently established. For instance, the portable playback device may operate in a first connection mode when connected to a WLAN via a first network interface (e.g., an 802.11-compatible network interface) and then switch to operating in a second connection mode when connected to a PAN via a second network interface (e.g., an 802.15-compatible network interface). Further, the portable playback device may operate in a concurrent connection mode when connected to two or more networks concurrently.

During use, the portable playback device may switch among these modes as network connections are established and lost. For instance, while a user is at home, their portable playback device may establish a connection to their home WLAN, which causes the portable playback device to operate in the first connection mode. While "on-the-go," a WLAN might not be available, and so the portable playback device may establish a connection to their mobile device via a PAN, which causes the portable playback device to operate in the second connection mode. In some cases, multiple types of networks are available, and the portable playback device may operate in the concurrent mode while maintaining concurrent connections via the first and second network interfaces.

The example portable playback devices may be configured to detect or otherwise recognize various events (i.e., triggers) and perform an appropriate response to the detected trigger. In example implementations, the particular response performed in response to a given trigger event may change based on the connection mode. That is, a portable playback device may respond differently to a given trigger when in the first connection mode as compared with the second connection mode or the concurrent mode.

One example of a trigger input is an input via an on-device control interface. For usability reasons, it may be beneficial to have a consistent user interface affordance for similar functions in different connection modes. That is, a user should be able to use the same input to pause playback when streaming music over Wi-Fi® as when streaming audio over Bluetooth®, even though the underlying actions taken by the portable playback device to effect a pause may be different in the connection modes.

For instance, as an example trigger event, a user may use a particular gesture on a touch-sensitive control interface to initiate voice assistance. While this particular gesture may consistently trigger voice assistance, the particular voice assistant that is initiated when this gesture is detected may vary based on the connection mode. That is, the same trigger may initiate different voice assistants depending on the connection mode.

In the first connection mode (i.e., when the portable playback device is connected to a WLAN), the trigger to initiate voice assistance initiates a native voice assistant. Example portable playback devices may implement a built-in network microphone device, which allows the portable playback devices to capture and process voice inputs natively, without relying on a connected mobile device. In one example, processing voice inputs natively involves capturing voice data using one or more microphones, buffering and conditioning the voice data, and then transmitting data representing the voice input to one or more servers of a voice assistant to perform natural language understanding (NLU) on the voice input. In some examples, the native voice assistant includes local NLU for processing of certain types of voice inputs, as well as cloud-based NLU for processing of other types of voice inputs.

Conversely, when in the second connection mode (i.e., when the portable playback device is connected to a user's mobile device via a PAN), the trigger to initiate voice assistance instead initiates a voice assistant on the mobile device. In this case, voice data from the one or more microphones is streamed via the PAN to the user's mobile device, which then processes the voice input using the voice assistant on the mobile device. In contrast to the portable playback device, which may lose Internet connectivity when disconnected from a WLAN, the user's mobile device may maintain a connection to the cloud via a cellular (e.g., 4G or 5G) modem, allowing the mobile device to process voice inputs using cloud-based NLU while "on-the-go."

The native voice assistant of the portable playback device and the voice assistant of the mobile device are not necessarily the same. A user may opt to set-up one voice assistant as the native voice assistant on their portable playback device (e.g., Amazon® Alexa®) and another voice assistant on their mobile device (e.g., Google® or Siri®), or vice versa. Further, even if the same voice assistant service is configured on the portable playback device as on the user's mobile device, the portable playback device and the mobile device implement respective instances of the voice assistant, and each function as respective network microphone devices.

In the concurrent connection mode, the portable playback device may have concurrent access to multiple voice assistants. Yet, attempting to use multiple voice assistants concurrently may cause duplicative or interfering responses. As such, the portable playback device may be configured to utilize only one voice assistant (e.g., the native voice assistant) while in the concurrent mode.

Exemplary portable playback devices may use voice guidance to inform users of the system status and connection state. When a portable playback device detects a particular event, the portable playback device plays back a voice guidance message corresponding to the particular event. For instance, if the user attempts to access the voice assistant but there is no connectivity, the portable playback device may play back a voice guidance message notifying the user that they must connect to the Internet to use the voice assistant ("Connect to Wi-Fi to use this voice assistant"). Voice guidance recordings may be particularly useful on smart wearable playback devices, as visual feedback is impractical since wearables are typically not visible to the user while in use (i.e., on the user's head) and further non-voice audio feedback such as chimes or beeps might not be well-suited to the breadth of features of a smart wearable playback device.

In a similar manner to how the connection modes influence how the example portable playback devices function, the connection modes may also influence voice guidance. As noted above, the portable playback device may play back voice guidance messages when certain events are detected, in an effort to guide and/or inform a user of information related to the detected event. The particular voice guidance message may be based on the connection mode.

For instance, at power-on, a portable playback device may play back one or more voice guidance messages representing the status of the portable playback device. These voice guidance messages may include status on connectivity and voice assistant availability. For example, when in the first connection mode, the voice guidance messages may include voice guidance indicating that the portable playback device is connected to Wi-Fi® and that the native voice assistant is available. Conversely, in the second connection mode, the voice guidance messages may include voice guidance indicating that the portable playback device is connected to Bluetooth® and that the voice assistant on the user's mobile device is available.

Further, some portable playback devices may additionally include one or more additional network interfaces or modems, such as a cellular modem (e.g., a 4G or 5G-compatible cellular modem) for connection to the Internet via one or more cellular networks. In such examples, a portable playback device may be operable in one or more additional modes corresponding to the respective connection. While a cellular modem might provide a connection to the Internet, in contrast to a Wi-Fi® connection, the cellular modem might not facilitate connection to other playback devices on a WLAN for features like playback swap or grouping.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

Moreover, some functions are described herein as being performed "based on" or "in response to" another element or function. "Based on" should be understood that one element or function is related to another function or element. "In response to" should be understood that one element or function is a necessary result of another function or element. For the sake of brevity, functions are generally described as being based on another function when a functional link exists; however, such disclosure should be understood as disclosing either type of functional relationship.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 includes one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 110a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-6.

In the illustrated embodiment of FIG. 1A, the environment 101 includes a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E, as well as FIGS. 1-4-1M.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones.

Example synchrony techniques involve a group coordinator providing audio content and timing information to one or more group members to facilitate synchronous playback among the group coordinator and the group members. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
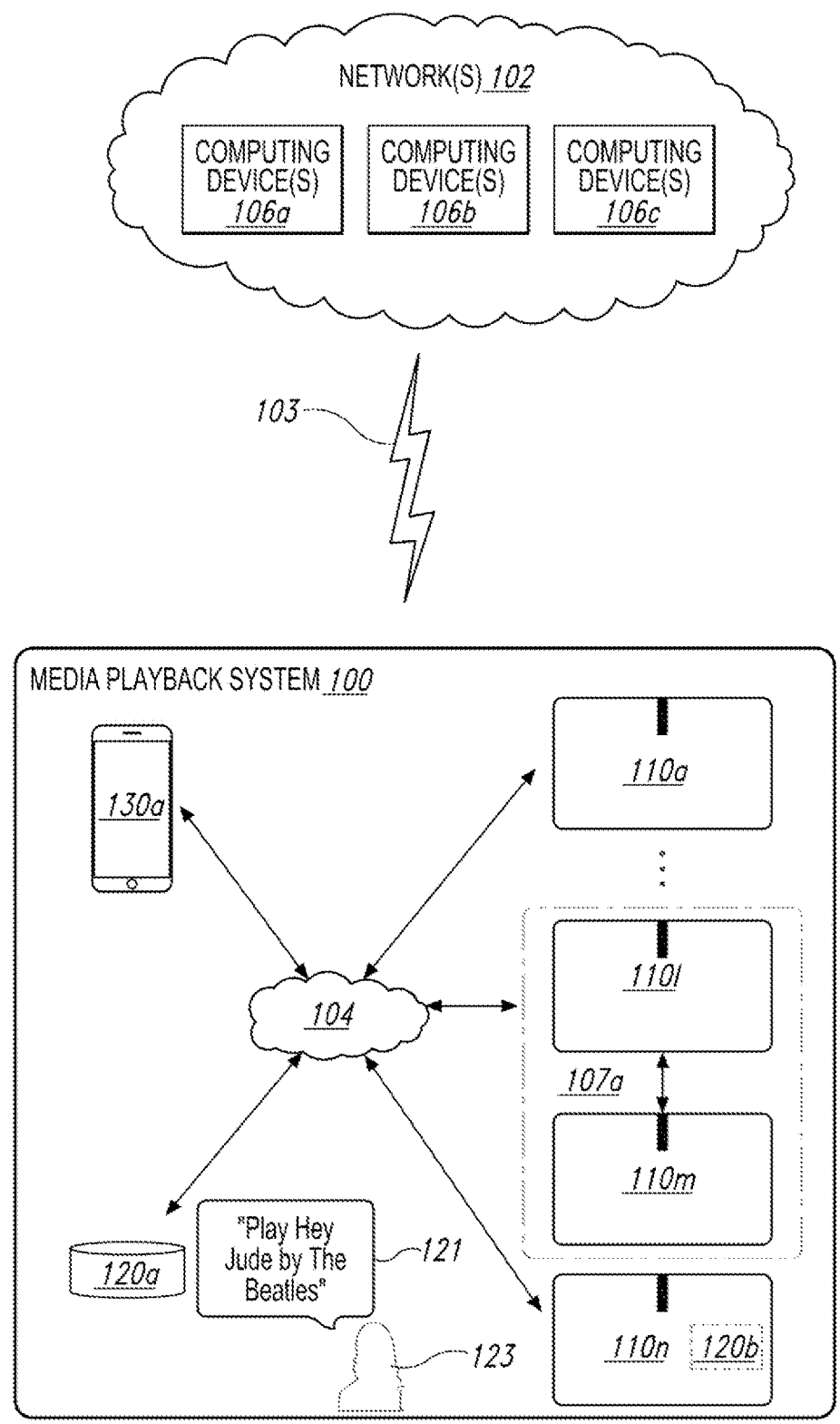
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 includes computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 includes a plurality of cloud networks comprising communicatively coupled computing devices. Furthermore, while the cloud network 102 is shown in FIG. 1B as having three of the computing devices 106, in some embodiments, the cloud network 102 includes fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 includes a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 includes an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110l and 110m comprise a group 107a. The playback devices 110l and 110m can be positioned in different rooms in a household and be grouped together in the group 107a on a temporary or permanent basis based on user input received at the control device 130a and/or another control device 130 in the media playback system 100. When arranged in the group 107a, the playback devices 110l and 110m can be configured to play back the same or similar audio content in synchrony from one or more audio content sources. In certain embodiments, for example, the group 107a includes a bonded zone in which the playback devices 110l and 110m comprise left audio and right audio channels, respectively, of multi-channel audio content, thereby producing or enhancing a stereo effect of the audio content. In some embodiments, the group 107a includes additional playback devices 110. In other embodiments, however, the media playback system 100 omits the group 107a and/or other grouped arrangements of the playback devices 110. Additional details regarding groups and other arrangements of playback devices are described in further detail below with respect to FIGS. 1-I through IM.

The media playback system 100 includes the NMDs 120a and 120d, each comprising one or more microphones configured to receive voice utterances from a user. In the illustrated embodiment of FIG. 1B, the NMD 120a is a standalone device and the NMD 120d is integrated into the playback device 110n. The NMD 120a, for example, is configured to receive voice input 121 from a user 123. In some embodiments, the NMD 120a transmits data associated with the received voice input 121 to a voice assistant service (VAS) configured to (i) process the received voice input data and (ii) transmit a corresponding command to the media playback system 100. In some aspects, for example, the computing device 106c includes one or more modules and/or servers of a VAS (e.g., a VAS operated by one or more of SONOS®, AMAZON®, GOOGLE® APPLE®, MICROSOFT®). The computing device 106c can receive the voice input data from the NMD 120a via the network 104 and the links 103. In response to receiving the voice input data, the computing device 106c processes the voice input data (i.e., "Play Hey Jude by The Beatles"), and determines that the processed voice input includes a command to play a song (e.g., "Hey Jude"). The computing device 106c accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
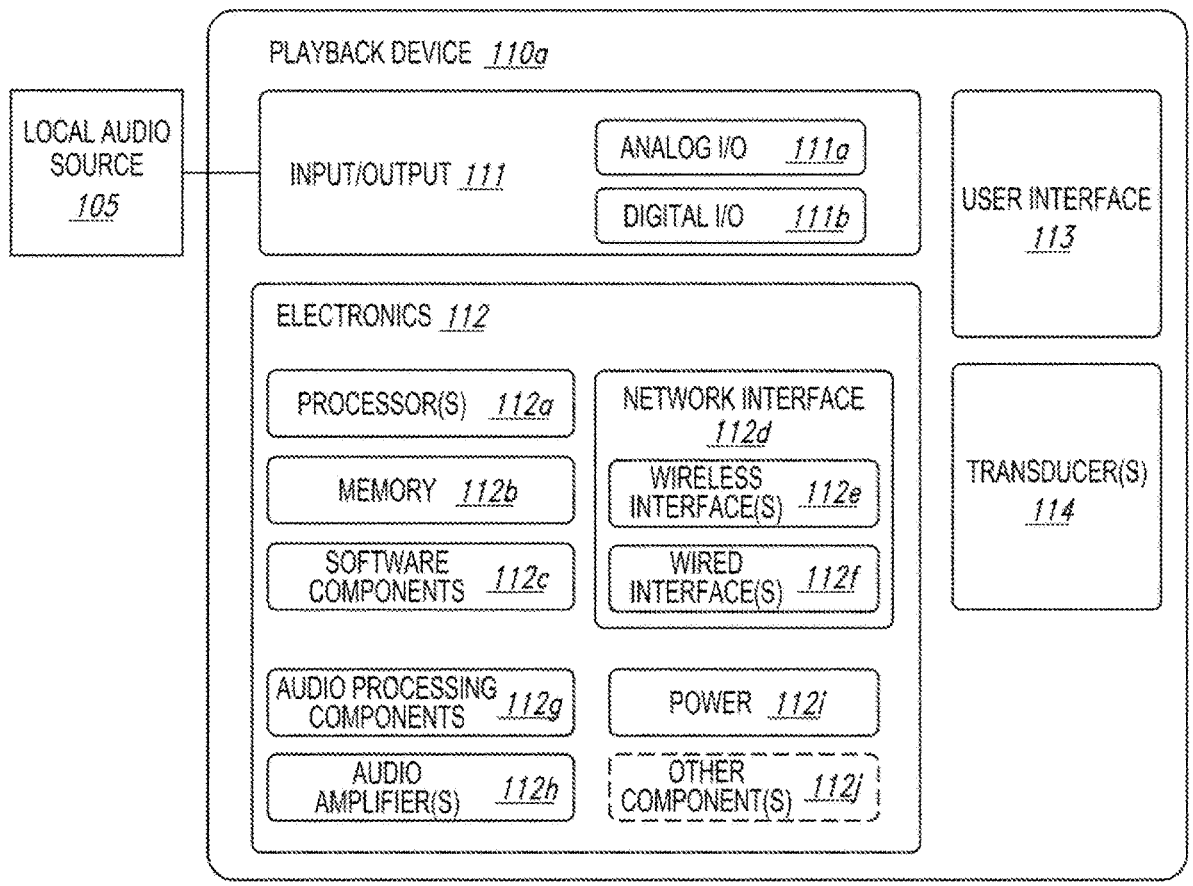
FIG. 1C is a block diagram of a playback device.

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b includes a Sony/Philips Digital Interface Format (S/PDIF) communication interface and/or cable and/or a Toshiba Link (TOSLINK) cable. In some embodiments, the digital I/O 111b includes an High-Definition Multimedia Interface (HDMI) interface and/or cable. In some embodiments, the digital I/O 111b includes one or more wireless communication links comprising, for example, a radio frequency (RF), infrared, WiFi, Bluetooth, or another suitable communication protocol. In certain embodiments, the analog I/O 111a and the digital 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further includes electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d includes one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
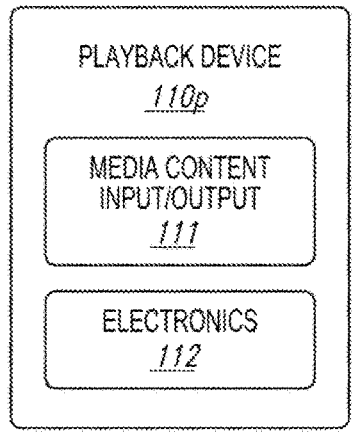
FIG. 1D is a block diagram of a playback device.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skill in the art will appreciate that a playback device is not limited to the examples described herein or to SONOS product offerings. In some embodiments, for example, one or more playback devices 110 includes wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
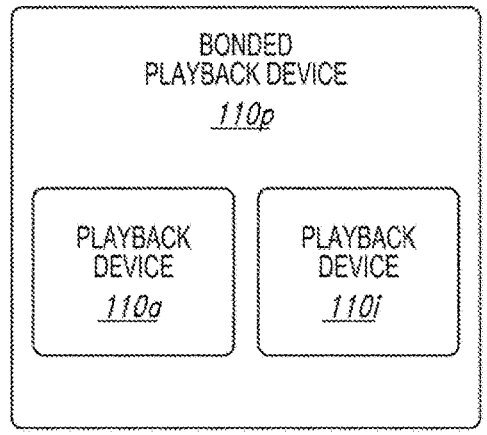
FIG. 1E is a block diagram of a network microphone device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q includes a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device. Additional playback device embodiments are described in further detail below with respect to FIGS. 2A-3D.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally includes other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the amplifiers 114, and/or other playback device components. In certain embodiments, the NMD 120a includes an Internet of Things (IoT) device such as, for example, a thermostat, alarm panel, fire and/or smoke detector, etc. In some embodiments, the NMD 120a includes the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B).

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a includes a smartphone (e.g., an iPhone™, an Android phone) on which media playback system controller application software is installed. In some embodiments, the control device 130a includes, for example, a tablet (e.g., an iPad™), a computer (e.g., a laptop computer, a desktop computer), and/or another suitable device (e.g., a television, an automobile audio head unit, an IoT device). In certain embodiments, the control device 130a includes a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132 is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of the playback devices 100. The network interface 132d can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 includes a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

Figures 1I, 1J:
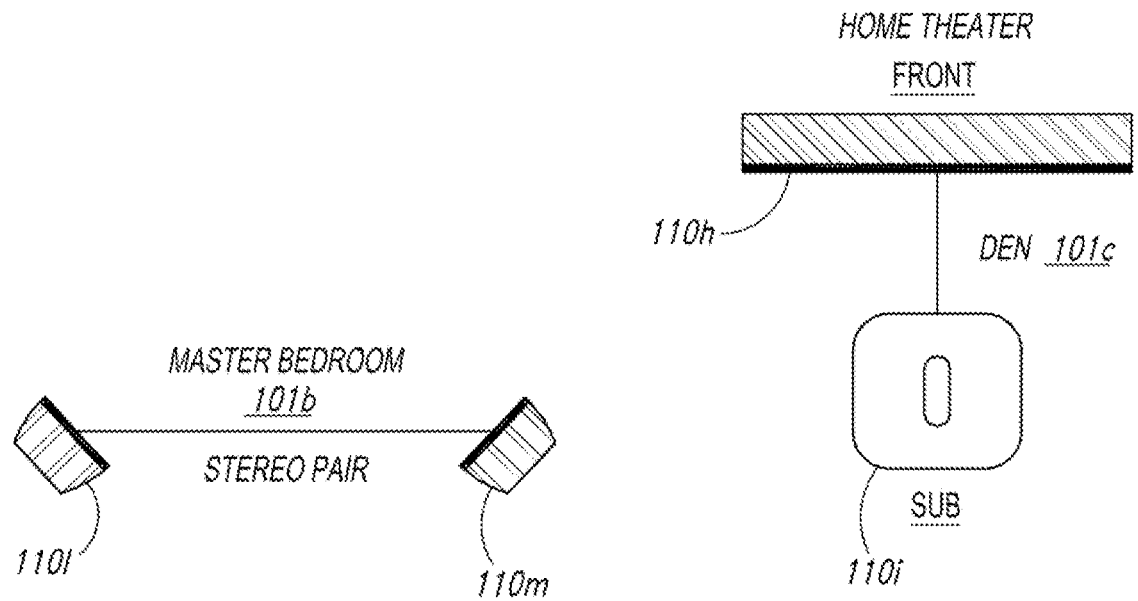
FIG. 1F is a block diagram of a network microphone device.
FIG. 1G is a block diagram of a playback device.
FIG. 1H is a partially schematic diagram of a control device.
FIGS. 1-I, IJ, IK, and 1L are schematic diagrams of corresponding media playback system zones.
FIG. 1M is a schematic diagram of media playback system areas.
Figures 1K, 1L:
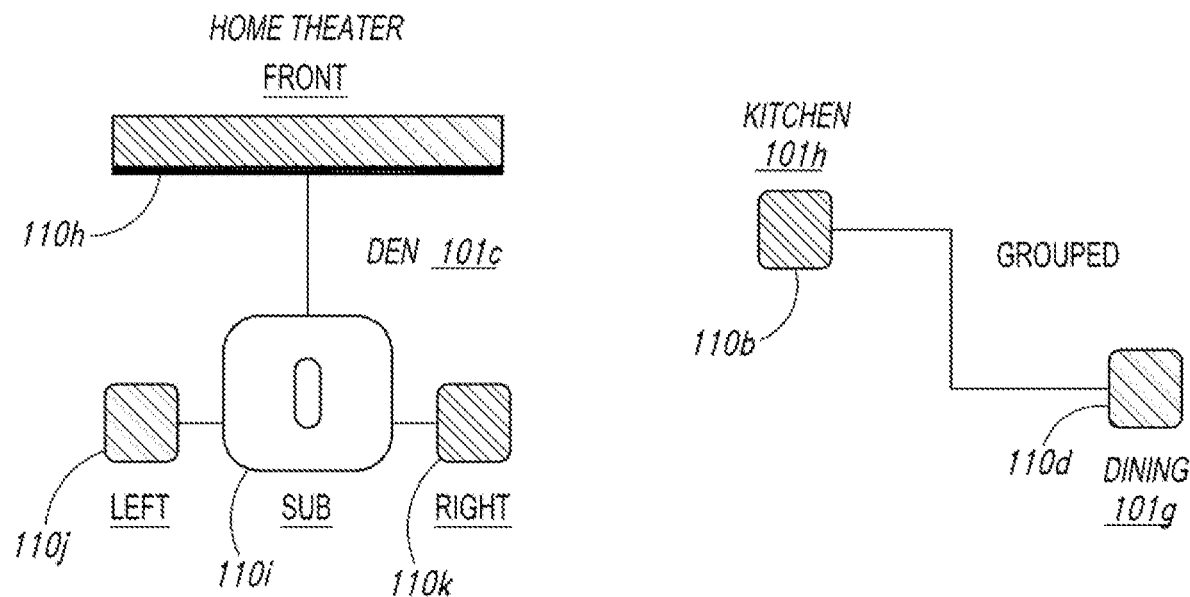
Figure 1M:
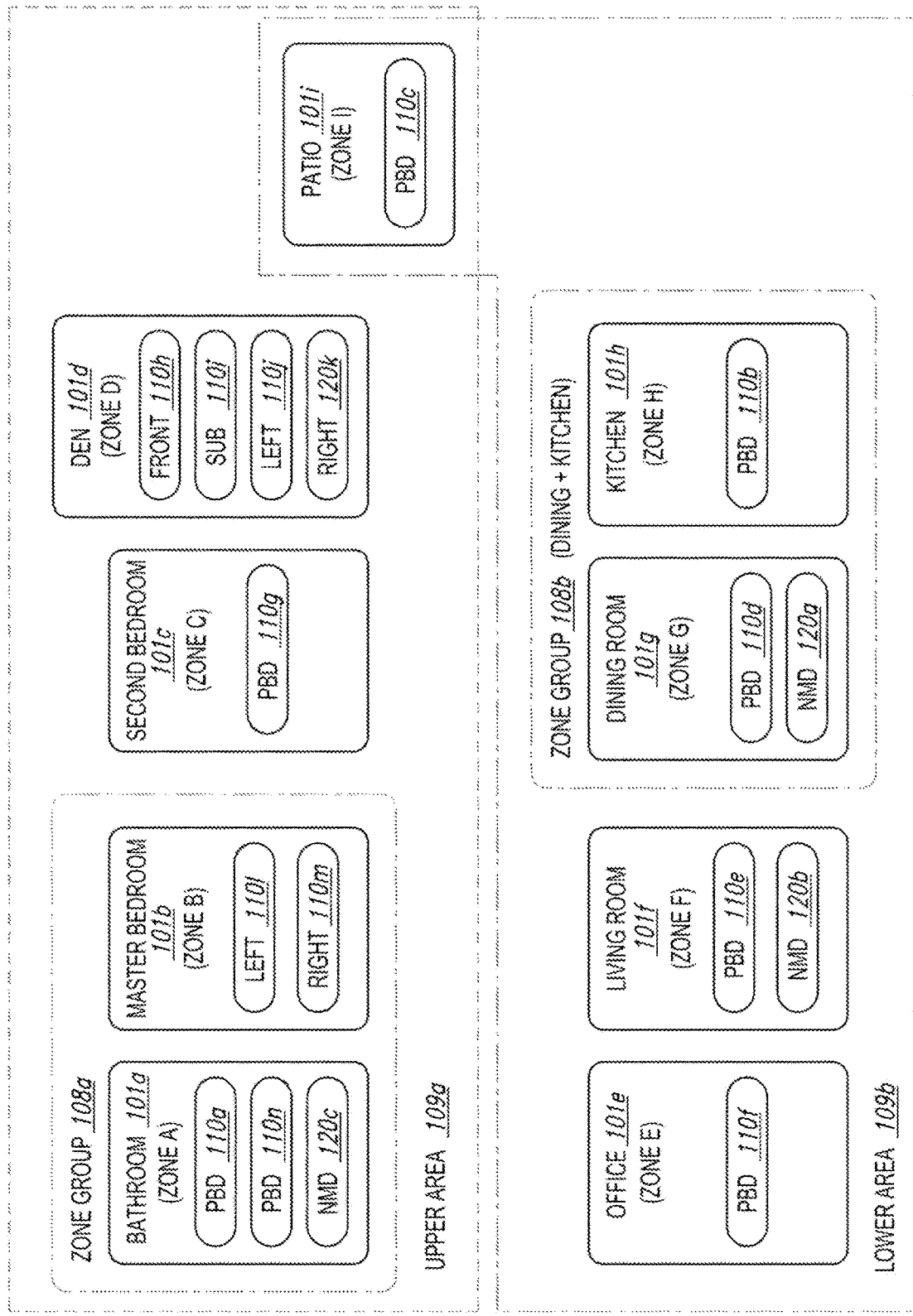

FIGS. 1-1 through 1M show example configurations of playback devices in zones and zone groups. Referring first to FIG. 1M, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110l (e.g., a left playback device) to form Zone A. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback devices 110g and 110h can be be merged to form a merged group or a zone group 108b. The merged playback devices 110g and 110h may not be specifically assigned different playback responsibilities. That is, the merged playback devices 110h and 110i may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110l and 110m may be bonded so as to produce or enhance a stereo effect of audio content. In this example, the playback device 110l may be configured to play a left channel audio component, while the playback device 110k may be configured to play a right channel audio component. In some implementations, such stereo bonding may be referred to as "pairing."

Additionally, bonded playback devices may have additional and/or different respective speaker drivers. As shown in FIG. 1J, the playback device 110h named Front may be bonded with the playback device 110i named SUB. The Front device 110h can be configured to render a range of mid to high frequencies and the SUB device 110i can be configured render low frequencies. When unbonded, however, the Front device 110h can be configured render a full range of frequencies. As another example, FIG. 1K shows the Front and SUB devices 110h and 110i further bonded with Left and Right playback devices 110j and 110k, respectively. In some implementations, the Right and Left devices 110j and 102k can be configured to form surround or "satellite" channels of a home theater system. The bonded playback devices 110h, 110i, 110j, and 110k may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110a and 110n the master bathroom have the single UI entity of Zone A. In one embodiment, the playback devices 110a and 110n may each output the full range of audio content each respective playback devices 110a and 110n are capable of, in synchrony.

In some embodiments, an NMD is bonded or merged with another device so as to form a zone. For example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108a that includes the two zones. Similarly, Zone G may be grouped with Zone H to form the zone group 108b. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can have be assigned a name such as "Dining +Kitchen", as shown in FIG. 1M. In some embodiments, a zone group may be given a unique name selected by a user.

Certain data may be stored in a memory of a playback device (e.g., the memory 112c of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong.

As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining +Kitchen zone group 108b. Other example zone variables and identifiers are described below.

In yet another example, the media playback system 100 may store variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 might not implement Areas, in which case the system may not store variables associated with Areas.

In further examples, the playback devices 110 of the media playback system 100 are named and arranged according to a control hierarchy referred to as home graph. Under the home graph hierarchy, the base unit of the home graph hierarchy is a "Set." A "Set" refers to an individual device or multiple devices that operate together in performing a given function, such as an individual playback device 110 or a bonded zone of playback devices. After Sets, the next level of the hierarchy is a "Room." Under the home graph hierarchy, a "Room" can be considered a container for Sets in a given room of a home. For example, an example Room might correspond to the kitchen of a home, and be assigned the name "Kitchen" and include one or more Sets (e.g. "Kitchen Island"). The next level of the example home graph hierarchy is "Area," which includes two or more Rooms (e.g., "Upstairs" or "Downstairs"). The highest level of the home graph hierarchy is "Home." A Home refers to the entire home, and all of the Sets within. Each level of the home graph hierarchy is assigned a human-readable name, which facilities control via GUI and VUI. Additional details regarding the home graph control hierarchy can be found, for example, in U.S. patent application Ser. No. 16/216,357 entitled, "Home Graph," which is incorporated herein by reference in its entirety.

III. Example Systems and Devices

Figure 2A:
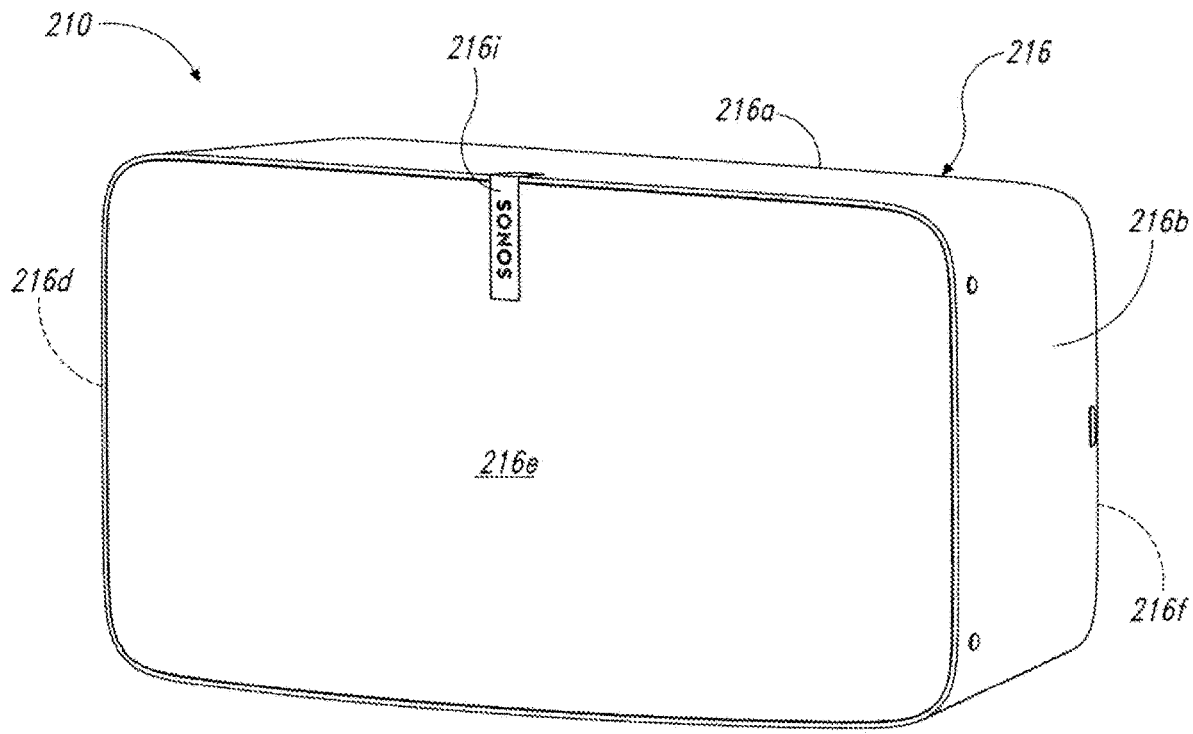
FIG. 2A is a front isometric view of a playback device configured in accordance with aspects of the disclosed technology.
Figure 2B:
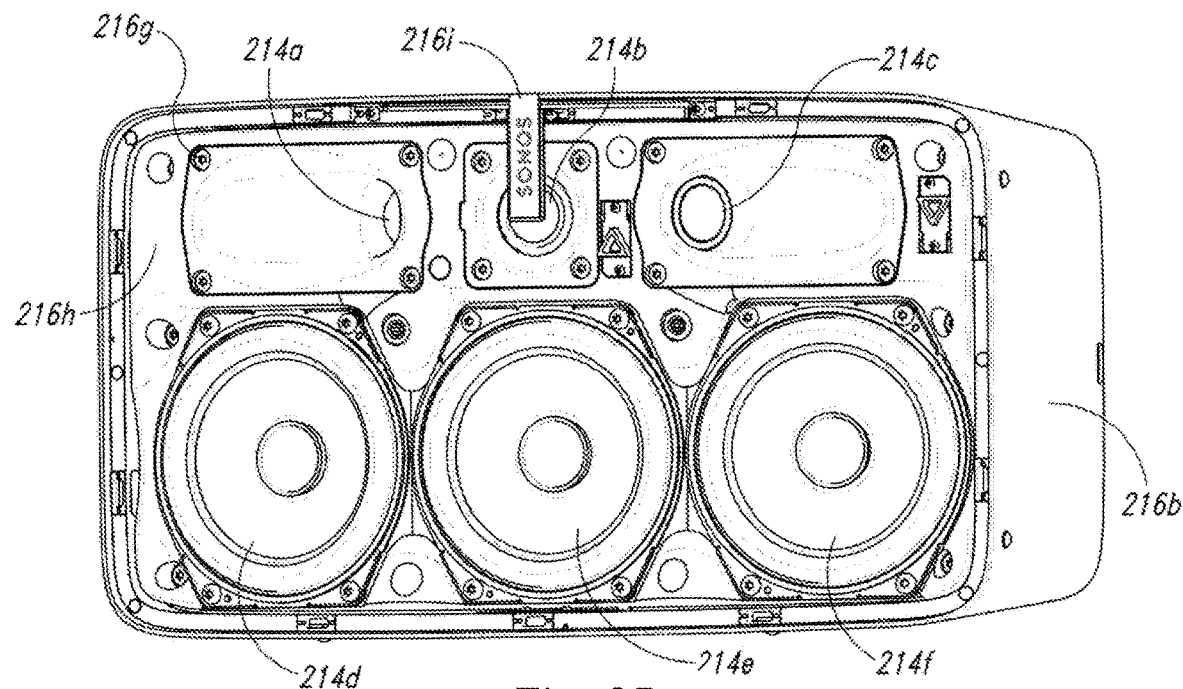
FIG. 2B is a front isometric view of the playback device of FIG. 3A without a grille.
Figure 2C:
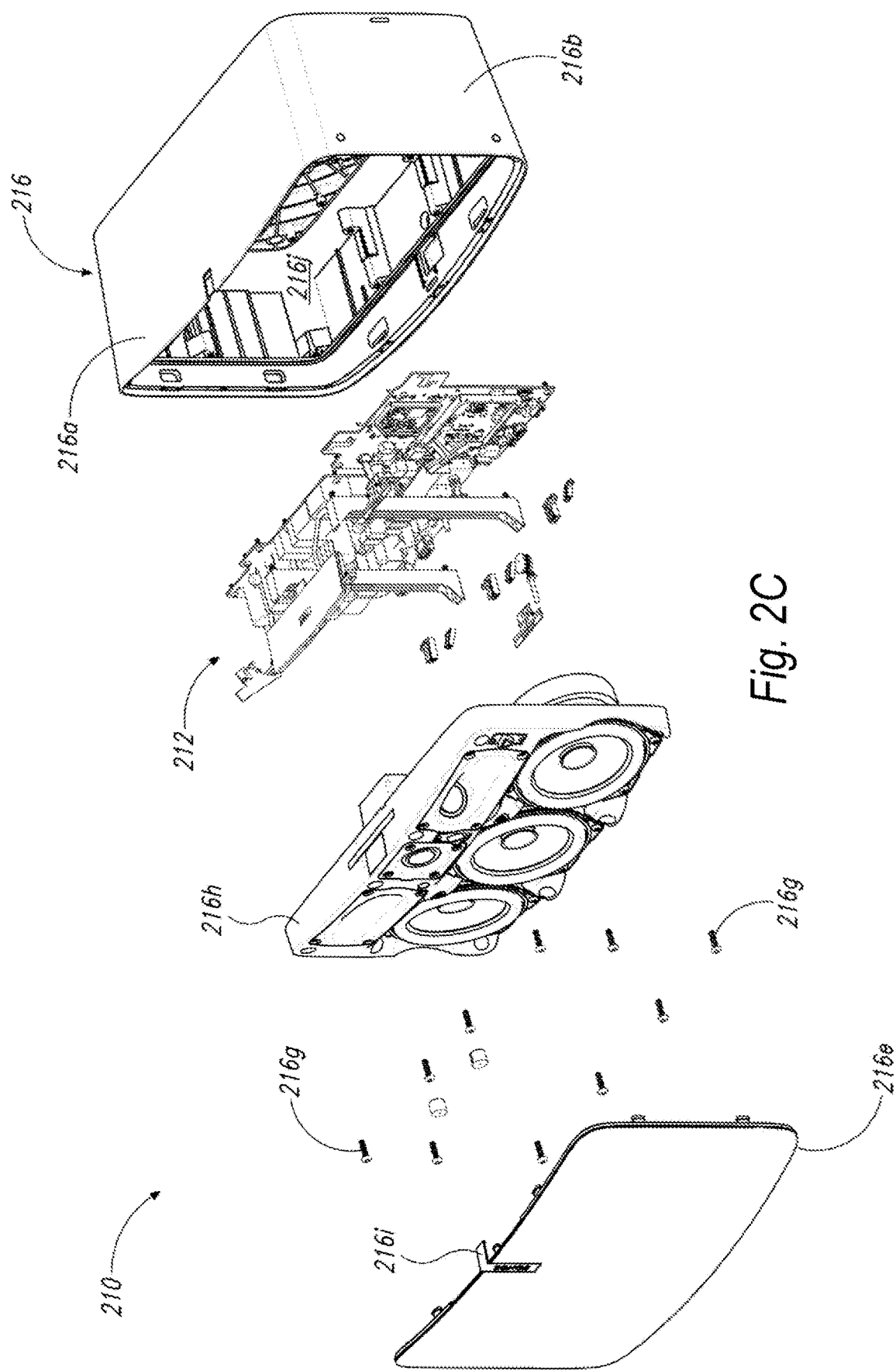
FIG. 2C is an exploded view of the playback device of FIG. 2A.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 includes a housing 216 that includes an upper portion 216a, a right or first side portion 216b, a lower portion 216c, a left or second side portion 216d, the grille 216e, and a rear portion 216f A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C. For example, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some embodiments, however, the playback device 210 omits the filter 216i. In other embodiments, the playback device 210 includes one or more additional filters aligned with the transducers 214b and/or at least another of the transducers 214.

Figure 3A:
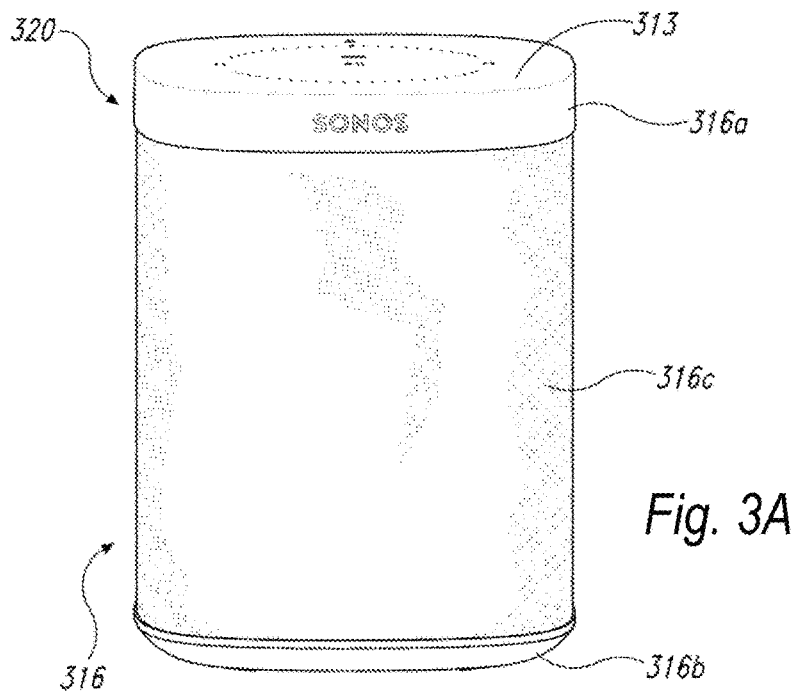
FIG. 3A is a front view of a network microphone device configured in accordance with aspects of the disclosed technology.
Figure 3B:
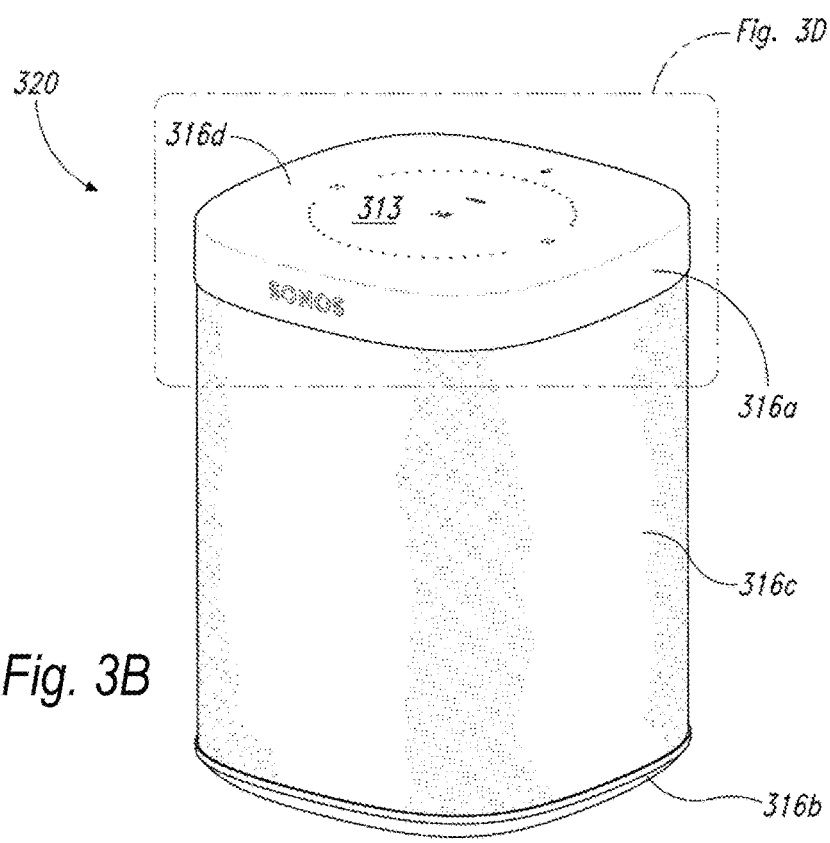
FIG. 3B is a side isometric view of the network microphone device of FIG. 3A.
Figure 3C:
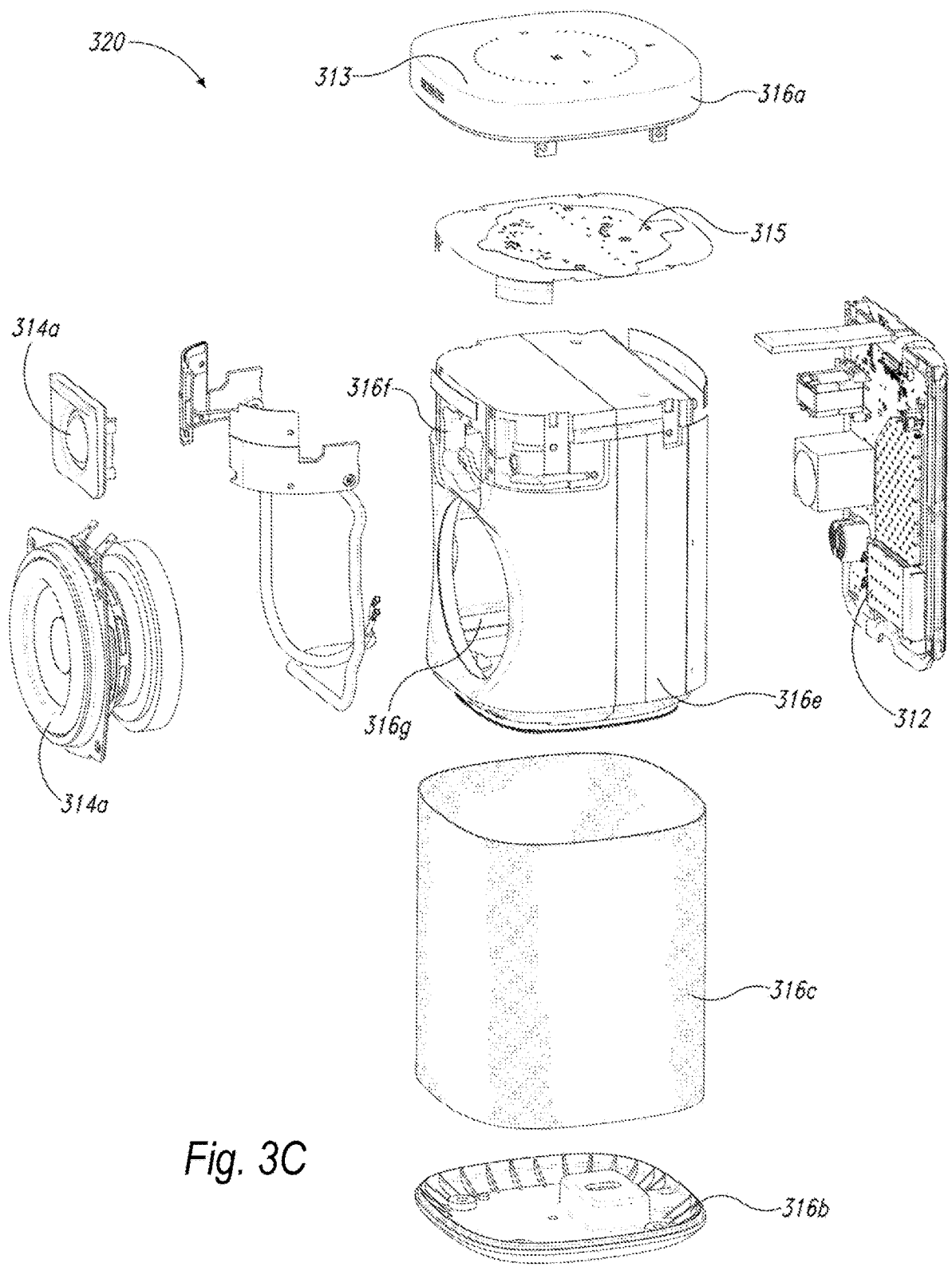
FIG. 3C is an exploded view of the network microphone device of FIGS. 3A and 3B.
Figure 3D:
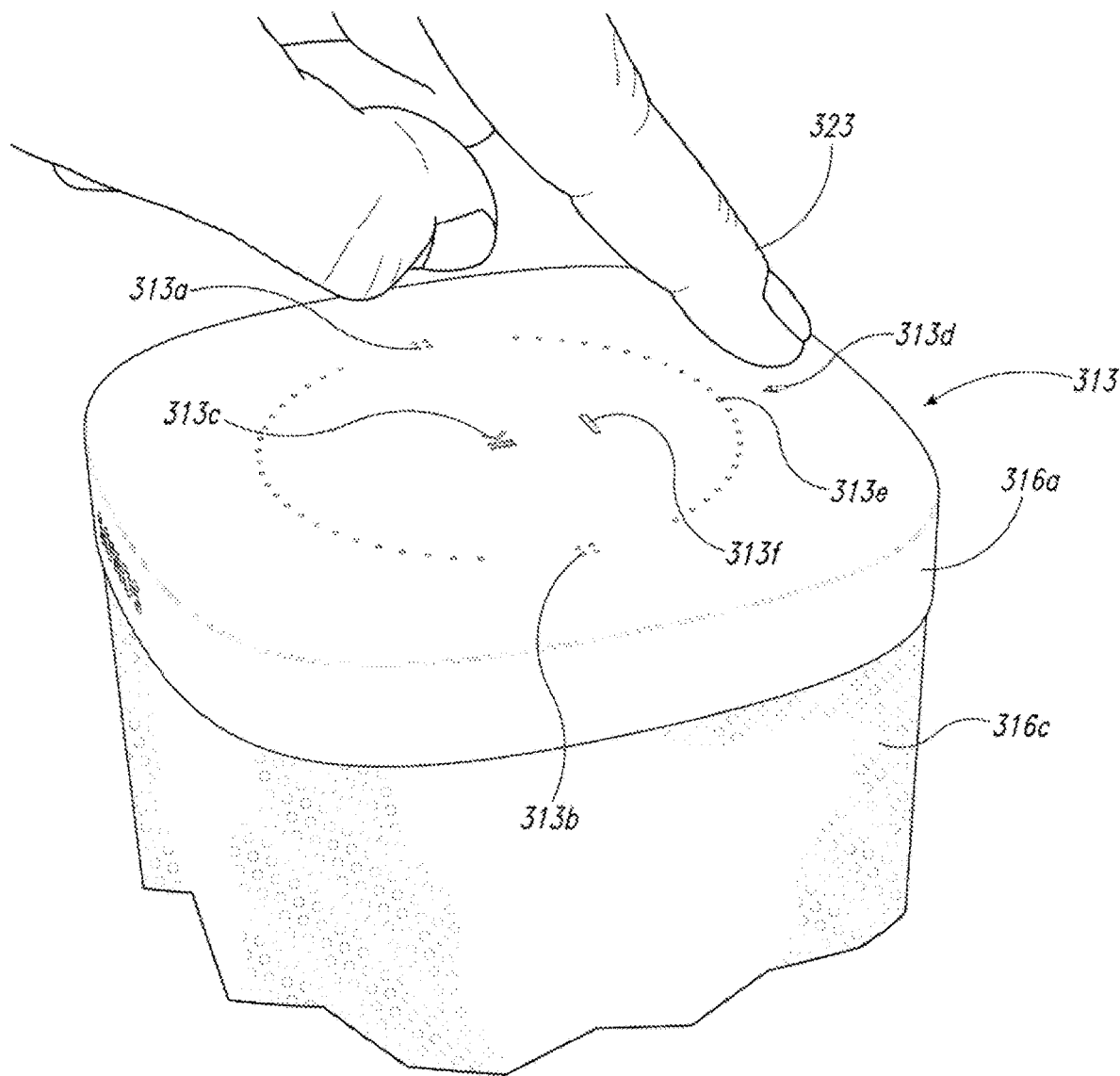
FIG. 3D is an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316a, a lower portion 316b and an intermediate portion 316c (e.g., a grille). A plurality of ports, holes or apertures 316d in the upper portion 316a allow sound to pass through to one or more microphones 315 (FIG. 3C) positioned within the housing 316. The one or more microphones 316 are configured to received sound via the apertures 316d and produce electrical signals based on the received sound. In the illustrated embodiment, a frame 316e (FIG. 3C) of the housing 316 surrounds cavities 316f and 316g configured to house, respectively, a first transducer 314a (e.g., a tweeter) and a second transducer 314b (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314a and 314b altogether.

Electronics 312 (FIG. 3C) includes components configured to drive the transducers 314a and 314b, and further configured to analyze audio data corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112a, the memory 112b, the software components 112c, the network interface 112d, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313a (e.g., a previous control), a second control surface 313b (e.g., a next control), and a third control surface 313c (e.g., a play and/or pause control). A fourth control surface 313d is configured to receive touch input corresponding to activation and deactivation of the one or microphones 315. A first indicator 313e (e.g., one or more light emitting diodes (LEDs) or another suitable illuminator) can be configured to illuminate only when the one or more microphones 315 are activated. A second indicator 313f (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313e, omitting the second indicator 313f. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figure 4A:
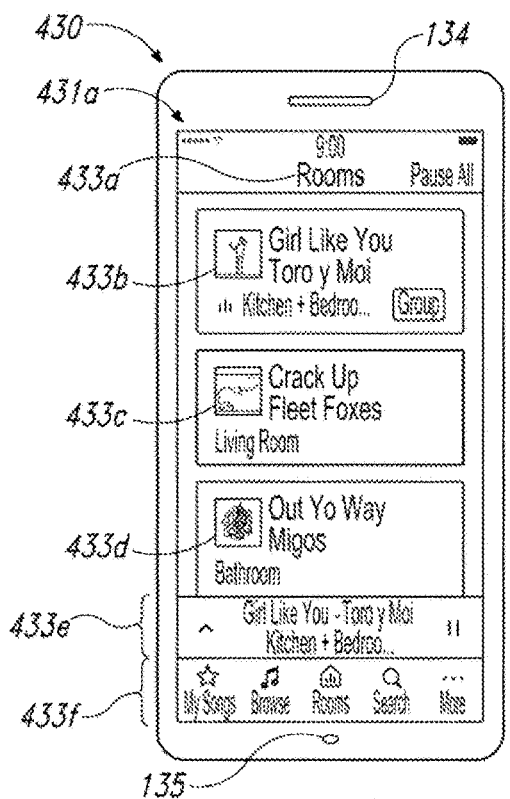
FIGS. 4A, 4B, 4C, and 4D are schematic diagrams of a control device in various stages of operation in accordance with aspects of the disclosed technology.
Figure 4B:
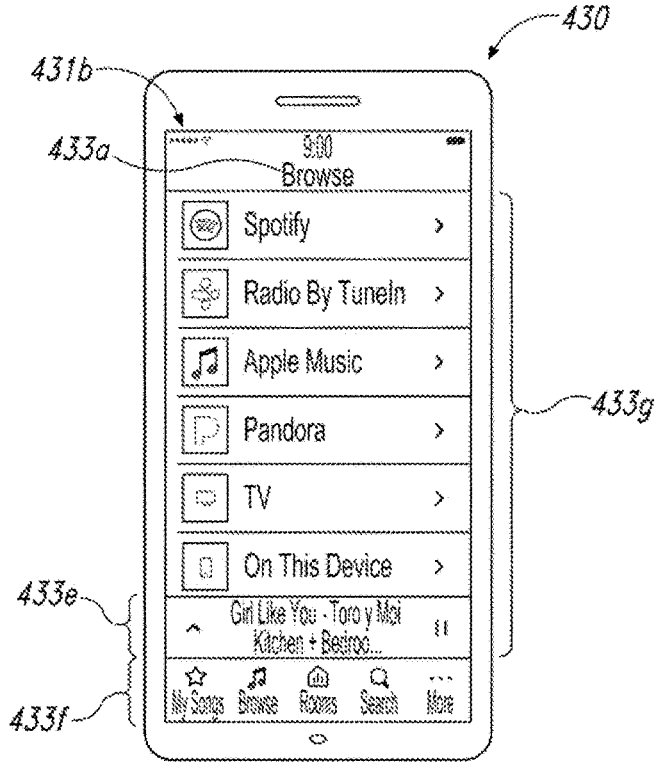
Figure 4C:
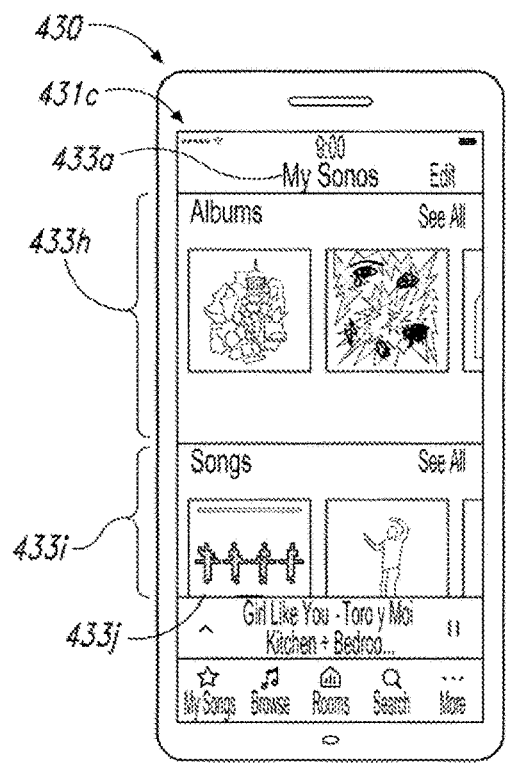
Figure 4D:
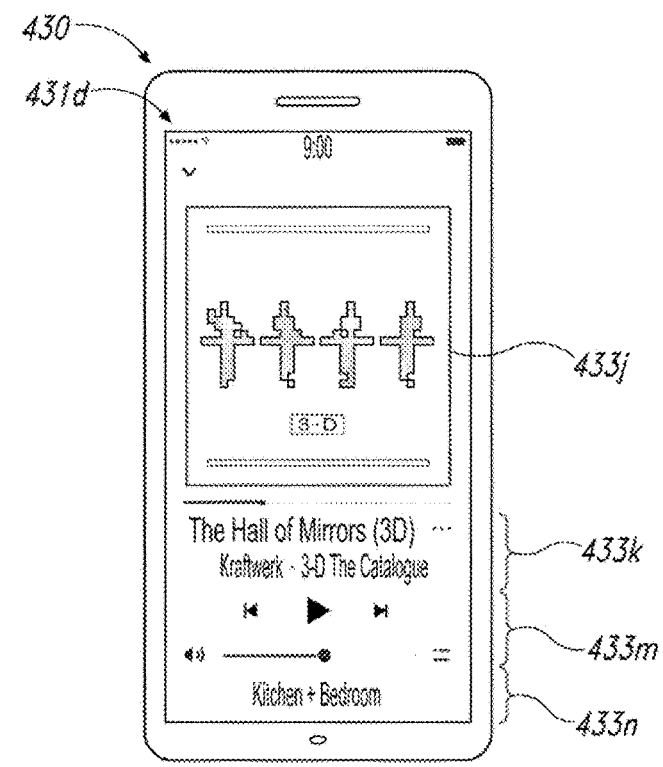

FIGS. 4A-4D are schematic diagrams of a control device 430 (e.g., the control device 130a of FIG. 1H, a smartphone, a tablet, a dedicated control device, an IoT device, and/or another suitable device) showing corresponding user interface displays in various states of operation. A first user interface display 431a (FIG. 4A) includes a display name 433a (i.e., "Rooms"). A selected group region 433b displays audio content information (e.g., artist name, track name, album art) of audio content played back in the selected group and/or zone. Group regions 433c and 433d display corresponding group and/or zone name, and audio content information audio content played back or next in a playback queue of the respective group or zone. An audio content region 433e includes information related to audio content in the selected group and/or zone (i.e., the group and/or zone indicated in the selected group region 433b). A lower display region 433f is configured to receive touch input to display one or more other user interface displays. For example, if a user selects "Browse" in the lower display region 433f, the control device 430 can be configured to output a second user interface display 431b (FIG. 4B) comprising a plurality of music services 433g (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433f, the control device 430 can be configured to output a third user interface display 431c (FIG. 4C). A first media content region 433h can include graphical representations (e.g., album art) corresponding to individual albums, stations, or playlists. A second media content region 433i can include graphical representations (e.g., album art) corresponding to individual songs, tracks, or other media content. If the user selections a graphical representation 433j (FIG. 4C), the control device 430 can be configured to begin play back of audio content corresponding to the graphical representation 433j and output a fourth user interface display 431d fourth user interface display 431d includes an enlarged version of the graphical representation 433j, media content information 433k (e.g., track name, artist, album), transport controls 433m (e.g., play, previous, next, pause, volume), and indication 433n of the currently selected group and/or zone name.

Figure 5:
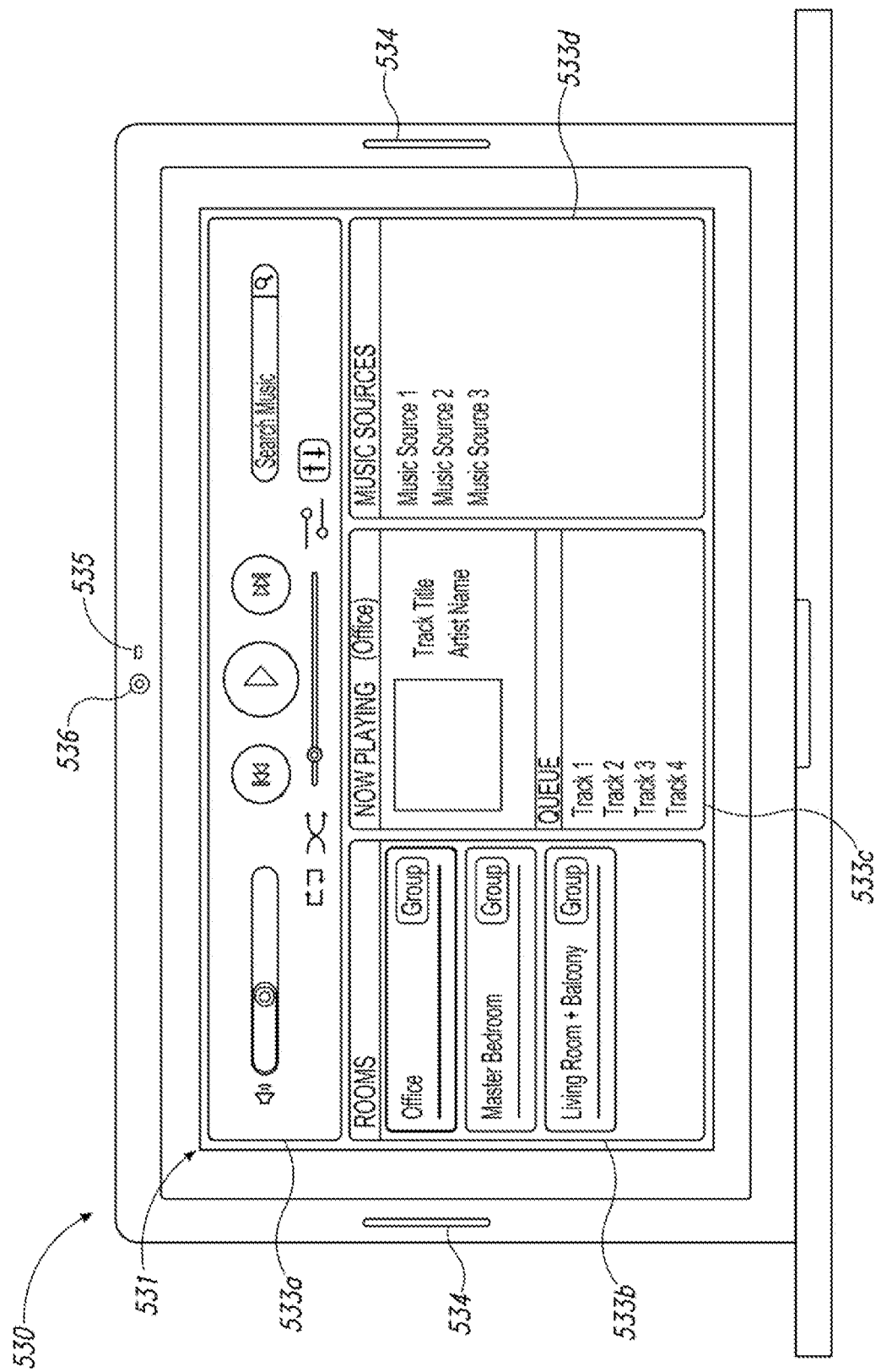
FIG. 5 is front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533a, a playback status region 533b, a playback zone region 533c, a playback queue region 533d, and a media content source region 533e. The transport control region includes one or more controls for controlling media playback including, for example, volume, previous, play/pause, next, repeat, shuffle, track position, crossfade, equalization, etc. The audio content source region 533e includes a listing of one or more media content sources from which a user can select media items for play back and/or adding to a playback queue.

The playback zone region 533b can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533b can be dynamically updated as playback zone or zone group configurations are modified.

The playback status region 533c includes graphical representations of audio content that is presently being played, previously played, or scheduled to play next in the selected playback zone or zone group. The selected playback zone or zone group may be visually distinguished on the user interface, such as within the playback zone region 533b and/or the playback queue region 533d. The graphical representations may include track title, artist name, album name, album year, track length, and other relevant information that may be useful for the user to know when controlling the media playback system 100 via the user interface 531.

The playback queue region 533d includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
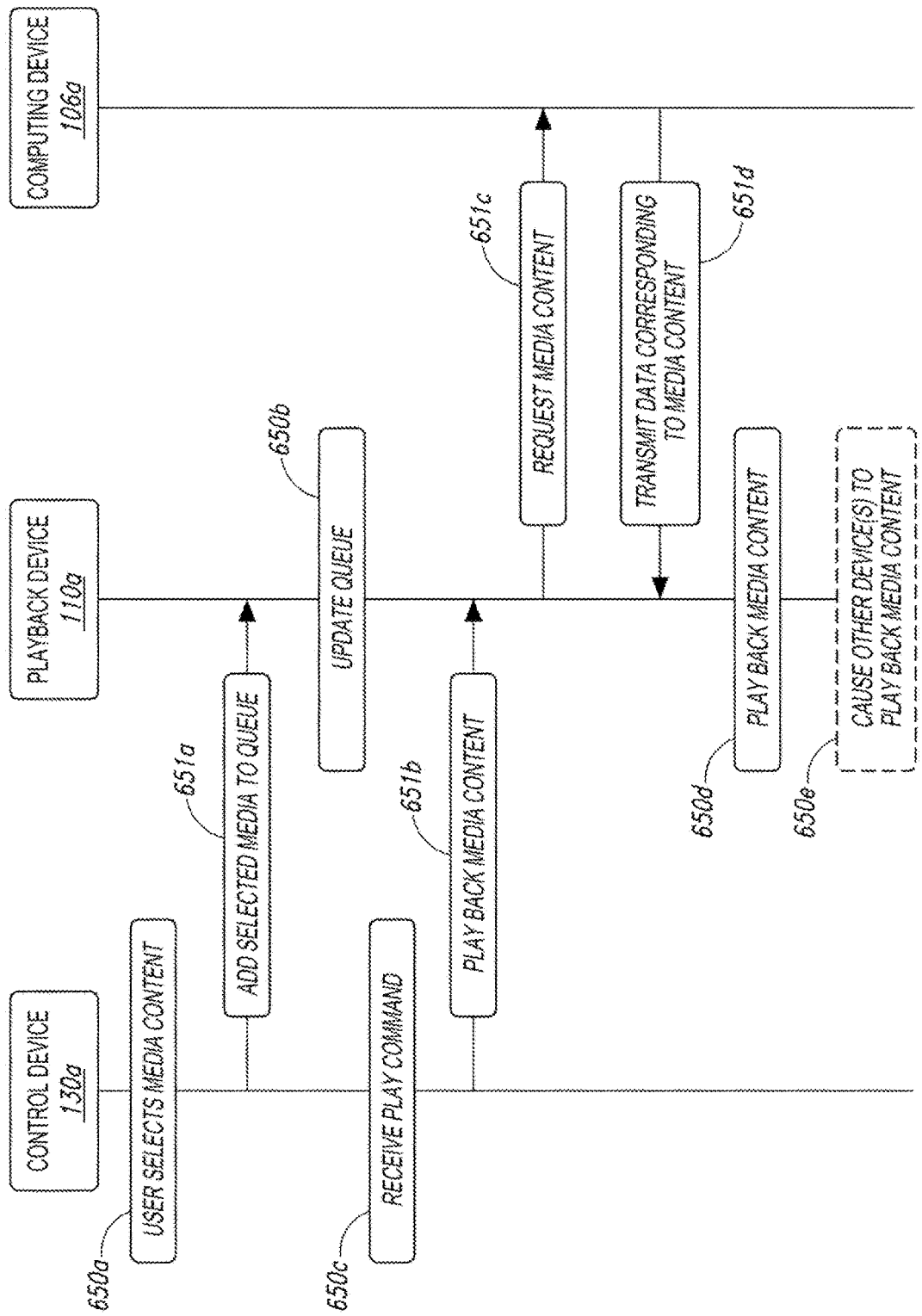
FIG. 6 is a message flow diagram of a media playback system.

FIG. 6 is a message flow diagram illustrating data exchanges between devices of the media playback system 100 (FIGS. 1A-1M).

At step 650a, the media playback system 100 receives an indication of selected media content (e.g., one or more songs, albums, playlists, podcasts, videos, stations) via the control device 130a. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130a transmits a message 651a to the playback device 110a (FIGS. 1A-1C) to add the selected media content to a playback queue on the playback device 110a.

At step 650b, the playback device 110a receives the message 651a and adds the selected media content to the playback queue for play back.

At step 650c, the control device 130a receives input corresponding to a command to play back the selected media content. In response to receiving the input corresponding to the command to play back the selected media content, the control device 130a transmits a message 651b to the playback device 110a causing the playback device 110a to play back the selected media content. In response to receiving the message 651b, the playback device 110a transmits a message 651c to the computing device 106a requesting the selected media content. The computing device 106a, in response to receiving the message 651c, transmits a message 651d comprising data (e.g., audio data, video data, a URL, a URI) corresponding to the requested media content.

At step 650d, the playback device 110a receives the message 651d with the data corresponding to the requested media content and plays back the associated media content.

At step 650e, the playback device 110a optionally causes one or more other devices to play back the selected media content. In one example, the playback device 110a is one of a bonded zone of two or more players (FIG. 1M). The playback device 110a can receive the selected media content and transmit all or a portion of the media content to other devices in the bonded zone. In another example, the playback device 110a is a coordinator of a group and is configured to transmit and receive timing information from one or more other devices in the group. The other one or more devices in the group can receive the selected media content from the computing device 106a, and begin playback of the selected media content in response to a message from the playback device 110a such that all of the devices in the group play back the selected media content in synchrony.

III. Example Portable Playback Device

As noted above, certain playback device implementations may be configured for portable use. These portable playback devices include wearable playback devices such as headphones and earbuds. The portable playback devices can also include playback devices that include transducers to facilitate out-loud audio playback, also referred to herein as a portable speaker or an ultra-portable playback device.

Figure 7A:
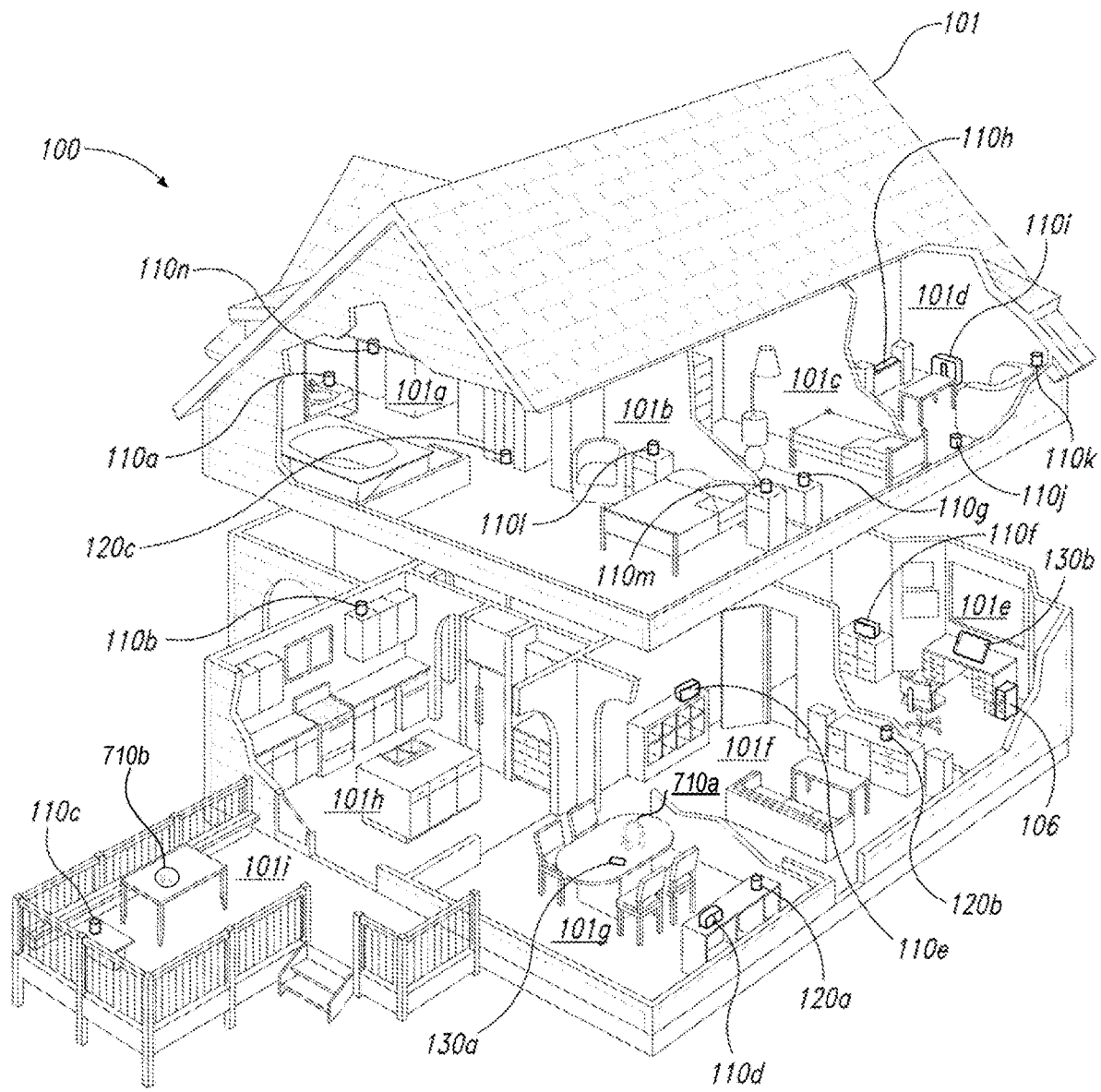
FIG. 7A is a partial cutaway view of an environment having a media playback system configured in accordance with aspects of the disclosed technology.

FIG. 7A is a partial cutaway view of the media playback system 100 with the inclusion of one or more portable playback devices 710 (identified individually as headphones 710a and earbuds 710b). The portable playback devices 710 are similar to the playback devices 110, but are configured for portable use. While they are shown in the home in FIG. 7A, the portable playback devices 710 are configured to play back audio content while in the home and while "on the go."

Figure 7B:
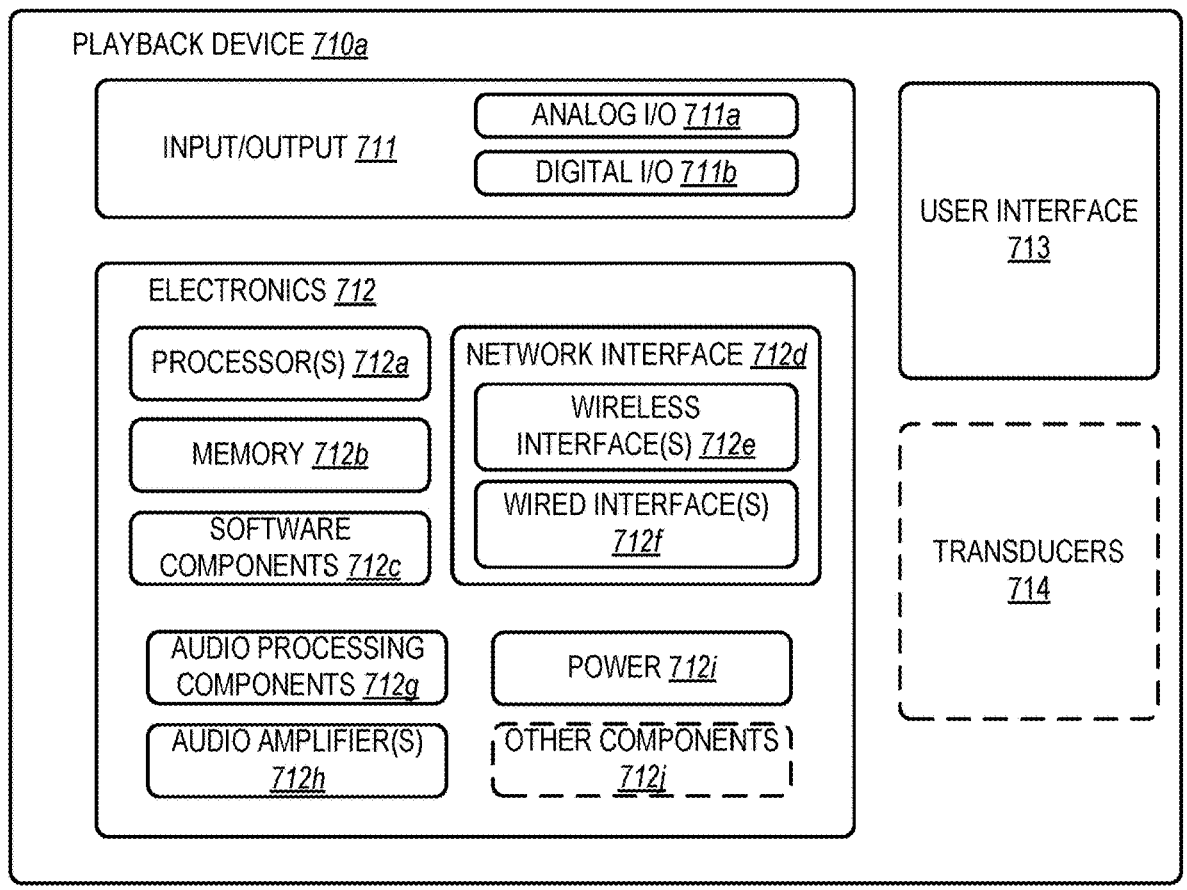
FIG. 7B is a block diagram of a wearable playback device configured in accordance with aspects of the disclosed technology.

As shown in the block diagram of FIG. 7B, the headphones 710a include the same or similar components as the playback device 110a. However, to facilitate wearable use, the headphones 710a are implemented in a certain form factor and include one or more batteries in power 712i to provide portable power. The block diagram of FIG. 7B is representative of components included in various types of portable playback devices, including earbuds and portable speakers, as discussed in further detail below.

Referring to FIG. 7B, the headphones 710a include an input/output 711, which can include an analog I/O 711a and/or a digital I/O 711b similar to the components of the playback device 110. The headphones 710a further include electronics 712, a user interface 713 (e.g., one or more buttons, knobs, dials, touch-sensitive surfaces, displays, touchscreens), and one or more transducers 714 (referred to hereinafter as "the transducers 714"). The electronics 712 are configured to receive audio from an audio source via the input/output 711 or one or more of the computing devices 106a-c via the network 104 (FIG. 1B)), amplify the received audio, and output the amplified audio for playback via one or more of the transducers 714.

The headphones 710a further include one or more microphones 715 (e.g., a single microphone, a plurality of microphones, a microphone array) (hereinafter referred to as "the microphones 715"). In certain embodiments, for example, the portable playback devices 710 having one or more of the microphones 715 can operate as an NMD configured to receive voice input from a user and correspondingly perform one or more operations based on the received voice input.

In the illustrated embodiment of FIG. 7B, the electronics 712 include one or more processors 712a (referred to hereinafter as "the processors 112a"), memory 712b, software components 712c, a network interface 712d, one or more audio processing components 712g (referred to hereinafter as "the audio components 712g"), one or more audio amplifiers 712h (referred to hereinafter as "the amplifiers 712h"), and power 712i (e.g., one or more power supplies, power cables, power receptacles, batteries, induction coils, Power-over Ethernet (POE) interfaces, and/or other suitable sources of electric power). In some embodiments, the electronics 712 optionally include one or more other components 712j (e.g., one or more sensors, video displays, touchscreens).

The network interface 712d is configured to facilitate a transmission of data between the headphones 710a and one or more other devices on a data network such as, for example, the links 103 and/or the network 104 (FIG. 1B). The network interface 712d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 712d can parse the digital packet data such that the electronics 712 properly receives and processes the data destined for the playback device 110a.

In the illustrated embodiment of FIG. 7B, the network interface 712d includes one or more wireless interfaces 712e (referred to hereinafter as "the wireless interface 712e"). The wireless interface 712e (e.g., a suitable interface comprising one or more antennae) can be configured to wirelessly communicate with one or more other devices (e.g., one or more of the playback devices 110, NMDs 120, control devices 130, other portable playback devices 710, as well as other devices disclosed herein, such as bridge devices) that are communicatively coupled to the network 104 (FIG. 1B) in accordance with a suitable wireless communication protocol (e.g., Wi-Fi®, Bluetooth®, LTE).

In particular examples, the portable playback device 710a includes two or more wireless interfaces 712e to facilitate alternative or concurrent connections to multiple types of networks. For instance, the portable playback device 710a may include an 802.11-compatible (Wi-Fi®) network interface to facilitate connection to a wireless local area network (e.g., the network 104 (FIG. 1B), an 802.15-compatible (Bluetooth®) network interface to facilitate connection to a personal area network, and/or a cellular modem (to facilitate a connection to a 3G, 4G or 5G cellular network).

In some embodiments, the network interface 712d optionally includes a wired interface 712f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In some instances, the portable playback device 710a may use this wired interface 712f to facilitate power delivery and charging in addition to or as an alternative to data. In some embodiments, the electronics 712 excludes the network interface 712d altogether and transmits and receives media content and/or other data via another communication path (e.g., the input/output 711).

The audio components 712g are configured to process and/or filter data comprising media content received by the electronics 712 (e.g., via the input/output 711 and/or the network interface 712d) to produce output audio signals. In some embodiments, the audio processing components 712g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 712g can comprise one or more subcomponents of the processors 712a. In some embodiments, the electronics 712 omits the audio processing components 712g. In some aspects, for example, the processors 712a execute instructions stored on the memory 712b to perform audio processing operations to produce the output audio signals.

The amplifiers 712h are configured to receive and amplify the audio output signals produced by the audio processing components 712g and/or the processors 712a. The amplifiers 7712h can comprise electronic devices and/or components configured to amplify audio signals to levels sufficient for driving one or more of the transducers 714. In some embodiments, for example, the amplifiers 712h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 712h comprise a suitable combination of two or more of the foregoing types of power amplifiers. Moreover, in some embodiments, individual ones of the amplifiers 712h correspond to individual ones of the transducers 714. In other embodiments, however, the electronics 712 includes a single one of the amplifiers 712h configured to output amplified audio signals to a plurality of the transducers 714.

The transducers 714 (e.g., one or more speakers and/or speaker drivers) receive the amplified audio signals from the amplifier 712h and render or output the amplified audio signals as sound (e.g., audible sound waves having a frequency between about 20 Hertz (Hz) and 20 kilohertz (kHz)). In some embodiments, the transducers 714 can comprise a single transducer. In other embodiments, however, the transducers 714 comprise a plurality of audio transducers. In some embodiments, the transducers 714 comprise more than one type of transducer. For example, the transducers 714 can include one or more low frequency transducers (e.g., subwoofers, woofers), mid-range frequency transducers (e.g., mid-range transducers, mid-woofers), and one or more high frequency transducers (e.g., one or more tweeters).

Figure 7C:
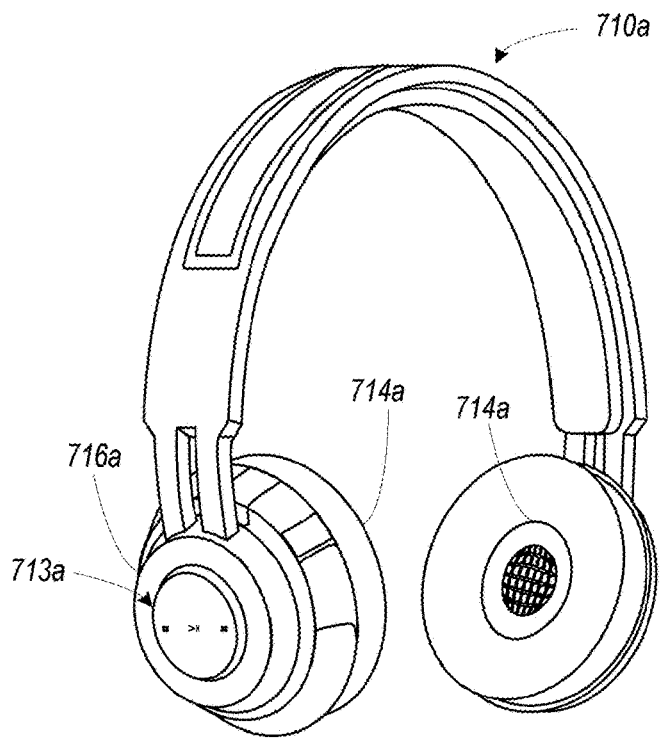
FIG. 7C is a front isometric view of a wearable device implemented as headphones configured in accordance with aspects of the disclosed technology.

FIG. 7C is a front isometric view of the headphones 710a configured in accordance with aspects of the disclosed technology. As shown in FIG. 7C, the headphones 710a are implemented as headphones to facilitate more private playback as compared with the out loud playback of the playback device(s) 110. As shown, the headphones 710a include a housing 716a to support a pair of transducers 714a on or around user's head over the user's ears. The headphones 710a also include a user interface 713a including a touch-sensitive region to facilitate playback controls such as transport and/or volume controls. In particular, the touch-sensitive region may be configured to detect various gestures corresponding to different inputs.

FIG. 7D is a front isometric view of the earbuds 710b configured in accordance with aspects of the disclosed technology. As shown in FIG. 7D, the earbuds 710b is implemented as earbuds to facilitate more private playback as compared with the out loud playback of the playback device(s) 110, similar to the headphones 710a. As shown, the earbuds 710b (also referred to as earbuds 710b) includes a housing 716b to support a pair of transducers 714b within a user's ears. The earbuds 710b also include a user interface 713b with a touch-sensitive region to facilitate playback controls such as transport and/or volume controls, perhaps via gestures. The earbuds 710b may include the same or similar components as the representative playback device 710a in FIG. 7B.

FIG. 7E is a front isometric view of an ultra-portable playback device 710c. As compared with the headphones 710a and the earbuds 710b, the ultra-portable playback device 710c includes one or more larger transducers to facilitate out loud audio content playback. However, relative to the playback device(s) 110, the ultra-portable playback device 710c may include less powerful amplifier(s) and/or smaller transducer(s) to balance battery life, sound output capability, and form factor (i.e., size, shape, and weight) of the ultra-portable playback device 710c. The ultra-portable playback device 710c includes a user interface 713c with a touch-sensitive region to facilitate playback controls such as transport and/or volume controls, possibly via gestures. The ultra-portable playback device 710c may include the same or similar components as the representative playback device 710a in FIG. 7B.

FIG. 7F is a front isometric view of another ultra-portable playback device 710d. Like the ultra-portable playback device 710c, the ultra-portable playback device 710d includes one or more larger transducers to facilitate out loud audio content playback. The ultra-portable playback device 710c includes a user interface 713d with a touch-sensitive region to facilitate playback controls such as transport and/or volume controls, possibly via gestures. The ultra-portable playback device 710c may include the same or similar internal components as the representative playback device 710a in FIG. 7B.

Some ultra-portable playback devices 710 are configured to be placed upon a device base 718. To illustrate, FIG. 7F illustrates the ultra-portable playback device 710d being configured to be placed upon a device base 718a. The device base 718a includes protrusions 719a and 719b, which align with recesses 717a and 717b on the portable playback device 710d. Such protrusions and recesses may facilitate placing the ultra-portable playback device 710d on the device base 718a and may improve stability of the playback device 710d while it is positioned on the device base 718a.

In example implementations, the ultra-portable playback device 710c is rotatable about the device base 718a to control volume of the ultra-portable playback device 710c. For instance, the ultra-portable playback device 710d may rotate with respect to the device base 718a, which may generate a volume control signal in a sensor of the ultra-portable playback device 710c and/or device base 718a. In another example, a first portion of the device base 718a is rotatable with respect to a second portion of the device base 718a. Rotation of these two portions generates a volume control signal in a sensor of the device base 718a that controls volume of the ultra-portable playback device 710c when the ultra-portable playback device 710d is placed upon the device base 718a.

The device base 718a includes a device charging system. When the ultra-portable playback device 710c is placed on device base 718a, the ultra-portable playback device 710d may draw current from the charging system to charge one or more of its batteries. In some examples, the charging system of the device base 718a includes an inductive charging circuit (e.g., a coil that induces a current in a corresponding coil in the ultra-portable playback device 710d that wirelessly charges one or more batteries of the ultra-portable playback device 710c). Alternatively, the charging system of the device base 718a includes conductive terminals by which the ultra-portable playback device 710d may draw current from the device base 718.

In some implementations, the device base 718a includes a control system. Example control systems of the device base 718a include one or more processors and memory. The processor(s) may be clock-driven computing components that process input data according to instructions stored in the memory. Example operations include communicating via a communications interface (e.g., a BLUETOOTH® interface) with ultra-portable playback device 710d (e.g., to cause the ultra-portable playback device 710c to join an associated zone via one or more instructions) and causing the charging system to supply current to ultra-portable playback device 710d, among other examples.

In some example implementations, some playback devices, such as the headphones 710a or the earbuds 710b, as well the portable playback device 710c and/or 710d, may interface with the media playback system 100 via a mobile device, such as a smartphone or tablet. FIG. 7F illustrates an example pairing arrangement between the headphones 710a and a mobile device configured as a control device 130a. As noted above, a mobile device may become a control device 130 via the installation of control application software, which may further provide bridging features to facilitate the control device 130*a* operating as an interface between the headphones 710*a* and the media playback system 100.

The control device 130*a* may include communications interface(s), processing capabilities, and/or other features that are not necessarily implemented in the headphones 710*a*. By "pairing" the headphones 710*a* to the control device 130*a*, the portable playback device 710 is able to utilize some of these features. This arrangement may permit the headphones 710*a* to be smaller and more portable, to draw less power, and/or to be less expensive, among other possible benefits.

For instance, in various implementations, the headphones 710*a* may be implemented with or without a communications interface to connect to the Internet while "on the go" (e.g., a cellular data connection). By pairing the headphones 710*a* to the control device 130*a* via a personal area connection such as Bluetooth® (IEEE 802.15) or a wireless local area network connection (IEEE 802.11), the headphones 710*a* may stream music via an Internet connection of the control device 130*a* and the pairing connection. In embodiments that include a wireless local area network interface, the headphones 710*a* may connect directly to a wireless local area network (e.g., the network 104 (FIG. 1B)) if available.

Figure 7G:
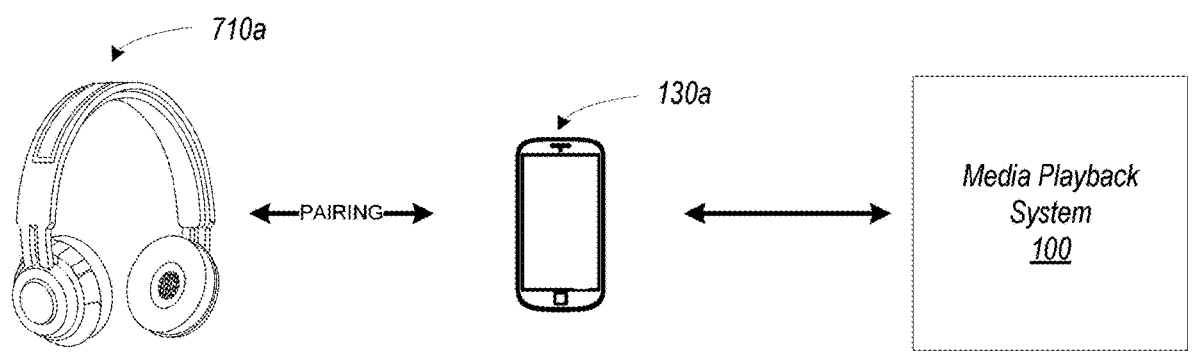
FIG. 7G is a schematic diagram illustrating an example pairing configuration between a portable playback device and a control device in accordance with aspects of the disclosed technology.
Figure 7H:
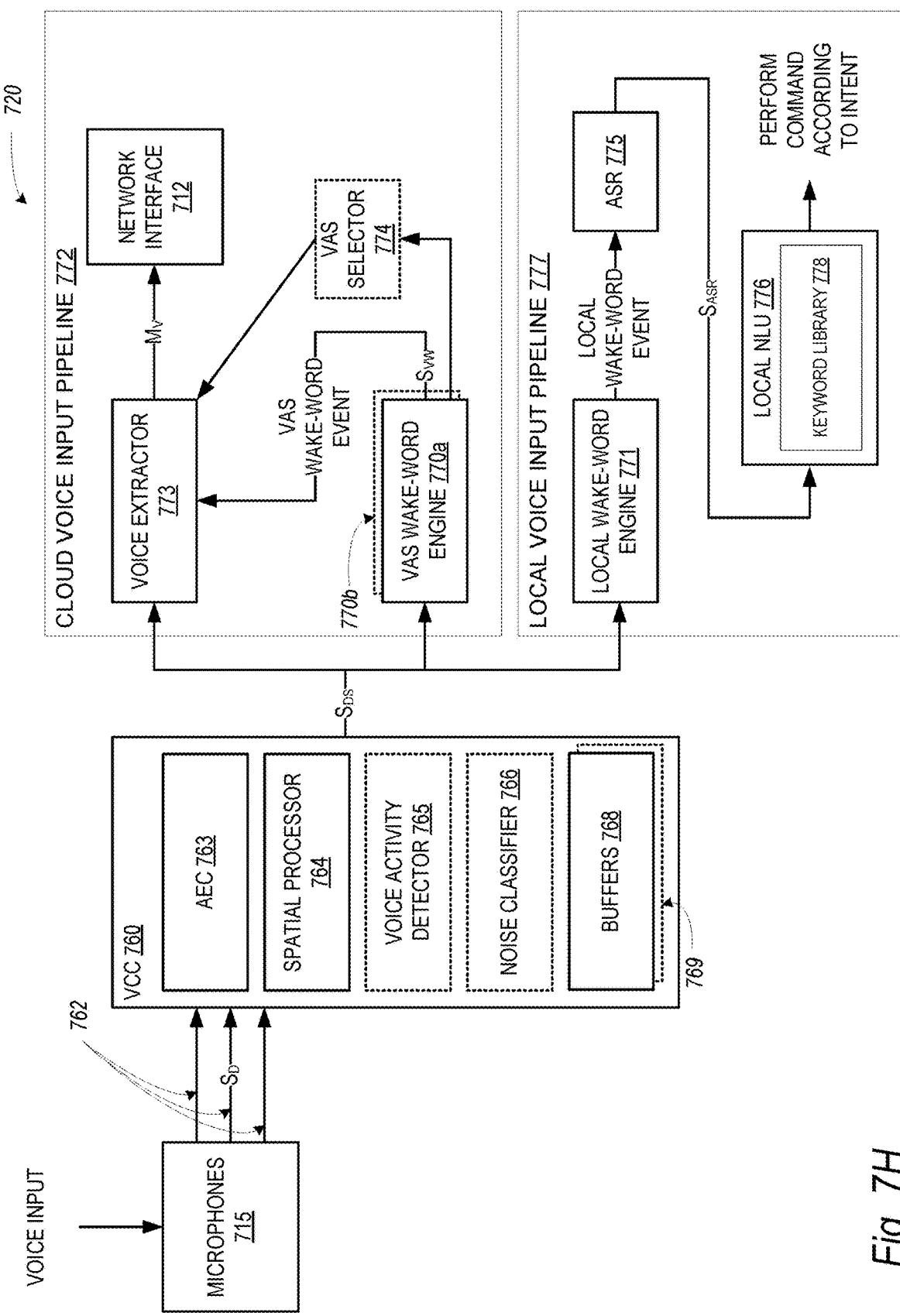
FIG. 7H is a block diagram illustrating an example network microphone device in accordance with aspects of the disclosed technology.

As noted above, an example portable playback device 710 may include an integrated (i.e., built-in) network microphone device. FIG. 7H is a functional block diagram showing aspects of an NMD 720 configured in accordance with embodiments of the disclosure. As described in more detail below, the NMD 720 is configured to handle certain voice inputs locally, without necessarily transmitting data representing the voice input to a voice assistant service. The NMD 720 is also configured to process other voice inputs using a voice assistant service.

Referring to the FIG. 7H, the NMD 720 includes voice capture components ("VCC") 760, a VAS wake-word engine 770*a*, and a voice extractor 773. The VAS wake-word engine 770*a* and the voice extractor 773 are operably coupled to the VCC 760. The NMD 720 further a local wake-word engine 771 operably coupled to the VCC 760.

The NMD 720 further includes microphones 714. The microphones 722 of the NMD 720 are configured to provide detected sound, SD, from the environment of the NMD 720 to the VCC 760. The detected sound SD may take the form of one or more analog or digital signals. In example implementations, the detected sound SD may be composed of a plurality signals associated with respective channels 762 that are fed to the VCC 760.

Each channel 762 may correspond to a particular microphone 715. For example, an NMD having six microphones may have six corresponding channels. Each channel of the detected sound SD may bear certain similarities to the other channels but may differ in certain regards, which may be due to the position of the given channel's corresponding microphone relative to the microphones of other channels. For example, one or more of the channels of the detected sound SD may have a greater signal to noise ratio ("SNR") of speech to background noise than other channels.

As further shown in FIG. 7H, the VCC 760 includes an AEC 763, a spatial processor 764, and one or more buffers 768. In operation, the AEC 763 receives the detected sound SD and filters or otherwise processes the sound to suppress echoes and/or to otherwise improve the quality of the detected sound SD. That processed sound may then be passed to the spatial processor 764.

The spatial processor 764 is typically configured to analyze the detected sound SD and identify certain characteristics, such as a sound's amplitude (e.g., decibel level), frequency spectrum, directionality, etc. In one respect, the spatial processor 764 may help filter or suppress ambient noise in the detected sound SD from potential user speech based on similarities and differences in the constituent channels 762 of the detected sound SD, as discussed above. As one possibility, the spatial processor 764 may monitor metrics that distinguish speech from other sounds. Such metrics can include, for example, energy within the speech band relative to background noise and entropy within the speech band—a measure of spectral structure—which is typically lower in speech than in most common background noise. In some implementations, the spatial processor 764 may be configured to determine a speech presence probability, examples of such functionality are disclosed in U.S. patent application Ser. No. 15/984,073, filed May 18, 2018, titled "Linear Filtering for Noise-Suppressed Speech Detection," which is incorporated herein by reference in its entirety.

In operation, the one or more buffers 768—one or more of which may be part of or separate from the memory 712 (FIG. 7B)—capture data corresponding to the detected sound SD. More specifically, the one or more buffers 768 capture detected-sound data that was processed by the upstream AEC 764 and spatial processor 766.

The network interface 712 may then provide this information to a remote server that may be associated with the MPS 100. In one aspect, the information stored in the additional buffer 769 does not reveal the content of any speech but instead is indicative of certain unique features of the detected sound itself. In a related aspect, the information may be communicated between computing devices, such as the various computing devices of the MPS 100, without necessarily implicating privacy concerns. In practice, the MPS 100 can use this information to adapt and fine-tune voice processing algorithms, including sensitivity tuning as discussed below. In some implementations the additional buffer may comprise or include functionality similar to lookback buffers disclosed, for example, in U.S. patent application Ser. No. 15/989,715, filed May 25, 2018, titled "Determining and Adapting to Changes in Microphone Performance of Playback Devices"; U.S. patent application Ser. No. 16/141,875, filed Sep. 25, 2018, titled "Voice Detection Optimization Based on Selected Voice Assistant Service"; and U.S. patent application Ser. No. 16/138,111, filed Sep. 21, 2018, titled "Voice Detection Optimization Using Sound Metadata," which are incorporated herein by reference in their entireties.

In any event, the detected-sound data forms a digital representation (i.e., sound-data stream), SDS, of the sound detected by the microphones 715. In practice, the sound-data stream SDS may take a variety of forms. As one possibility, the sound-data stream SDS may be composed of frames, each of which may include one or more sound samples. The frames may be streamed (i.e., read out) from the one or more buffers 768 for further processing by downstream components, such as the VAS wake-word engines 770 and the voice extractor 773 of the NMD 720.

In some implementations, at least one buffer 768 captures detected-sound data utilizing a sliding window approach in which a given amount (i.e., a given window) of the most recently captured detected-sound data is retained in the at least one buffer 768 while older detected-sound data is overwritten when it falls outside of the window. For example, at least one buffer 768 may temporarily retain 20 frames of a sound specimen at given time, discard the oldest frame after an expiration time, and then capture a new frame, which is added to the 19 prior frames of the sound specimen.

In practice, when the sound-data stream SDS is composed of frames, the frames may take a variety of forms having a variety of characteristics. As one possibility, the frames may take the form of audio frames that have a certain resolution (e.g., 16 bits of resolution), which may be based on a sampling rate (e.g., 44,100 Hz). Additionally, or alternatively, the frames may include information corresponding to a given sound specimen that the frames define, such as metadata that indicates frequency response, power input level, SNR, microphone channel identification, and/or other information of the given sound specimen, among other examples. Thus, in some embodiments, a frame may include a portion of sound (e.g., one or more samples of a given sound specimen) and metadata regarding the portion of sound. In other embodiments, a frame may only include a portion of sound (e.g., one or more samples of a given sound specimen) or metadata regarding a portion of sound.

In any case, downstream components of the NMD 720 may process the sound-data stream SDS. For instance, the VAS wake-word engines 770 are configured to apply one or more identification algorithms to the sound-data stream SDS (e.g., streamed sound frames) to spot potential wake words in the detected-sound SD. This process may be referred to as automatic speech recognition. The VAS wake-word engine 770*a* and local wake-word engine 771 apply different identification algorithms corresponding to their respective wake words, and further generate different events based on detecting a wake word in the detected-sound SD.

Example wake word detection algorithms accept audio as input and provide an indication of whether a wake word is present in the audio. Many first- and third-party wake word detection algorithms are known and commercially available. For instance, operators of a voice service may make their algorithm available for use in third-party devices. Alternatively, an algorithm may be trained to detect certain wakewords.

For instance, when the VAS wake-word engine 770*a* detects a potential VAS wake word, the VAS work-word engine 770*a* provides an indication of a "VAS wake-word event" (also referred to as a "VAS wake-word trigger"). In the illustrated example of FIG. 7A, the VAS wake-word engine 770*a* outputs a signal Svw that indicates the occurrence of a VAS wake-word event to the voice extractor 773.

In multi-VAS implementations, the NMD 720 may include a VAS selector 774 (shown in dashed lines) that is generally configured to direct extraction by the voice extractor 773 and transmission of the sound-data stream SDS to the appropriate VAS when a given wake-word is identified by a particular wake-word engine (and a corresponding wake-word trigger), such as the VAS wake-word engine 770*a* and at least one additional VAS wake-word engine 770*b* (shown in dashed lines). In such implementations, the NMD 720 may include multiple, different VAS wake-word engines and/or voice extractors, each supported by a respective VAS.

Similar to the discussion above, each VAS wake-word engine 770 may be configured to receive as input the sound-data stream SDS from the one or more buffers 768 and apply identification algorithms to cause a wake-word trigger for the appropriate VAS. Thus, as one example, the VAS wake-word engine 770*a* may be configured to identify the wake word "Alexa" and cause the NMD 720 to invoke the AMAZON VAS when "Alexa" is spotted. As another example, the wake-word engine 770*b* may be configured to identify the wake word "Ok, Google" and cause the NMD 520 to invoke the GOOGLE VAS when "Ok, Google" is spotted. In single-VAS implementations, the VAS selector 774 may be omitted.

In response to the VAS wake-word event (e.g., in response to the signal Svw indicating the wake-word event), the voice extractor 773 is configured to receive and format (e.g., packetize) the sound-data stream SDS. For instance, the voice extractor 773 packetizes the frames of the sound-data stream SDS into messages. The voice extractor 773 transmits or streams these messages, Mv, that may contain voice input in real time or near real time to a remote VAS via the network interface 724.

In some implementations, a user may selectively enable or disable voice input processing via cloud-based voice assistant services. In some examples, to disable the voice input processing via cloud-based voice assistant services, the NMD 720 physically or logically disables the VAS wake-word engine(s) 770. For instance, the NMD 720 may physically or logically prevent the sound-data stream SDS from the microphones 722 from reaching the VAS wake-word engine(s) 770 and/or voice extractor 773. Suppressing generation may involve gating, blocking or otherwise preventing output from the VAS wake-word engine(s) 770 from generating a VAS wake-word event.

A voice input may include a keyword portion and an utterance portion. The keyword portion may correspond to detected sound that causes a VAS wake-word event (i.e., a VAS wake word). Alternatively, the keyword portion may correspond to a local wake word or a command keyword, which may generate a local wake-word event.

For instance, when the voice input includes a VAS wake word, the keyword portion corresponds to detected sound that causes the wake-word engine 770*a* to output the wake-word event signal Svw to the voice extractor 773. The utterance portion in this case corresponds to detected sound that potentially comprises a user request following the keyword portion.

When a VAS wake-word event occurs, the VAS may first process the keyword portion within the sound-data stream SDS to verify the presence of a VAS wake word. In some instances, the VAS may determine that the keyword portion comprises a false wake word (e.g., the word "Election" when the word "Alexa" is the target VAS wake word). In such an occurrence, the VAS may send a response to the NMD 720 with an instruction for the NMD 720 to cease extraction of sound data, which causes the voice extractor 773 to cease further streaming of the detected-sound data to the VAS. The VAS wake-word engine 770*a* may resume or continue monitoring sound specimens until it spots another potential VAS wake word, leading to another VAS wake-word event. In some implementations, the VAS does not process or receive the keyword portion but instead processes only the utterance portion.

In any case, the VAS processes the utterance portion to identify the presence of any words in the detected-sound data and to determine an underlying intent from these words. The words may correspond to one or more commands, as well as certain keywords. The keyword may be, for example, a word in the voice input identifying a particular device or group in the MPS 100. For instance, in the illustrated example, the keyword may be one or more words identifying one or more zones in which the music is to be played, such as the Living Room and the Dining Room (FIG. 1A).

To determine the intent of the words, the VAS is typically in communication with one or more databases associated with the VAS (not shown) and/or one or more databases (not shown) of the 1VIPS 100. Such databases may store various user data, analytics, catalogs, and other information for natural language processing and/or other processing. In some implementations, such databases may be updated for adaptive learning and feedback for a neural network based on voice-input processing. In some cases, the utterance portion may include additional information such as detected pauses (e.g., periods of non-speech) between words spoken by a user. The pauses may demarcate the locations of separate commands, keywords, or other information spoke by the user within the utterance portion.

After processing the voice input, the VAS may send a response to the MPS 100 with an instruction to perform one or more actions based on an intent it determined from the voice input. For example, based on the voice input, the VAS may direct the MPS 100 to initiate playback on one or more of the playback devices 102, control one or more of these playback devices 102 (e.g., raise/lower volume, group/ungroup devices, etc.), or turn on/off certain smart devices, among other actions. After receiving the response from the VAS, the wake-word engine 770a of the NMD 720 may resume or continue to monitor the sound-data stream SDS1 until it spots another potential wake-word, as discussed above.

In general, the one or more identification algorithms that a particular VAS wake-word engine, such as the VAS wake-word engine 770a, applies are configured to analyze certain characteristics of the detected sound stream SDS and compare those characteristics to corresponding characteristics of the particular VAS wake-word engine's one or more particular VAS wake words. For example, the wake-word engine 770a may apply one or more identification algorithms to spot spectral characteristics in the detected sound stream SDS that match the spectral characteristics of the engine's one or more wake words, and thereby determine that the detected sound SD comprises a voice input including a particular VAS wake word.

In some implementations, the one or more identification algorithms may be third-party identification algorithms (i.e., developed by a company other than the company that provides the NMD 720). For instance, operators of a voice service (e.g., AMAZON) may make their respective algorithms (e.g., identification algorithms corresponding to AMAZON's ALEXA) available for use in third-party devices (e.g., the NMDs 103), which are then trained to identify one or more wake words for the particular voice assistant service. Additionally, or alternatively, the one or more identification algorithms may be first-party identification algorithms that are developed and trained to identify certain wake words that are not necessarily particular to a given voice service. Other possibilities also exist.

As noted above, the NMD 720 also includes a local wake-word engine 771 in parallel with the VAS wake-word engine 770a. Like the VAS wake-word engine 770a, the local wake-word engine 771 may apply one or more identification algorithms corresponding to one or more wake words. A "local wake-word event" is generated when a particular local wake-word is identified in the detected-sound SD. Local wake-words may take the form of a nonce wake word corresponding to local processing (e.g,. "Hey Sonos"), which is different from the VAS wake words corresponding to respective voice assistant services. Exemplary local wake-word detection is described in "Efficient keyword spotting using dilated convolutions and gating," by Alice Coucke et al., published on Nov. 18, 2018, available at https://arxiv.org/pdf/1805.10190.pdf, which is incorporated by reference herein in its entirety.

Local keywords may also take the form of command keywords. In contrast to the nonce words typically as utilized as VAS wake words, command keywords function as both the activation word and the command itself. For instance, example command keywords may correspond to playback commands (e.g., "play," "pause," "skip," etc.) as well as control commands ("turn on"), among other examples. Under appropriate conditions, based on detecting one of these command keywords, the NMD 720 performs the corresponding command. Examples command keyword eventing is described in U.S. patent application Ser. No. 16/439,009, filed Jun. 12, 2019, titled "Network Microphone Device with Command Keyword Conditioning," and available at https://arxiv.org/pdf/1811.07684v2.pdf, which is incorporated by reference in its entirety.

When a local wake-word event is generated, the NMD 720 can employ an automatic speech recognizer 775. The ASR 775 is configured to output phonetic or phenomic representations, such as text corresponding to words, based on sound in the sound-data stream SDS to text. For instance, the ASR 775 may transcribe spoken words represented in the sound-data stream SDS to one or more strings representing the voice input as text. The ASR 775 can feed ASR output (labeled as SAsR) to a local natural language unit (NLU) 776 that identifies particular keywords as being local keywords for invoking local-keyword events, as described below. Exemplary automatic speech recognition is described in "Snips Voice Platform: an embedded Spoken Language Understanding system for private-by-design voice interfaces," by Alice Coucke et al., published on May 25, 2018, and available at https://arxiv.org/pdf/1805.10190.pdf, which is incorporated by reference herein in its entirety.

As noted above, in some example implementations, the NMD 720 is configured to perform natural language processing, which may be carried out using an onboard natural language processor, referred to herein as a natural language unit (NLU) 776. The local NLU 776 is configured to analyze text output of the ASR 775 to spot (i.e., detect or identify) keywords in the voice input. In FIG. 7H, this output is illustrated as the signal SAsR. The local NLU 776 includes a keyword library 778 (i.e., words and phrases) corresponding to respective commands and/or parameters.

In one aspect, the library 778 of the local NLU 776 includes local keywords, which, as noted above, may take the form of commands and parameters. The local NLU 776 may determine an underlying intent from the matched keywords in the voice input. For instance, if the local NLU matches the keywords "David Bowie" and "kitchen" in combination with a play command, the local NLU 776 may determine an intent of playing David Bowie in the Kitchen 101h on the playback device 102i. In contrast to a processing of the voice input by a cloud-based VAS, local processing of the voice input by the local NLU 776 may be relatively less sophisticated, as the NLU 776 does not have access to the relatively greater processing capabilities and larger voice databases that a VAS generally has access to.

In some examples, the local NLU 776 may determine an intent with one or more slots, which correspond to respective keywords. For instance, referring back to the play David Bowie in the Kitchen example, when processing the voice input, the local NLU 776 may determine that an intent is to play music (e.g., intent=playMusic), while a first slot includes David Bowie as target content (e.g., slot1=DavidBowie) and a second slot includes the Kitchen 101h as the target playback device (e.g., slot2=kitchen). Here, the intent (to "playMusic") is based on the command keyword and the slots are parameters modifying the intent to a particular target content and playback device.

The block diagram shown in FIG. 7H is illustrative of a network microphone device 720 supporting both cloud-based voice input processing as well as local voice input processing. The VAS wake-word engine 770, the voice extractor 773, and the VAS selector 773 are referred to collectively, as a cloud voice input pipeline 772. As described above, the NMD 720 may utilize such components to process a voice input using cloud-based natural language understanding ("cloud NLU"). Conversely, the wake-word engine 771, the ASR 775, and/or the NLU 776, referred to together as a local voice input pipeline 777, may be used to process a voice input using local natural language understanding ("local NLU").

IV. Example Connection Modes

Within example implementations, an example portable playback device 710 (e.g., any of the portable playback devices 710a-d) may be operable in a set of connection modes. The connection modes may correlate to respective types of network connections. Further, when the portable playback device 710 connects or disconnects from the different types of networks, the portable playback device 710 may switch between the modes based on connection state.

Figure 8:
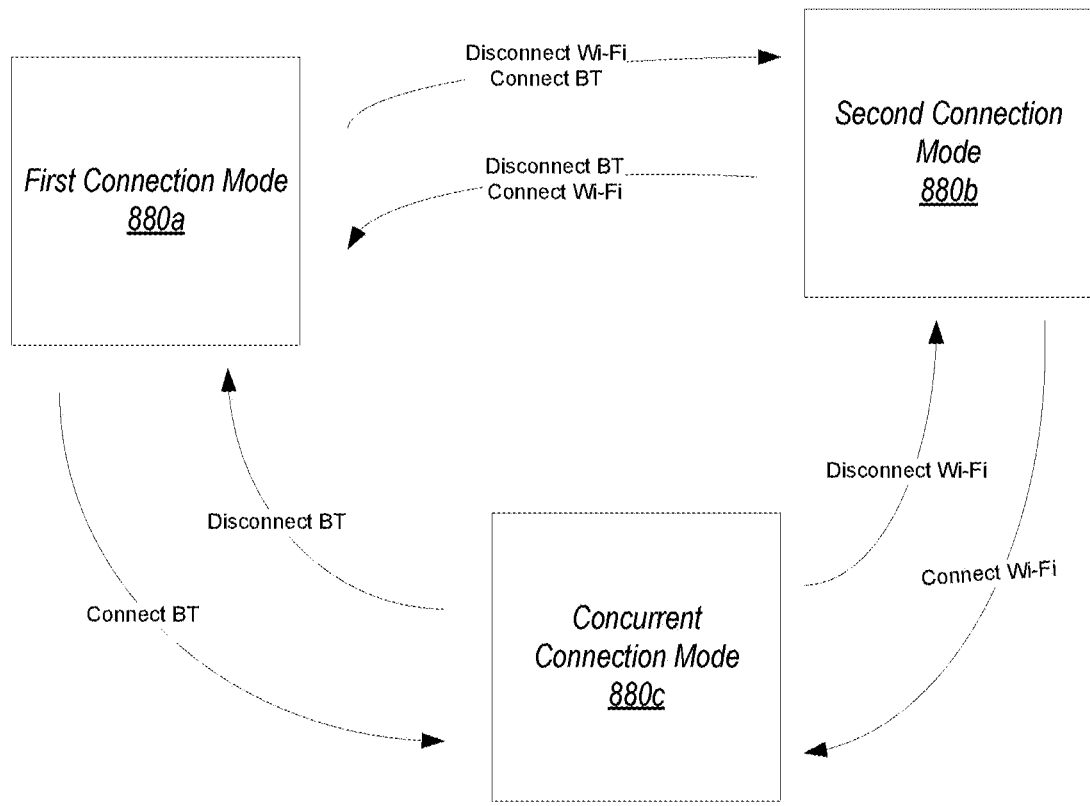
FIG. 8 is a block diagram illustrating example connection modes in accordance with aspects of the disclosed technology.

To illustrate, FIG. 8 is a block diagram illustrating an example set of connection modes 880. The set of connection modes 880 include a first connection mode 880a, a second connection mode 880b, and a concurrent connection mode 880c. The example portable playback device 710 operates in the first connection mode 880a when connected to a wireless local area network (WLAN) (e.g., the network 104 in FIG. 1B) via a first network interface (e.g., an 802.11-compatible network interface, such as the wireless interfaces 712e in FIG. 7B). The portable playback device 710 operates in the second connection mode 880b when connected to a personal area network (PAN) via a second network interface (e.g., an 802.15-compatible network interface, such as the wireless interfaces 712e in FIG. 7B). When connected concurrently to the WLAN and the PAN via the first and second network interfaces, the portable playback device 710 operate in the concurrent connection mode 880c.

As shown in FIG. 8, the portable playback device 710 may switch between the connection modes 880 when connections are made or lost. For instance, when in the first connection mode, if a connection to Wi-Fi is disconnected and Bluetooth is connected, the portable playback device 710 may switch from the first connection mode 880a to the second connection mode 880b. If either in the first connection mode 880a or the second connection mode 880b, when a second connection is established, the portable playback device 710 may switch to the concurrent connection mode 880c. Conversely, when in the concurrent connection mode 880c, if either connection is disconnected, the portable playback device 710 switches from the concurrent connection mode to the first connection mode 880a or the second connection mode 880b, depending on the current connection state.

The portable playback device 710 may switch between different connection modes in response to a control input and/or changing connection availability conditions. For example, the user may select a connection mode button to cycle through the different connection modes. In another example, specific buttons may be provided for each connection type and the user can select a Bluetooth® control (e.g., a button, for example), to enable and disable the Bluetooth® connection.

In examples, the portable playback device 710 may automatically connect to each available connection mode 880. For example, the portable playback device 710 may automatically connect to a paired Bluetooth® device (e.g., a mobile device 130) when the paired device is in range and/or may automatically connect to a known Wi-Fi® connection when in range of the Wi-Fi access point. In some examples, the portable playback device might be in "airplane mode" which disables one or more of the connection modes.

The set of connection modes 880 is merely illustrative and other examples may include additional or fewer connection modes. For example, some examples of the portable playback devices 710 may additionally include one or more additional network interfaces or modems, such as a cellular modem (e.g., a 4G or 5G-compatible cellular modem) for connection to the Internet via one or more cellular networks. In such examples, such portable playback devices 710 may be operable in one or more additional modes 880 corresponding to the respective connections.

The portable playback devices 710 may maintain or have access to state information indicating the current connection mode 880. In an example, the portable playback devices 710 may store in data storage data representing one or more state variables indicating the current connection mode. When a portable playback device 710 switches among the modes, the portable playback device 710 may update the state variables to indicate the current connection mode 880. A control device may receive the state information and use the current connection mode information 880 to display an indication of which connection mode the portable playback device is currently in. The user may use the control device to change the current connection mode 880.

The portable playback devices 710 may be configured to determine the current connection mode. For example, the portable playback devices 710 may determine the connection mode based on connection status information accessible to the portable playback devices 710 (e.g., from drivers associated with the corresponding network interfaces). In another example, the portable playback devices 710 may determine the connection mode by attempting to communicate over the corresponding network interfaces. Other examples are possible as well.

V. Example Operation Based on Connection Mode

Within example implementations, the example portable playback device 710 may perform various actions or responses in response to various events or triggers (referred to collectively as trigger events). The particular action or response performed may vary based on the current connection mode 880a that the portable playback device 710 is operating in. That is, the portable playback device 710 may respond differently to a given trigger event when in the first connection mode 880a as compared with the second connection mode 880b.

Figure 9A:
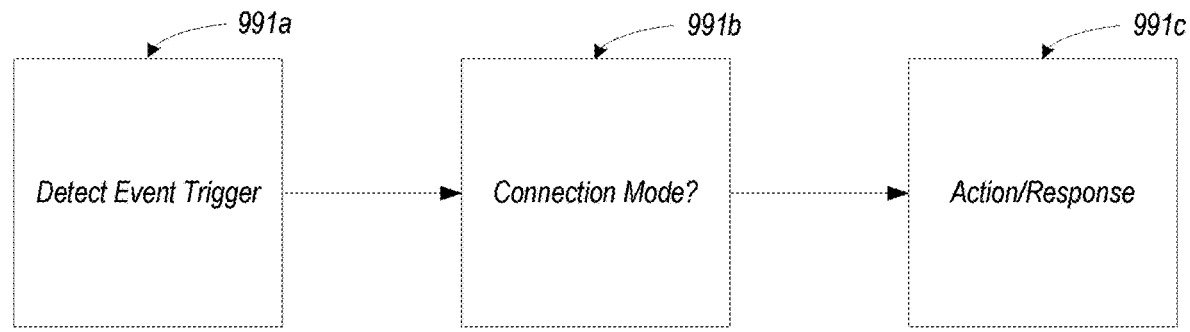
FIG. 9A is a block diagram illustrating an example architecture for performing actions or responses based on connection mode after detecting an trigger event in accordance with aspects of the disclosed technology.

FIG. 9A is a block diagram illustrating this architecture. At block 991a, the portable playback device 710 detects a trigger event. At block 991b, the portable playback device 710 determines the current connection mode 880 that the portable playback device 710 is operating in. At block 991c, the portable playback device 710 performs an action or response corresponding to the current connection mode 880. For instance, if the portable playback device 170 is currently operating in the first connection mode 880a, the portable playback device 710 performs, in response to detecting a trigger event, a particular action or response that corresponds to the first connection mode 880a. The action or response corresponding to the first connection mode 880a is different than the action or response performed if the portable playback device 710 was instead in the second connection mode 880b.

Example trigger events may take various forms. Examples of trigger events may include satisfaction of a particular condition (e.g., reaching a particular battery level, or an error condition) or reaching a particular state (e.g., power-on or an error condition), among other examples. Other example trigger events include detection of user inputs (e.g., gestures) corresponding to particular commands. Other example events triggers are possible as well.

Trigger events may be generated from various sources. User inputs provided to the user interface 713 (FIGS. 7B-7F) on the portable playback device 710 may trigger events. Other trigger events may be generated from user inputs received on a user interface display 431 on a connected mobile device (e.g., the control device 430) (FIGS. 4A-4D). In an example, one or more processes executing on the portable playback device 710 (e.g., a daemon) may monitor for occurrence of events corresponding to trigger events. In other examples, one or more processes of the portable playback device 710 may be configured to generate trigger events when certain trigger events are detected (which may take the form of an interrupt, for example). Other examples are possible as well.

Figure 9B:
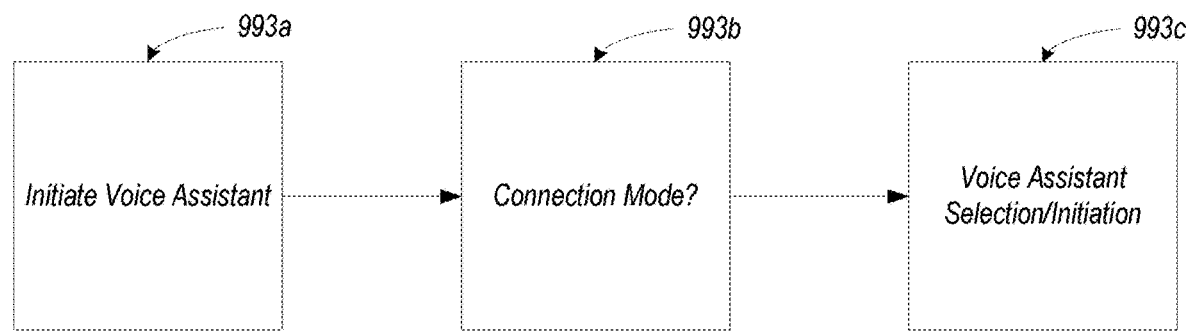
FIG. 9B is a block diagram illustrating an application of the example architecture in accordance with aspects of the disclosed technology.
Figure 9C:
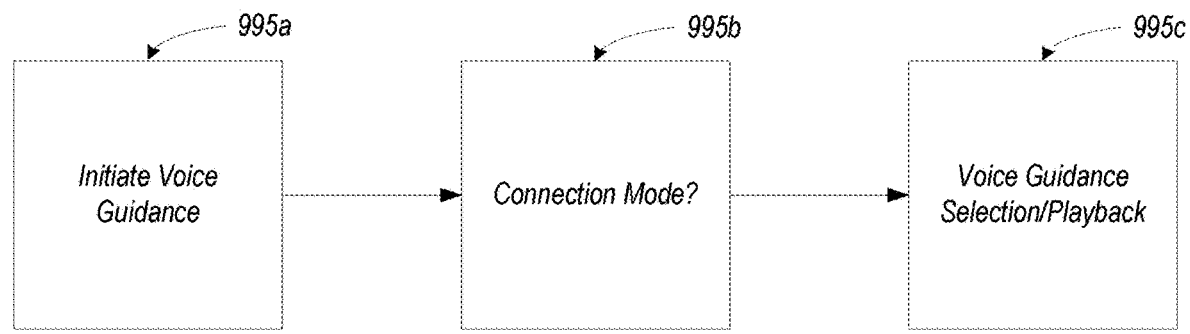
FIG. 9C is a block diagram illustrating another application of the example architecture in accordance with aspects of the disclosed technology.

Example actions or response may take the form of various functions or operations performable by the portable playback device 710. FIGS. 9B and 9C provide respective examples of the model of FIG. 9A applied to example trigger events and corresponding action/responses. These examples are intended to be illustrative of the wide variety of applications of the architecture of FIG. 9A to the myriad ways that the example portable playback devices 710 may alter their operations based on connection mode when detecting an trigger event and performing a corresponding action or response.

More particularly, FIG. 9B is a block diagram illustrating application of the architecture of FIG. 9A to voice processing. At block 993a, the portable playback device 710 detects a trigger event to initiate voice assistance. At block 993b, the portable playback device 710 determines the current connection mode 880 that the portable playback device 710 is operating in. At block 993c, the portable playback device 710 performs selects a voice assistant based on the current connection mode 880 and then initiates voice assistance.

Detecting the trigger event to initiate voice assistance may involve detecting a particular gesture on a user interface (e.g., the user interface 713). In one example gesture model, after detecting a hold down input, the portable playback device 710 plays a chime (to indicate that the hold down was detected), and then listens via one or more microphones for a user utterance. When the user releases the hold down input (i.e., a let go), capturing the user utterance ends. In another example gesture mode, after detecting a hold down input, the portable playback device 710 plays a chime (to indicate that the hold down was detected), and then waits for the user to let go. After the let go is detected, the portable playback device 710 listens via one or more microphones for a user utterance. When no additional speech is detected, capturing the user utterance ends (i.e., the microphone(s) auto close).

While multiple example gesture models are provided by way of example, in example implementations, a single gesture model is used to initiate voice assistance. That is, one user interface affordance is used to access different voice assistants based on the connection mode 880. Such implementations may provide consistency in accessing the various voice assistants supported by the portable playback device 710.

In the first connection mode 880a (e.g., when the portable playback device is connected to a WLAN, a.k.a. Wi-Fi®), the trigger to initiate voice assistance initiates a native voice assistant. As described above in connection with FIG. 1G and FIGS. 3A-3D, the example portable playback device 710 may implement or otherwise include a network microphone device. Using this built-in network microphone device, the portable playback device may capture and process voice inputs natively.

In one example, processing voice inputs natively involves capturing voice data using one or more microphones (e.g., the microphones 115 in FIG. 1F), buffering and conditioning the voice data, and then transmitting data representing the voice input to one or more servers of a voice assistant to perform natural language understanding (NLU) on the voice input. Since transmitting data representing the voice input to one or more servers of a voice assistant involves network (e.g., Internet) connectivity, the portable playback device is able to use the native voice assistant when connected to a WLAN (which is connected to the broader Internet). Accordingly, the trigger to initiate voice assistance initiates the native voice assistant when in the first connection mode 880a.

Conversely, when in the second connection mode 880b (i.e., when the portable playback device 710 is connected to a user's mobile device 130 via a PAN, as illustrated in connection with FIG. 7G), the trigger to initiate voice assistance instead initiates a voice assistant on the mobile device 130. In this case, processing voice inputs involves streaming voice data from the one or more microphones to the user's mobile device via the PAN, which then processes the voice input using the voice assistant on the mobile device 130. In contrast to the portable playback device 710 itself, which may lose Internet connectivity when disconnected from a WLAN, the user's mobile device 130 may maintain a connection to voice assistant servers via a cellular (e.g., 4G or 5G) modem, allowing the mobile device 130 to process voice inputs using cloud-based NLU while "on-the-go."

The native voice assistant of the portable playback device 710 and the voice assistant of the mobile device 130 are not necessarily the same. A user may opt to set-up one voice assistant as the native voice assistant on their portable playback device 710 (e.g., Amazon® Alexa®) and another voice assistant on their mobile device (e.g., Google® or Siri®), or vice versa. Further, even if the same voice assistant service is configured on the portable playback device 710 as on the user's mobile device 130, the portable playback device 710 and the mobile device 130 implement respective instances of the voice assistant, and each function as respective network microphone devices.

Voice assistant set-up may be performed in advance of initiating a voice assistant, and may influence which voice assistant service is invoked in the respective connection modes 880. Setting-up a voice assistant on the portable playback device 710 may involve providing account information (e.g., a user name and password) associated with an account of a voice assistant service via the mobile device 130, which in turn configures the built-in network microphone device on the portable playback device 710 to utilize that voice assistant service. To set up voice assistants on the mobile device 130, a user may provide account information to a system-wide voice assistant (e.g., Siri® on iOS®-based smartphones or Google® on Android® smartphones) or an app-based voice assistant. In some cases, a user may set-up multiple voice assistants on their mobile device 130, possibly designating one as default using a setting (e.g., an operating system setting).

In the concurrent connection mode 880c, the portable playback device may have concurrent access to multiple voice assistants. Yet, attempting to use multiple voice assistants concurrently may cause duplicative or interfering responses. As such, the portable playback device 710 may be configured to initiate one particular voice assistant (e.g., the native voice assistant) when in the concurrent mode 880c.

In some examples, the portable playback device 710 includes local natural language understanding (local NLU) and cloud-based natural language understanding (cloud NLU). For instance, as discussed in connection with FIG. 7H, the portable playback device 710 may include a cloud voice input pipeline 772 to facilitate cloud-based NLU as well as a local voice input pipeline 777 to facilitate local NLU.

The NLU selection between cloud NLU and local NLU may be based on the connection mode. That is, in some examples, after invoking voice assistance, the portable playback device may select between cloud NLU and local NLU based on the connection mode 880 according to the model of FIG. 9B. Such selection may be performed in addition to, or as an alternative to, selection between the native voice assistant and the voice assistant on the mobile device 130 described above.

For instance, while in the first connection mode 880a, the portable playback device 710 may be configured to select one of local or cloud NLU. For instance, since cloud NLU is available in the first connection mode 880a, the portable playback device 710 may select the cloud NLU in the first connection mode 880a. Alternatively, the portable playback device 710 may be configured to select the local NLU in the first connection mode 880a, perhaps to maintain privacy of voice inputs or to hasten response.

Alternatively, while in the first connection mode 880a, the portable playback device 710 may be configured to operate in a hybrid of local NLU and cloud NLU. For instance, in the first connection mode 880a, the portable playback device 710 may select the native voice assistant, which may include cloud NLU (e.g., the cloud voice input pipeline 772) and local NLU (e.g., the local voice input pipeline 777). Conversely, in the second connection mode 880b, the portable playback device 710 may select the voice assistant on the mobile device 130, which may include only cloud NLU, or may implement cloud NLU as well as local NLU on the mobile device 130.

After selecting a voice assistant, the portable playback device 710 may further select between local NLU and cloud NLU within that voice assistant. For instance, while in the first connection mode, the portable playback device 710 may further select between local NLU and cloud NLU based on type or domain of voice commands. The local NLU may be configured to recognize keywords only in a particular domain (or domains) (such as audio playback).

Limiting the local NLU to a particular domain (or domains) may maintain or enhance portability, as less processing and data storage is involved with handling voice input in a limited set of domains as compared with general queries. As such, the local NLU may be selected when one of these keywords is recognized, and the local NLU may process the voice input in this domain. Otherwise, the cloud NLU is selected for processing of the voice input. In this manner, the local NLU of the portable playback device 710 may fall back to a more capable cloud NLU when the local NLU is not capable of processing the voice input. Example hybrid processing of voice inputs is described in U.S. Pat. No. 10,466,962, filed on Sep. 29, 2017, and titled "Media Playback System with Voice Assistance," as well as U.S. patent application Ser. No. 16/723,909 filed on Dec. 20, 2019, and titled "Offline Voice Control," which are both incorporated by reference herein in their entirety.

As another example of a particular domain, a local NLU may be configured to recognize keywords corresponding to control of a specific app. For instance, a streaming music service app may be associated with keywords corresponding to commands in the audio playback control domain. A smart home app (e.g., for control of smart lights, switches, or appliances) would be associated with keywords corresponding to commands to control those IoT devices (e.g., to turn them on or off, or to modify their operation). Other examples are possible as well.

In another example, the portable playback device 710 may select the cloud NLU when available, and otherwise select the local NLU. In other words, the portable playback device may prefer the cloud NLU, and fall back to the local NLU when the cloud NLU is not able to process the input. For instance, while in the first connection mode 880a, the portable playback device 710 may be connected to a WLAN, but the WLAN is not connected to the broader Internet (e.g., because of an ISP issue or the like), which prevents the portable playback device 710 from reaching the cloud NLU. In such situations, the portable playback device 710 may select the local NLU.

In the second connection mode 880b (e.g., while connected to a personal area network and the mobile device 130), the portable playback device 710 may select between the cloud NLU associated with the voice assistant on the mobile device and local NLU on the portable playback device 710 (and/or local NLU on the mobile phone 130). In some cases, the portable playback device 710 selects between cloud and local NLU based on similar considerations as the first connection mode 880b (e.g., always select one mode, or a hybrid, perhaps with fallback). For instance, to conserve battery life on the portable playback device 710 (or the mobile phone 130) (e.g., while "on the go"), the portable playback device 710 may be configured to always use cloud NLU, which may use less power than local NLU. As another example, to conserve data, the portable playback device may select or prefer the local NLU. Alternatively, the portable playback device 710 may use local NLU for certain commands such as playback transport commands (e.g., play, pause, skip, previous), and cloud NLU for more general queries (e.g., queries appropriate for a non-domain specific voice assistant, such as "what is the weather").

In the concurrent connection mode 880c, the portable playback device 710 may have multiple different NLU available. These include local and cloud NLU of the native voice assistant, as well as cloud NLU and/or local NLU of the voice assistant on the mobile device 130. In an example, as noted above, while in the concurrent connection mode 880c, the portable playback device 710 may be configured to initially select the native voice assistant. Then, the portable playback device 710 may select between local and cloud NLU in a similar manner as the first connection mode 880a. In some implementations, in the concurrent connection mode 880c, the portable playback device 710 may additionally fall back to the voice assistant associated with the mobile device 130.

FIG. 9C is a block diagram illustrating application of the architecture of FIG. 9A to voice guidance. At block 995a, the portable playback device 710 detects a trigger event to initiate voice guidance. At block 995b, the portable playback device 710 determines the current connection mode 880 that the portable playback device 710 is operating in. At block 995c, the portable playback device 710 performs plays back particular voice guidance based on the current connection mode 880.

Within examples, voice guidance on the portable playback device 710 may take the form of voice guidance messages (e.g., recorded or generated speech) or earcons, which are brief, distinctive sounds that represent a specific event or other information. In some cases, the portable playback device 710 is selectable between voice guidance messages and earcons (and possibly no voice guidance). In other cases, the portable playback device 710 outputs voice guidance messages in response to some trigger events and earcons in response to other trigger events. Voice guidance messages and earcons are reference to collectively as voice guidance, or voice guidance indicators.

Various trigger events may trigger voice guidance. Some trigger events are generated when the portable playback device 710 reaches certain states related to power, battery status, connection status, voice assistant availability, set-up, or error conditions. The portable playback device may be configured to generate events corresponding to such conditions, which in turn triggers voice guidance.

Other trigger events correspond to "play once" conditions, where the portable playback device 710 will play voice guidance once to explain an operation or condition, and then forego playing the voice guidance again. Example play once conditions include initial power-on, which may trigger a welcome message, or initial connection lost, which may provide an explanation indicating that an audio stream stopped because a WLAN or PAN connection was lost. Subsequent occurrences of this condition may trigger different voice guidance (e.g., an earcon).

Other voice guidance is triggered when certain user input is provided. Example inputs detectable by the portable playback device 710 include input corresponding to transport controls (e.g., play, pause, skip, etc.), playback swap (i.e., moving a playback session between the portable playback device 710 and one or more of the playback devices 110), or initiating voice assistance. Other examples are possible as well, such as input to activate active noise cancelling, or input associated with telephony (e.g., input to pick up or hang up a telephone call on the mobile device 130 when the portable playback device 710 is being used as a headset.

Voice guidance output in response to condition or state trigger events is configured to guide or notify the user of the corresponding condition or state, as well as associated conditions. As noted above, some events are associated with power conditions, such as power up, power off, or a power-on error (e.g., not enough battery life to power on). For instance, during power-up, the portable playback device 710 may playback a sequence of voice guidance indicators, including a power-on indicator, battery status indicator, connection successful indicator, Bluetooth® connection status indicator, Wi-Fi® connecting indicator, Wi-Fi® connection successful indicator, and voice assistant availability indicator.

For some of these indicators, the specific indicator selected for output by the portable playback device is based on the connection mode 880 that the portable playback device is operating in. For instance, continuing some of the examples in the above sections, when in the first connection mode 880a, the Bluetooth® connection status indicator indicates that Bluetooth® is not connected and the Wi-Fi® connection successful indicator indicates that Wi-Fi® is connected. Further, the voice assistant availability indicator indicates that the native voice assistant is available. As another example, in the second connection mode 880b, the Bluetooth® connection status indicator indicates that Bluetooth® is connected, the Wi-Fi® connection successful indicator indicates that Wi-Fi® is not connected, and the voice assistant availability indicator indicates that the voice assistant on the user's mobile device 130 is available. Further, in the concurrent connection mode 880c, the Bluetooth® connection status indicator indicates that Bluetooth® is connected, the Wi-Fi® connection successful indicator indicates that Wi-Fi® is connected, and the voice assistant availability indicator indicates that the native voice assistant is available.

As connections are established and lost, and the portable playback device switches among the modes (e.g,. as illustrated in FIG. 8), the portable playback device may output status messages. For instance, when connecting to a WLAN (and thereby switching from the second connection mode 880c to the first connection mode 880a or the concurrent connection mode 880c), the portable playback device 710 may select and output voice guidance indicating that Wi-Fi® is connected. Further, based on this same trigger event (i.e., connecting to a WLAN), the portable playback device 710 may select and output voice guidance that the native voice assistant is available. Similar voice guidance indicating connection state and voice guidance availability may be selected and output based on switching to the other connection modes 880.

Certain features might not be available in certain modes. For instance, playback swap may be available only in the first connection mode 880a, as such a feature may involve communication with other playback devices 110 over a common WLAN. In the first connection mode 880a, the portable playback device 710 may select voice guidance indicators that guide and inform the user of stages in the swap, such as a swap initiated voice guidance and a swap completed voice guidance (e.g., sound was moved to/from indicators (e.g., push or pull)). Conversely, in the second connection mode, when detecting user input to perform a swap, this trigger event may cause the portable playback device 710 to output voice guidance indicating an error (e.g,. a voice guidance message indicating that swap is not available and to connect to Wi-Fi® to perform a swap). Example techniques related to playback swap are described in U.S. patent application Ser. No. 16/805,130, filed on Feb. 28, 2020, and titled "Playback Transitions," which is incorporated by reference herein in its entirety.

VI. Example Techniques

Figure 10:
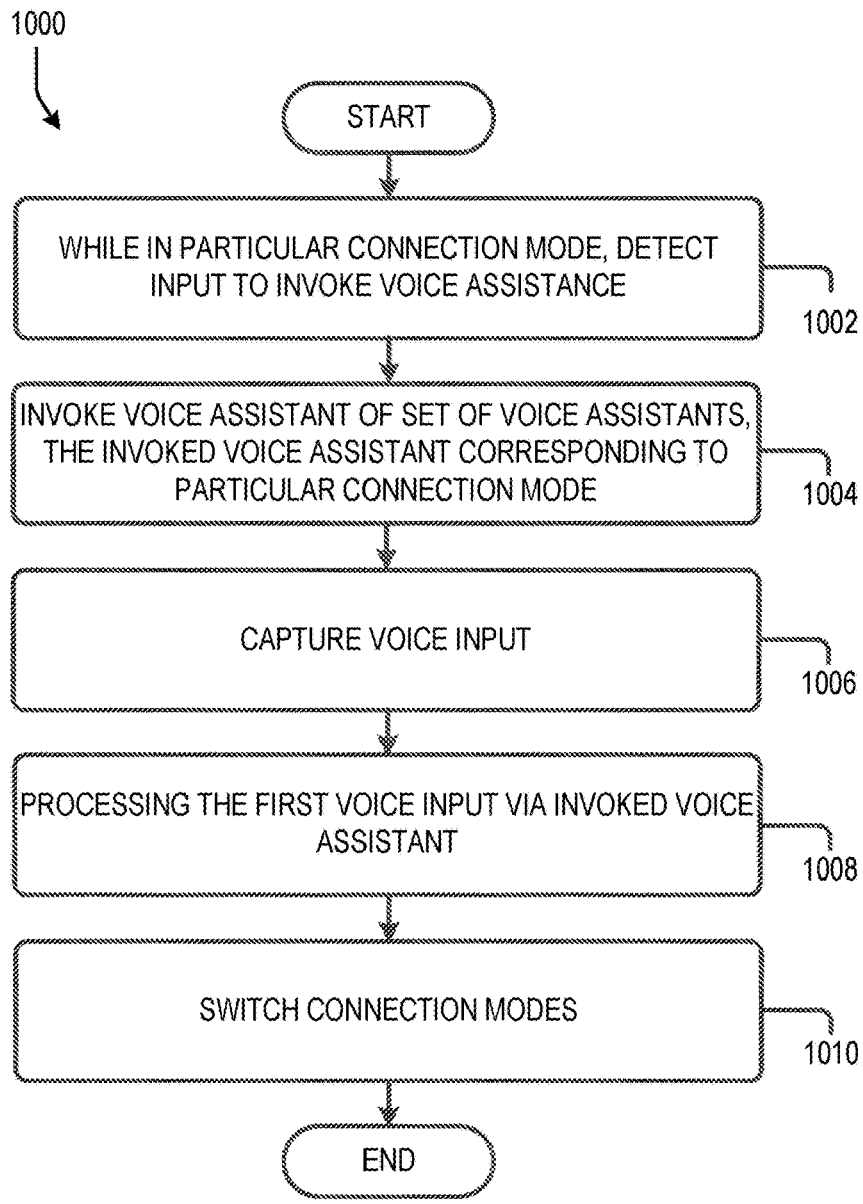
FIG. 10 is a flow diagram of an example method in accordance with aspects of the disclosed technology.

FIG. 10 is a flow diagram showing an example method 1000 to invoke a voice assistant based on connection mode. The method 1000 may be performed by a portable playback device 710. Alternatively, the method 1000 may be performed by any suitable device or by a system of devices, such as the playback devices 110, NMDs 120, control devices 130, portable playback device 1720, or computing devices 106. By way of illustration, certain portions of the method 1000 are described as being performed by a portable playback device 710.

At block 1002, the method 1000 involves while in a particular connection mode of a set of connection modes, detecting an input to invoke voice assistance. For example, while in the first connection mode 880a of the connection modes 880 (FIG. 8), the portable playback device 710 (FIGS. 7A-7H) may detect a first input representing a command to invoke voice assistance. An example input is a gesture provided via the user interface 713 (FIGS. 7A-7H).

At block 1004, the method 1000 involves invoke a voice assistant of a set of voice assistants. The invoked voice assistant corresponds to the particular connection mode. For instance, while in the first connection mode 880*a* of the connection modes 880 (FIG. 8), the portable playback device 710 may invoke a first voice assistant, which may be, for example, a native voice assistant of the portable playback device 710 (such as the NMD 720 of FIG. 7H).

At block 1006, the method 1000 involves capturing a voice input. For instance, the NMD 720 of the portable playback device 710 may capture a first voice input using at least one microphone (e.g., the microphones 715 in FIG. 7H). Capturing the first voice input may involve buffering the voice input (e.g., via the buffers 768) and/or conditioning the voice input (e.g., via the VCC 760).

At block 1008, the method involves processing the voice input via the invoked voice assistant. For instance, the portable playback device 710 may process the first voice input using the native voice assistant of the portable playback device 710 when in the first connection mode 880*a*. The portable playback device may process the first voice input using local NLU or cloud NLU, as described in connection with FIG. 9B. For instance, the NMD 720 of the portable playback device 710 may process the first voice input using the cloud voice input pipeline 772 (and a cloud-based voice assistant service) or the local voice input pipeline 777.

At block 1010, the method involves switching connection modes. For instance, the portable playback device 710 may switch from the first connection mode 880*a* to the second connection mode 880*b* (FIG. 8). As discussed in preceding sections, the portable playback device 710 may switch connection modes when connecting to or disconnecting from different types of networks (FIG. 8).

After switching to another connection mode, the method 1100 may further involve processing one or more additional voice inputs. For instance, while in the second connection mode 880*b*, the portable playback device 710 may detect a second input to invoke voice assistance. In response to detecting the second input, the portable playback device 710 may invoke a second voice assistant, such as a voice assistant on a mobile device 130 that is connected to the portable playback device 710. After invoking the second voice assistant, the portable playback device 710 may capture a second voice input via the at least one microphone and process the second voice input via the second voice assistant. Processing the second voice input via the second voice assistant may involve sending, over a personal area network to the mobile device 130, data representing the second voice input for processing of the second voice input.

Figure 11:
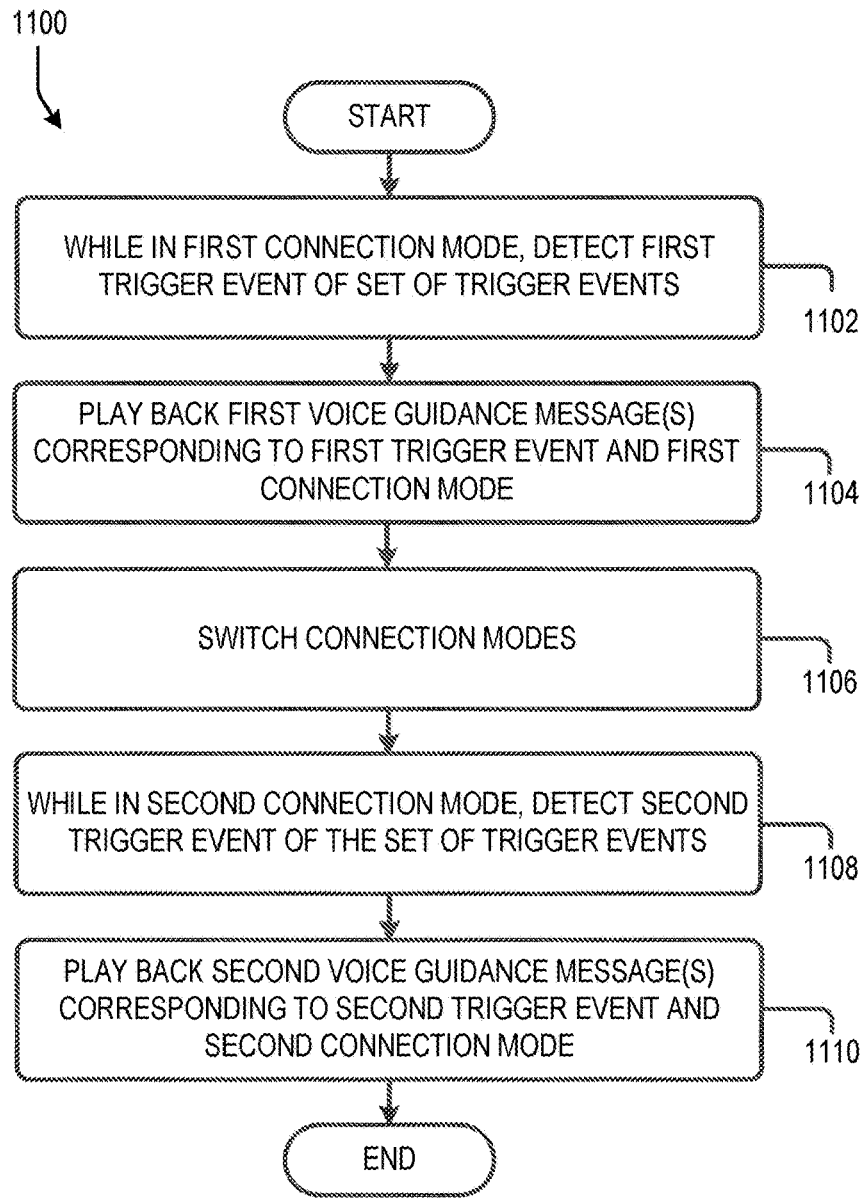
FIG. 11 is a flow diagram of another example method in accordance with aspects of the disclosed technology.

FIG. 11 is a flow diagram showing an example method 1100 to initiate voice guidance based on connection mode. The method 1100 may be performed by a portable playback device 710. Alternatively, the method 1100 may be performed by any suitable device or by a system of devices, such as the playback devices 110, NMDs 120, control devices 130, portable playback device 1720, or computing devices 106. By way of illustration, certain portions of the method 1100 are described as being performed by a portable playback device 710.

At block 1102, the method 1000 involves while in a first connection mode, detecting a first trigger event of a set of trigger events. For instance, while in the first connection mode 880*a* of the set of connection modes 880 (FIG. 8), a first portable playback device 710 may detect a first trigger event of a set of trigger events. Example trigger events are described above in connection with FIG. 9C, as well as throughout the disclosure.

At block 1104, the method 1100 involves playing back one or more first voice guidance messages corresponding to the first trigger event and the first connection mode. For example, in response to detecting the first trigger event, the portable playback device 710 plays back one or more first vocal guidance messages via the at least one audio transducer. The one or more first vocal guidance messages correspond to (a) the first trigger event and (b) the first connection mode. For instance, a trigger event may trigger one or more voice guidance messages indicating status of the portable playback device, and the particular status message selected may represent connection status and voice assistant availability, which depend on the current connection mode 880. Other examples are described in connection with FIG. 9C, as well as throughout the disclosure.

Yet further, as noted in the preceding section, the portable playback device 710 may be selectable between outputting voice guidance messages or earcons. These options may be referred to as audio guidance modes (e.g., a default or full mode for voice message messages, a brief mode for earcon, and perhaps an off mode to disable voice guidance). In an example, the selected voice guidance messages may further depend on the audio guidance mode. For example, instead of playing back a voice guidance message indicating that the native voice assistant is available, the portable playback device 710 may instead, in the brief audio guidance mode, play back a particular earcon indicating the same. In another example, the first time a voice guidance message or earcon is used the portable playback device 710 might use the full mode, and after the first time, change to using the brief mode or off mode.

At block 1106, the method 1100 involves switching connection modes. For instance, the portable playback device 710 may switch to the second connection mode 880*b* (FIG. 8). Alternatively, the portable playback device 710 may switch to another connection mode 880 (e.g., the concurrent connection mode 880*c*).

At block 1108, the method 1100 involves while in the second connection mode, detecting a second trigger event of the set of trigger events. For instance, while in the second connection mode 880*b* of the set of connection modes 880 (FIG. 8), the first portable playback device 710 may detect a second trigger event of the set of trigger events. Example trigger events are described above in connection with FIG. 9C, as well as throughout the disclosure.

At block 1110, the method 1100 involves playing back one or more second voice guidance messages corresponding to the second trigger event and the second connection mode. For example, in response to detecting the second trigger event, the portable playback device 710 plays back one or more second vocal guidance messages via the at least one audio transducer. The one or more second vocal guidance messages correspond to (a) the second trigger event and (b) the second connection mode (and possible also the current audio guidance mode). Examples are described in connection with FIG. 9C, as well as throughout the disclosure.

VII. Additional Playback Device Examples

Figure 12A:
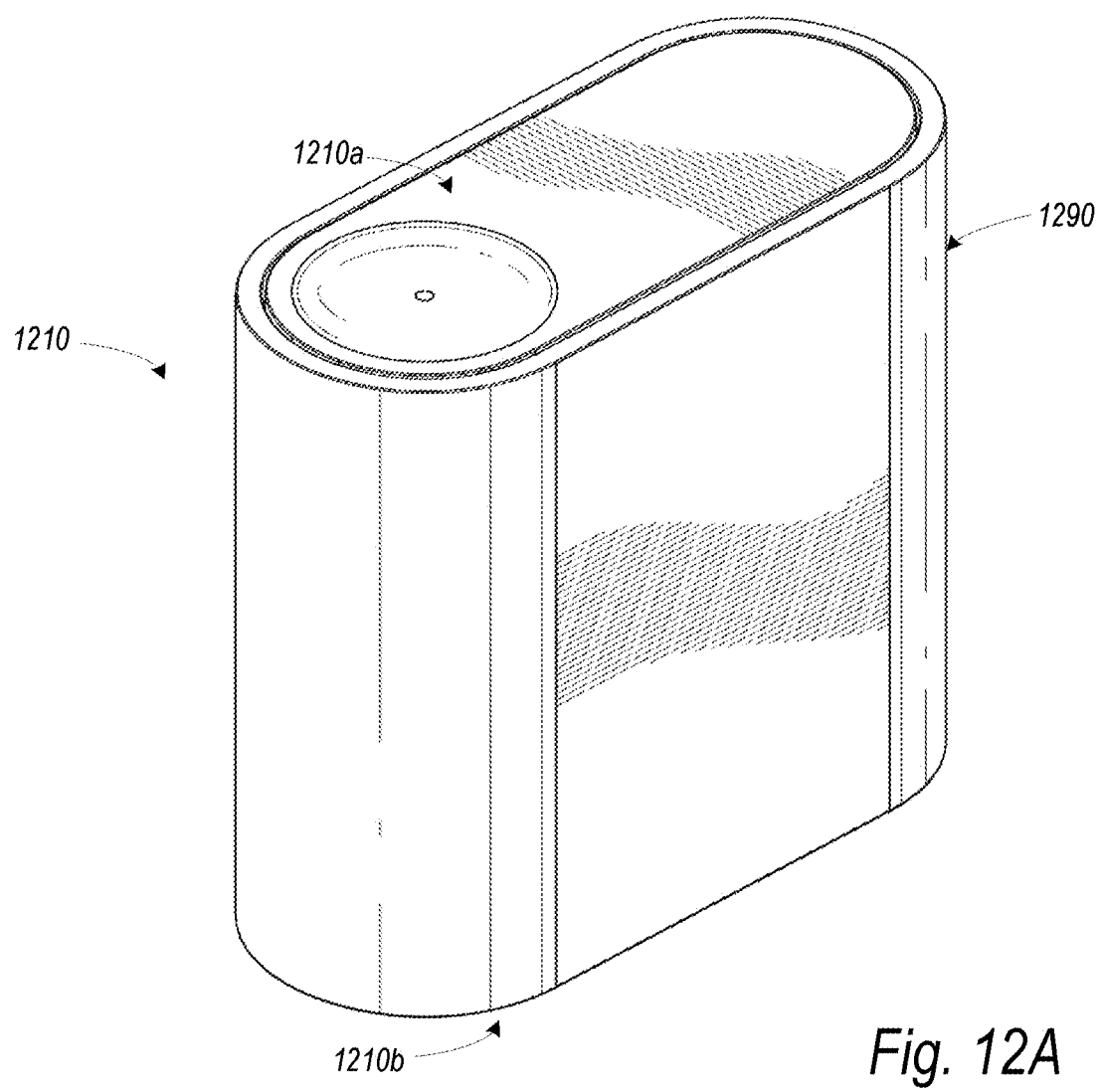
FIG. 12A is a front isometric view of earbuds configured in accordance with aspects of the disclosed technology.

FIG. 12A is a front isometric view of earbuds 1210 including an earbud 1210*a* and an earbud 1210*b* configured in accordance with aspects of the disclosed technology. As shown, the earbuds 1200 are carried in a charging case 1290.

Figure 12B:
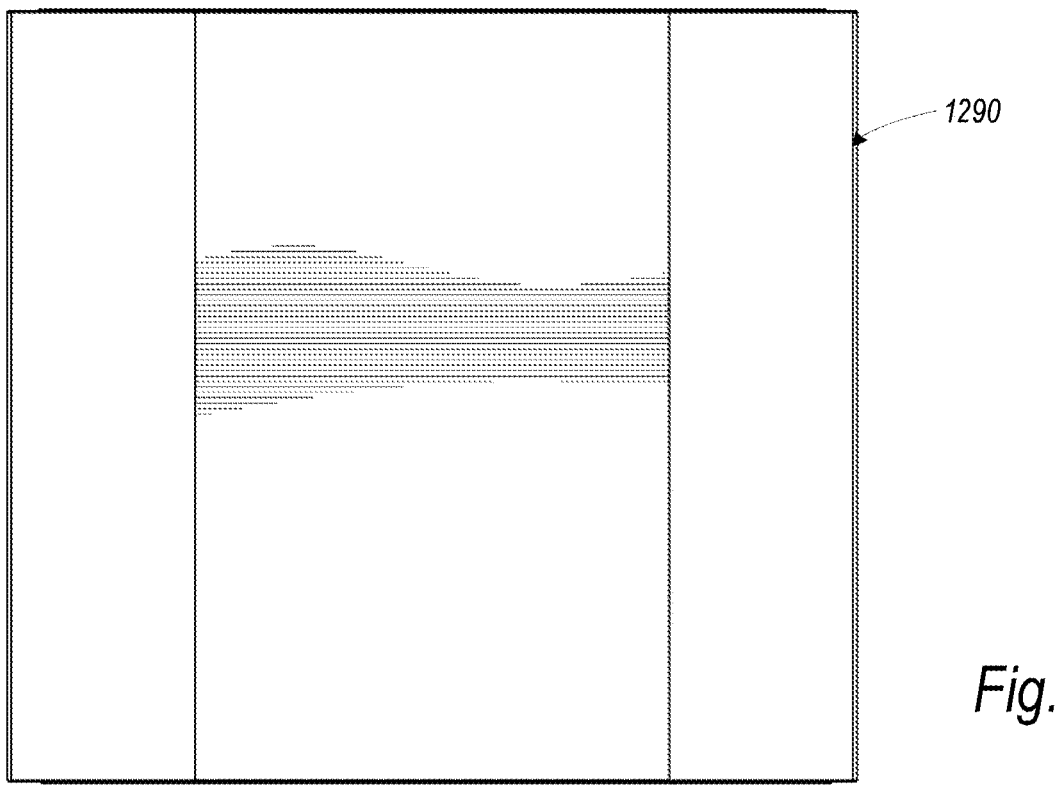
FIG. 12B is a bottom view of a charging case configured in accordance with aspects of the disclosed technology.

FIG. 12B is a bottom view of the charging case 1290.

Figure 12C:
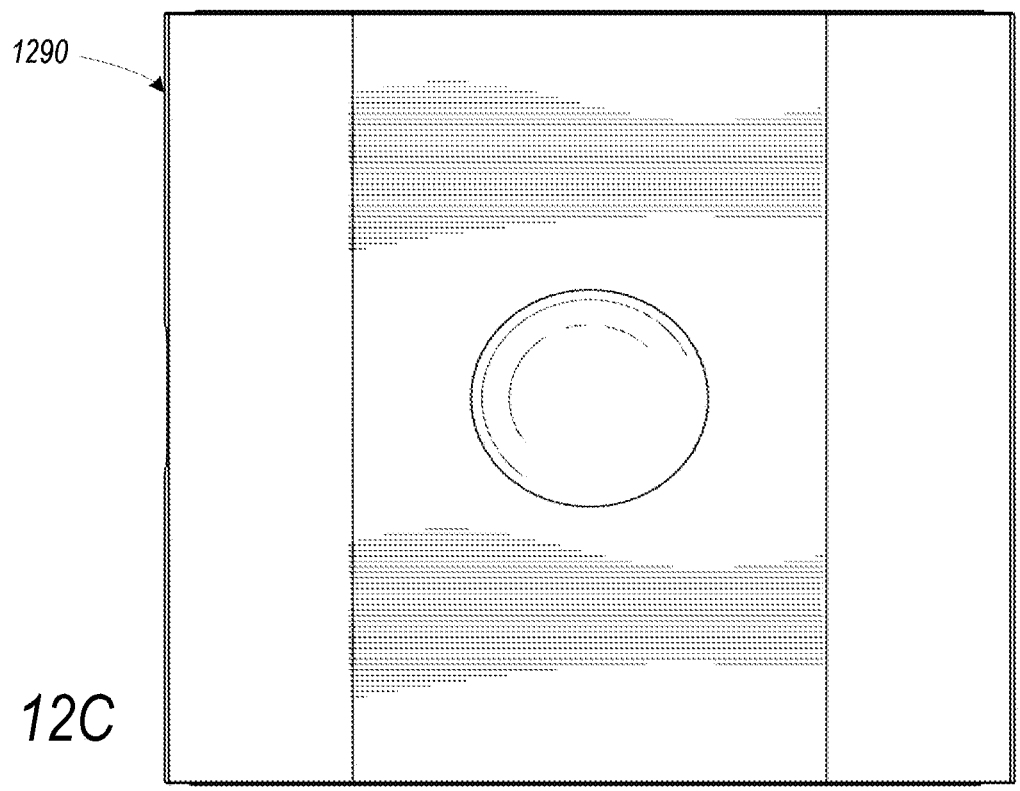
FIG. 12C is a top view of the charging case.

FIG. 12C is a top view of the charging case 1290.

Figure 12D:
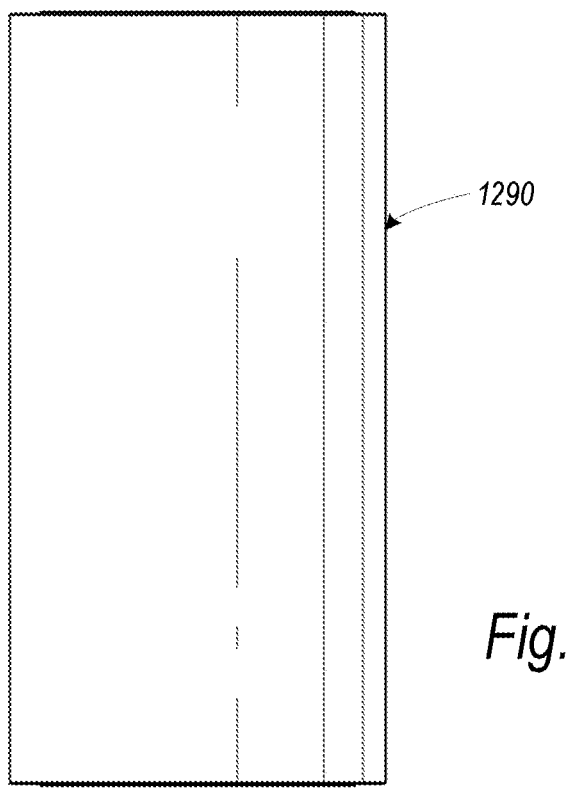
FIG. 12D is a first side view of the charging case.

FIG. 12D is a first side view of the charging case 1290.

Figure 12E:
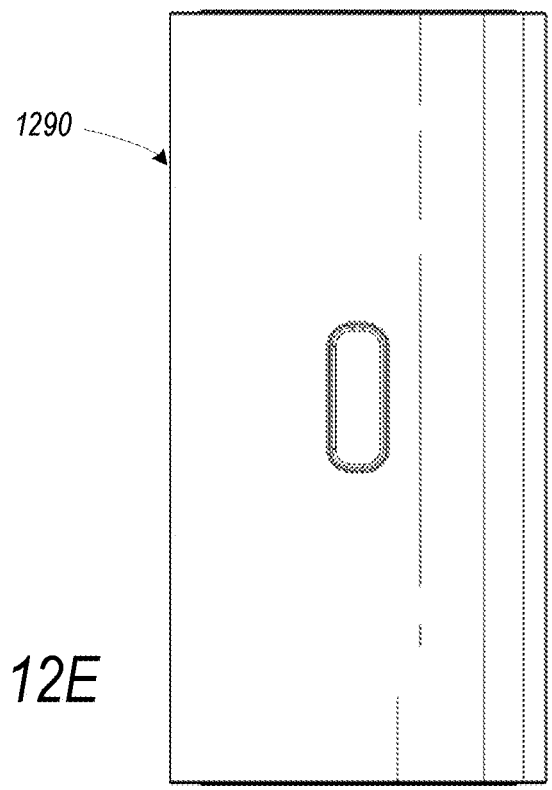
FIG. 12E is a second side view of the charging case.

FIG. 12E is a second side view of the charging case 1290.

Figure 12F:
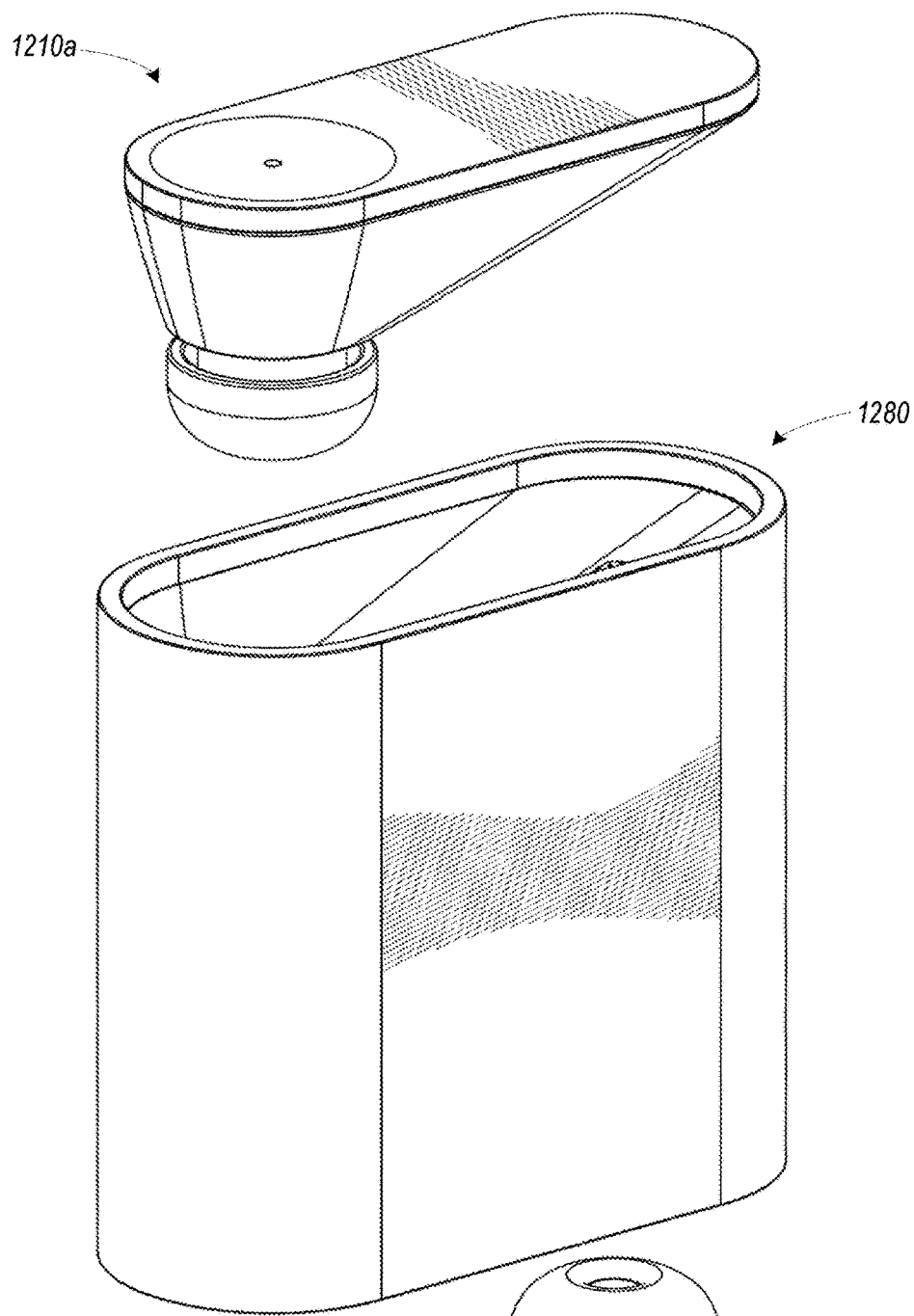
FIG. 12F is a front isometric view of earbuds illustrating exemplary arrangement with the charging case.
Figure 12F:
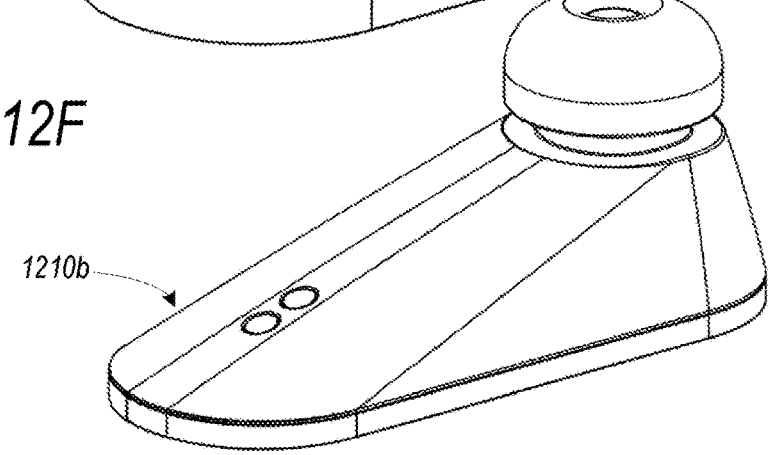
Figure 12G:
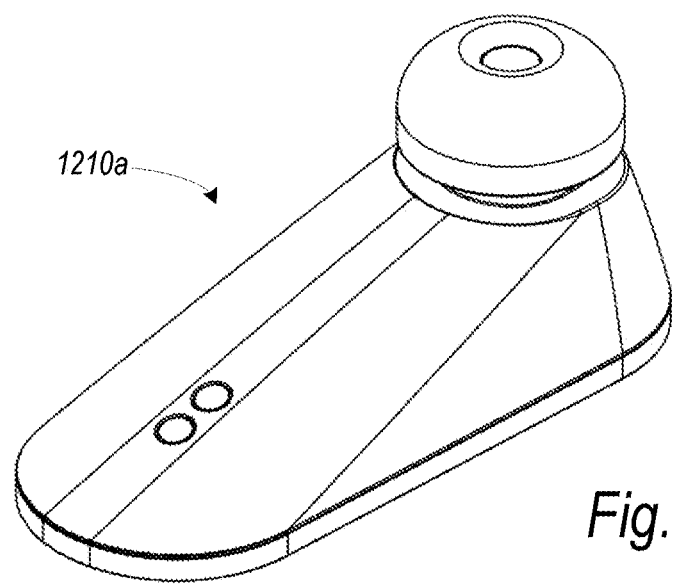
FIG. 12H is a first side view of the earbud.
FIG. 12I is a second side view of the earbud.
FIG. 12J is a third side view of the earbud.
FIG. 12K is a fourth side view of the earbud.
FIG. 12L is a fifth side view of the earbud.
FIG. 12M is a sixth side view of the earbud.

FIG. 12F is a front isometric view of the earbud 1210a and the earbud 1210b illustrating exemplary arrangement with the charging case 1290.

FIG. 12F is an isometric view of the earbud 1210a.

Figure 12H:
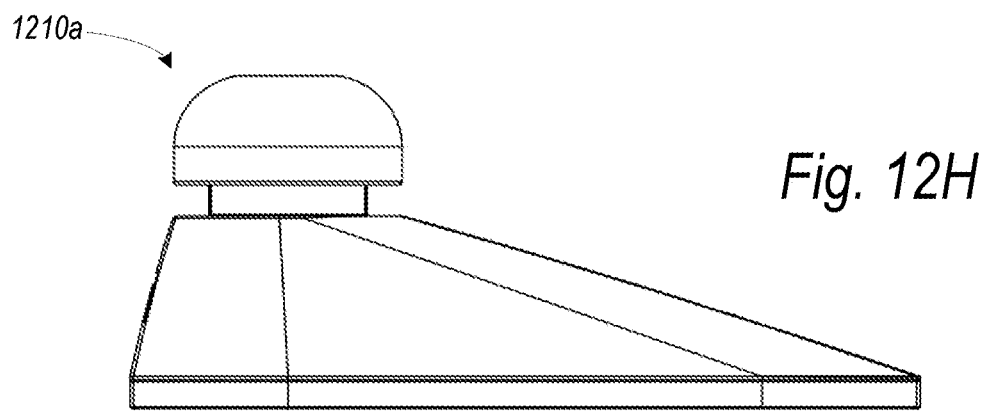

FIG. 12H is a first side view of the earbud 1210a.

Figure 12I:
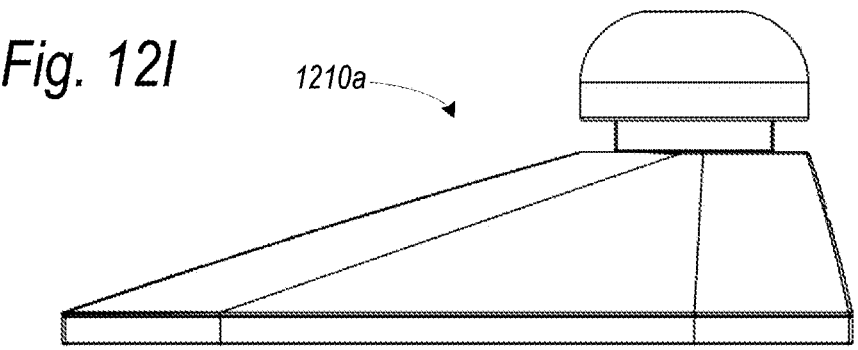

FIG. 12I is a second side view of the earbud 1210a.

Figure 12J:
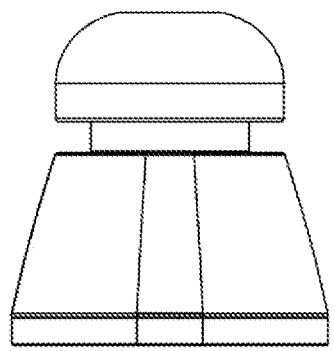

FIG. 12J is a third side view of the earbud 1210a.

Figure 12K:
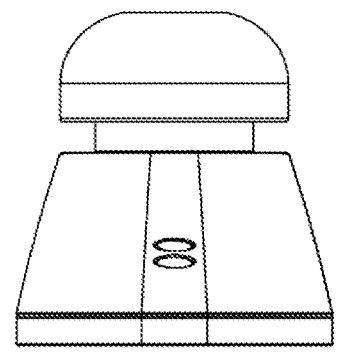

FIG. 12K is a fourth side view of the earbud 1210a.

Figure 12L:
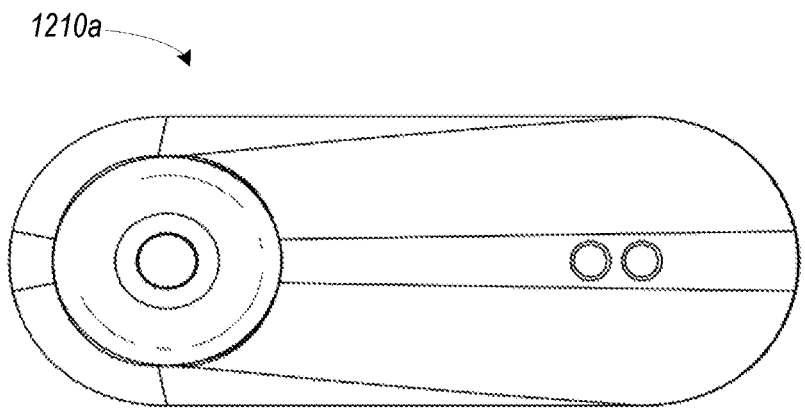

FIG. 12L is a fifth side view of the earbud 1210a.

Figure 12M:
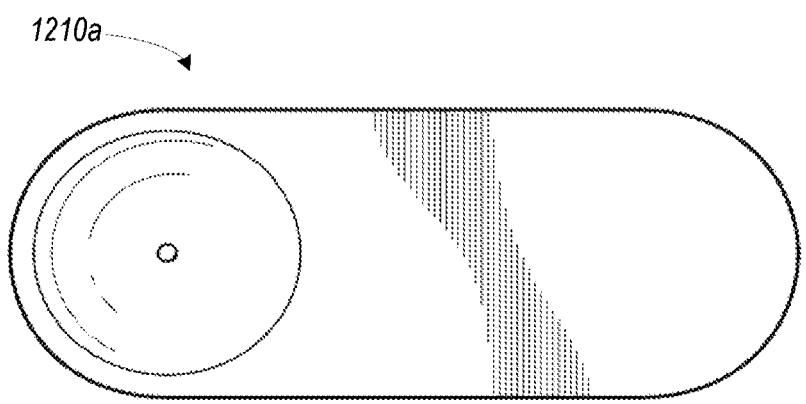

FIG. 12M is a sixth side view of the earbud 1210a.

Figure 13A:
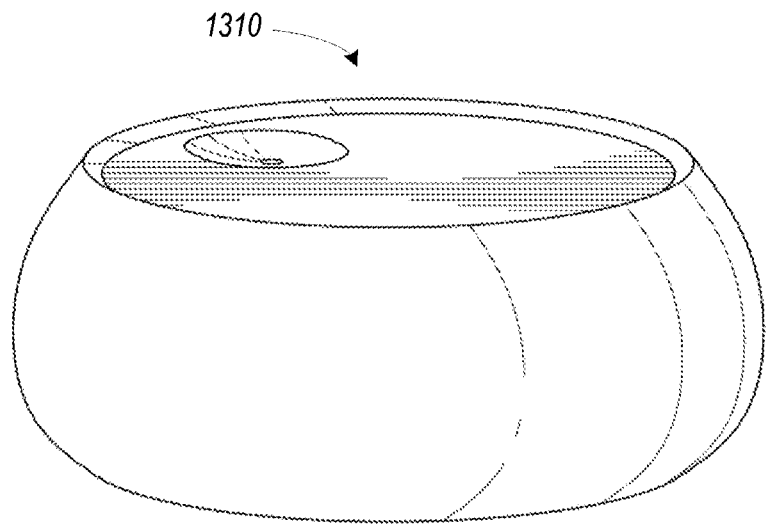
FIG. 13A is a front isometric view of a portable playback device implemented as a handheld speaker configured in accordance with aspects of the disclosed technology.

FIG. 13A is a front isometric view of a portable playback device 1310 implemented as a handheld speaker configured in accordance with aspects of the disclosed technology.

Figure 13B:
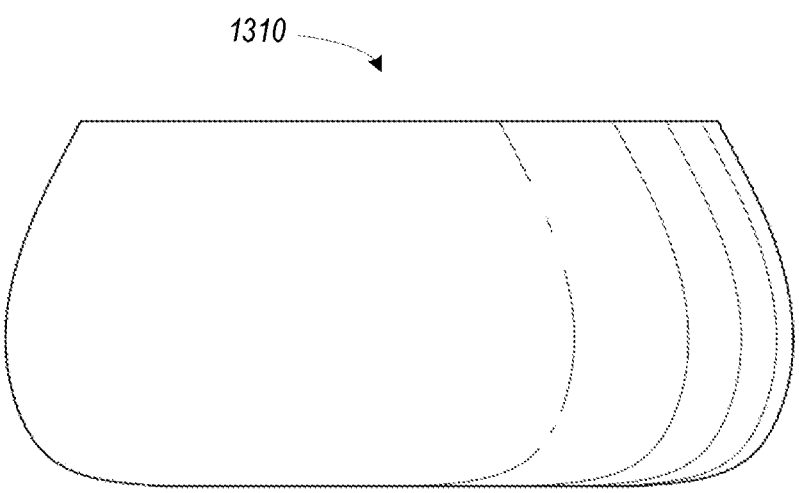
FIG. 13B is a side view of the portable playback device.

FIG. 13B is a side view of the portable playback device 1310.

Figure 13C:
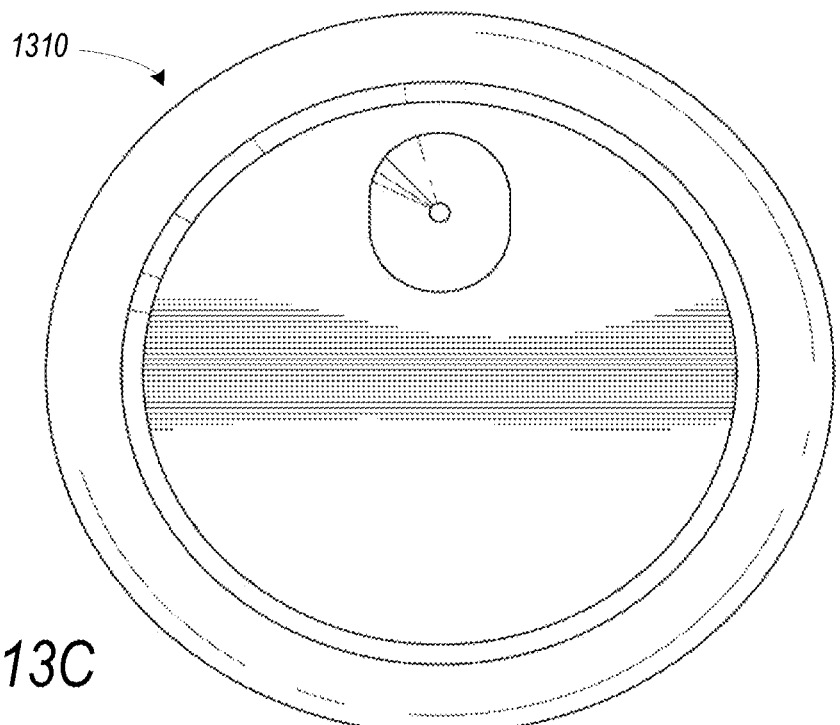
FIG. 13C is a top view of the portable playback device.

FIG. 13C is a top view of the portable playback device 1310.

Figure 13D:
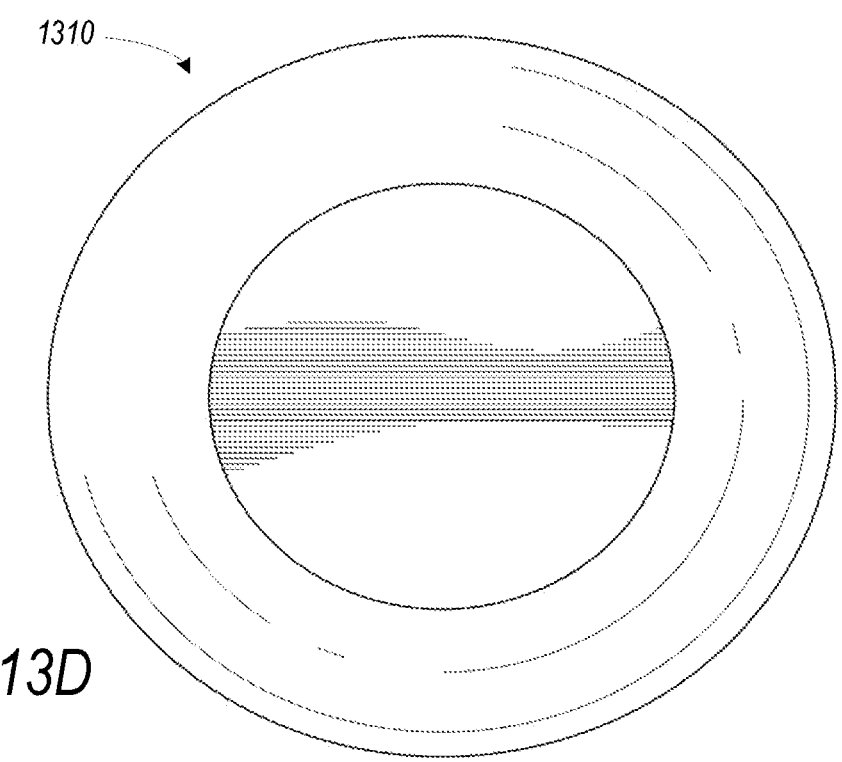
FIG. 13D is a bottom view of the portable playback device.

FIG. 13D is a bottom view of the portable playback device 1310.

Figure 13E:
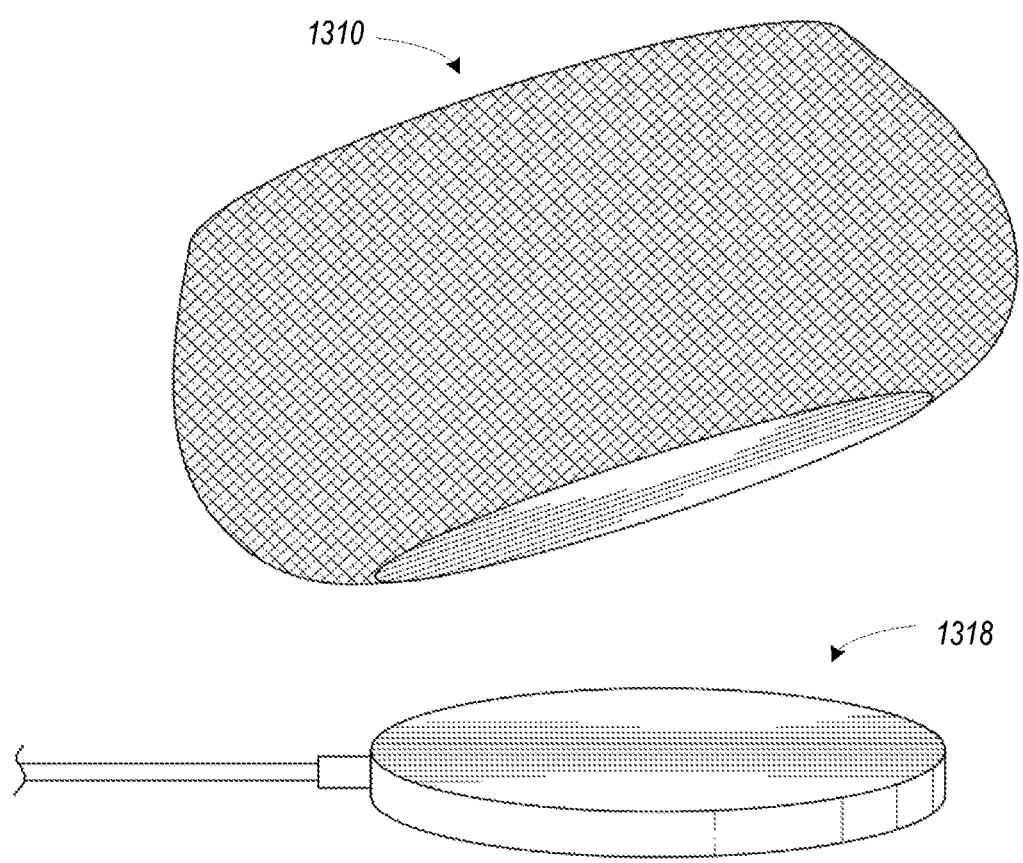
FIG. 13E is a front isometric view of the portable playback device illustrating exemplary arrangement with a device base.

FIG. 13E is a front isometric view of the portable playback device 1310 illustrating exemplary arrangement with a device base 1318.

Figure 13F:
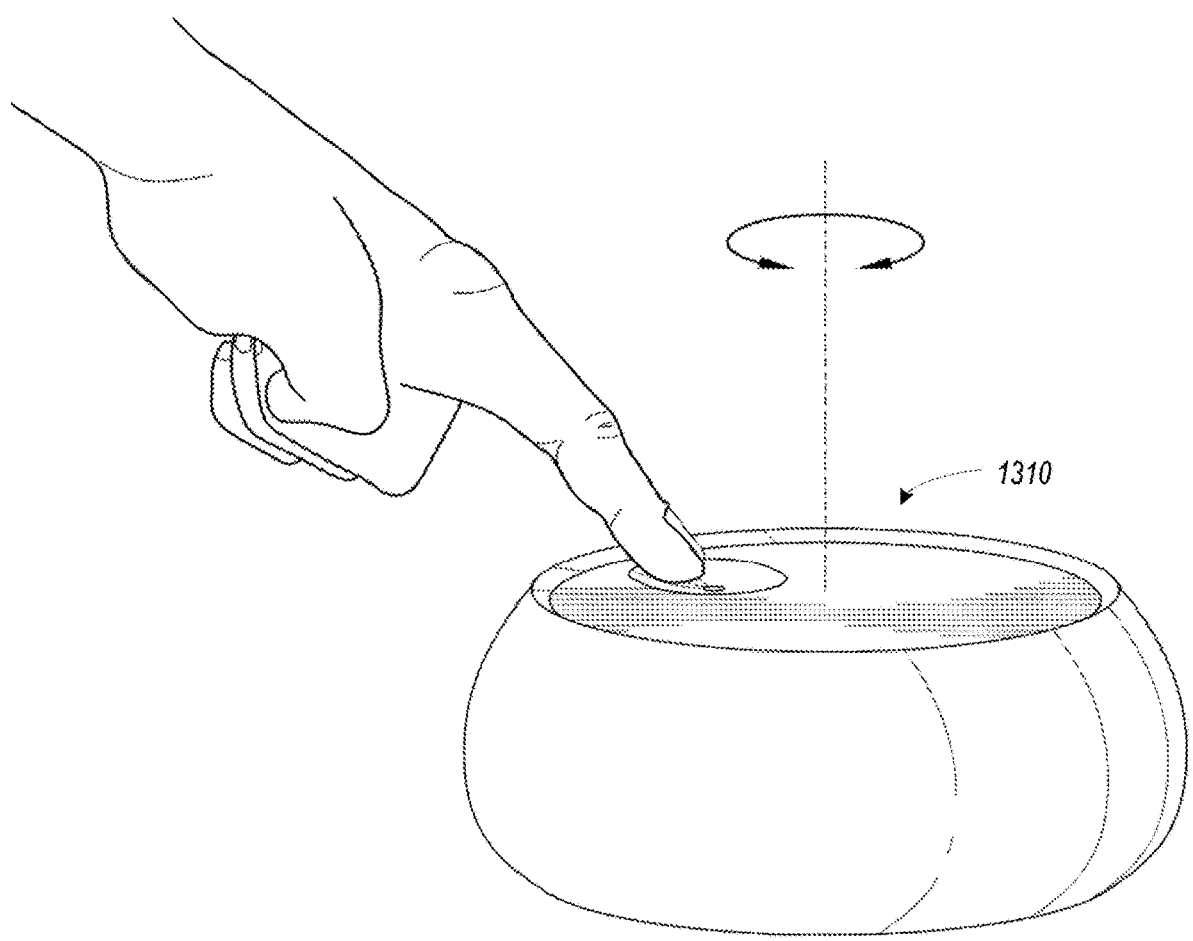
FIG. 13F is a front isometric view of the portable playback device illustrating exemplary user inputs to the portable playback device.

FIG. 13F is a front isometric view of the portable playback device 1310 illustrating exemplary user inputs to the portable playback device 1310.

FIG. 14A is a front view of headphones 1410 configured in accordance with aspects of the disclosed technology.

FIG. 14B is a first side view of the headphones 1410.

FIG. 14C is a second side view of the headphones 1410.

FIG. 15A is a front view of headphones 1510 configured in accordance with aspects of the disclosed technology.

FIG. 15B is a first side view of the headphones 1510.

FIG. 15C is a second side view of the headphones 1510.

VIII. Example User Interface for Voice Interactions

Figure 16A:
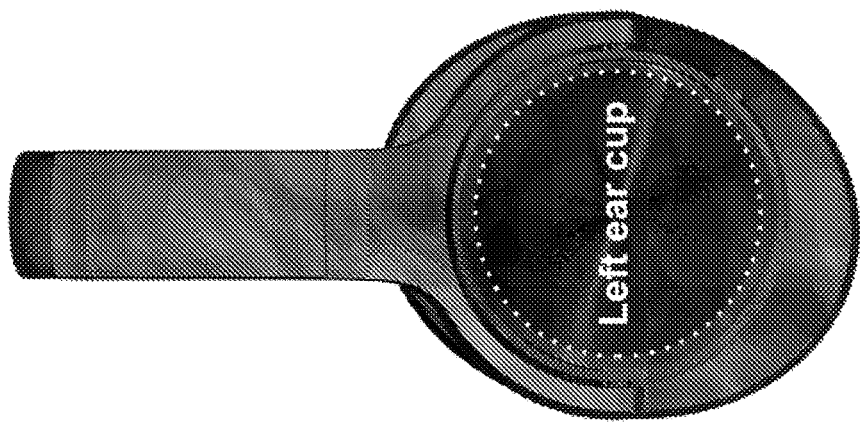
FIG. 16A is a diagram illustrating an example user interface for voice interactions on headphones.

To illustrate, FIG. 16A is a diagram further illustrating the example user interface for voice interactions on headphones. In particular, FIG. 16A shows an example UI affordance on the left ear cup of the headphones. In particular, the UI affordance on the left ear cup is a touch-sensitive surface. In this example, all of the UI interaction for voice is via the single UI affordance. The headphones may include other UI affordances for other types of controls, such as playback and volume controls.

The functionality of the UI affordance changes to access different voice assistants based on the connection state. When the headphones are connected to a mobile device via Bluetooth, the UI affordance is configured to initiate and control interactions with the native voice assistant of the mobile device. Conversely, when the headphones are connected to Wi-Fi (either alone or concurrently with Bluetooth), the UI affordance is configured to initiate and control interactions with the native voice assistant of the headphones.

As discussed above, different UI models may include different techniques for accessing multiple voice assistants. For instance, a portable playback device, such as the headphones 710a, may include one UI affordance (e.g., the user interface 713) to access multiple voice assistants, but use different gestures on the UI affordance to access the respective voice assistants. Alternatively, the portable playback device may include separate UI affordances for each voice assistant. Yet further, a user may pre-select a single voice assistant, then use a single UI affordance to access the selected voice assistant.

Figure 16B:
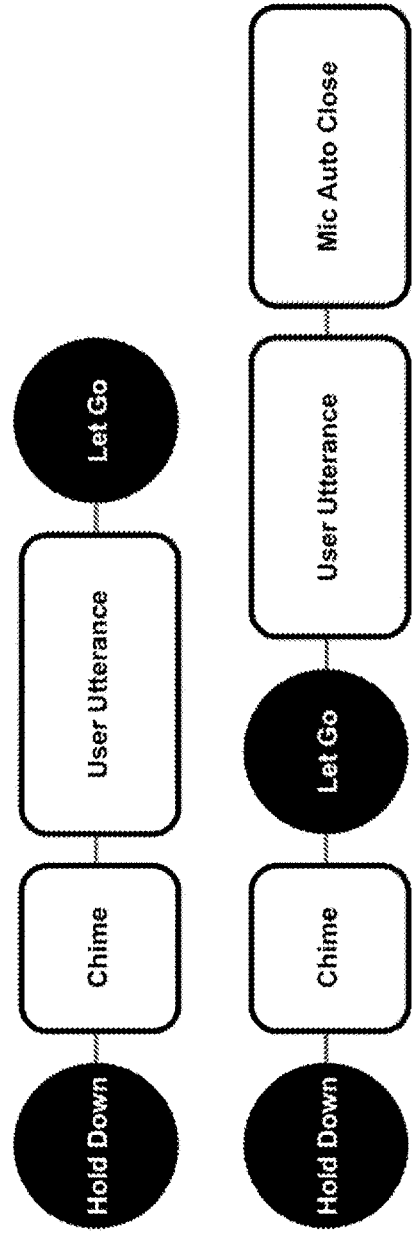
FIG. 16B is a diagram illustrating example gesture models for initiating a voice assistant interaction.

FIG. 16B is a diagram illustrating example gesture models for initiating a voice assistant interaction. In a first model, to initiate a voice assistant interaction, the user holds down on the UI affordance (e.g., maintains a touch to the left ear cup touch-sensitive surface) and a chime is played back. The user then provides the voice utterance and releases the UI affordance (e.g., ends the touch contact), signaling the end of the voice utterance. In a second model, the user holds down on the UI affordance and a chime is played back. The user then releases and provides the utterance. The microphones automatically stop listening after a period of silence.

Figure 16C:
FIG. 16C is a diagram illustrating example gesture models for ending a voice assistant interaction.

FIG. 16C is a diagram illustrating example gesture models for ending a voice assistant interaction. In this example, the user provides a single tap to the UI affordance (e.g., the left ear cup) to end a voice assistant interface (i.e., to close the microphones (if open)). Since needing a UI affordance to end voice interactions is contextual based on whether a voice assistant interaction is available, the same single tap input can also be interpreted as a command to perform other contextual actions, such as ending alarms and/or announcements.

IX. Example Voice Guidance

Figure 17A:
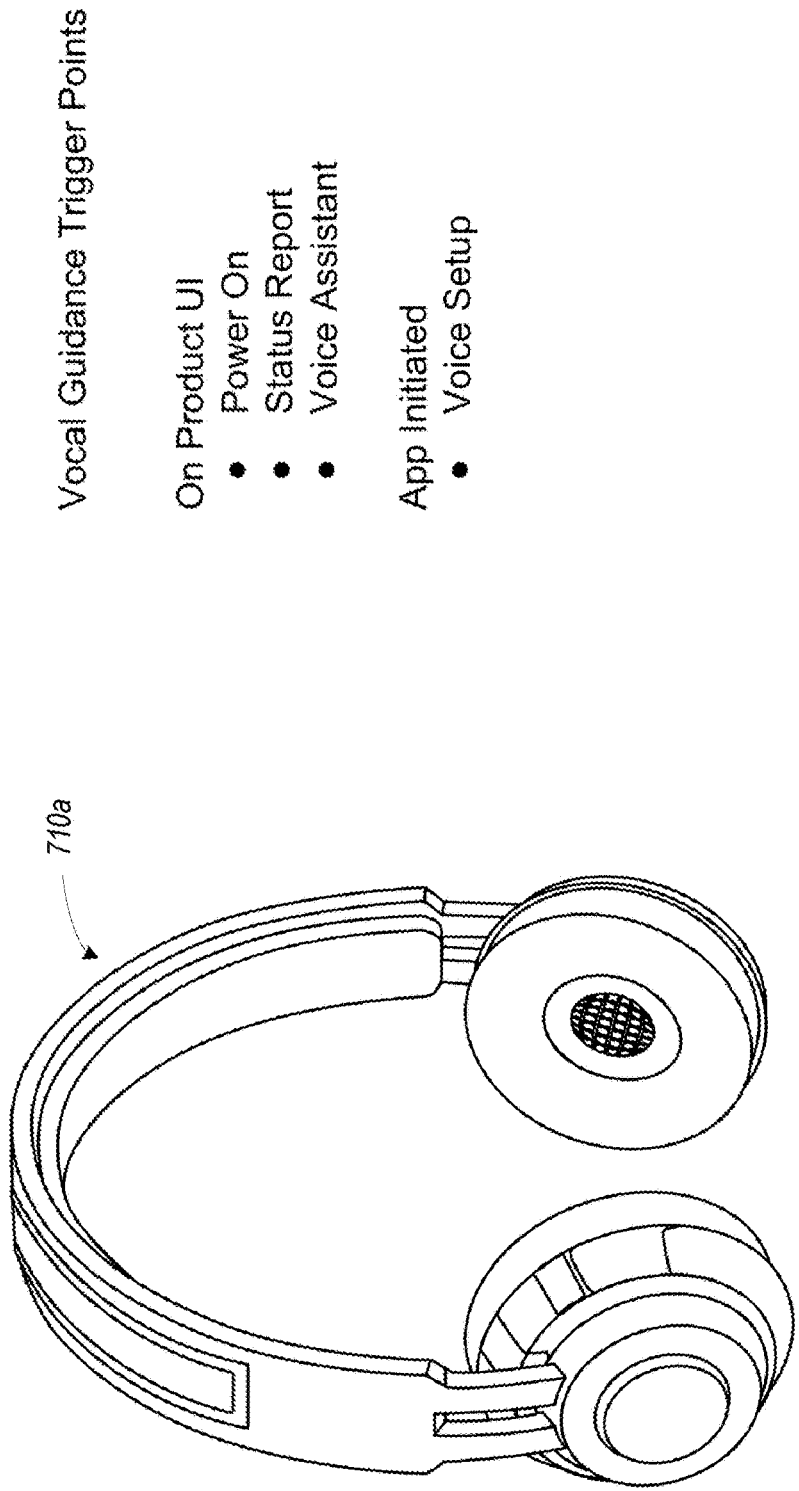
FIG. 17A is a diagram illustrating example voice guidance for headphones.

FIG. 17A is a diagram illustrating example voice guidance for portable playback devices, such as the headphones 710a (FIG. 7A). As described in preceding sections, in example embodiments, example portable playback devices may play back voice guidance recordings when certain conditions occur, such as power-on, during a voice assistant interaction, during set-up of a voice assistant, or to provide a status report. These examples are intended to provide further illustrative examples of how voice guidance may be based on connection (e.g., connection mode). These examples discuss the connection modes by reference to a Wi-Fi® connection (e.g., a first connection mode) or a Bluetooth® connection (e.g., a second connection mode), or both (e.g., a concurrent connection mode).

Figure 17B:
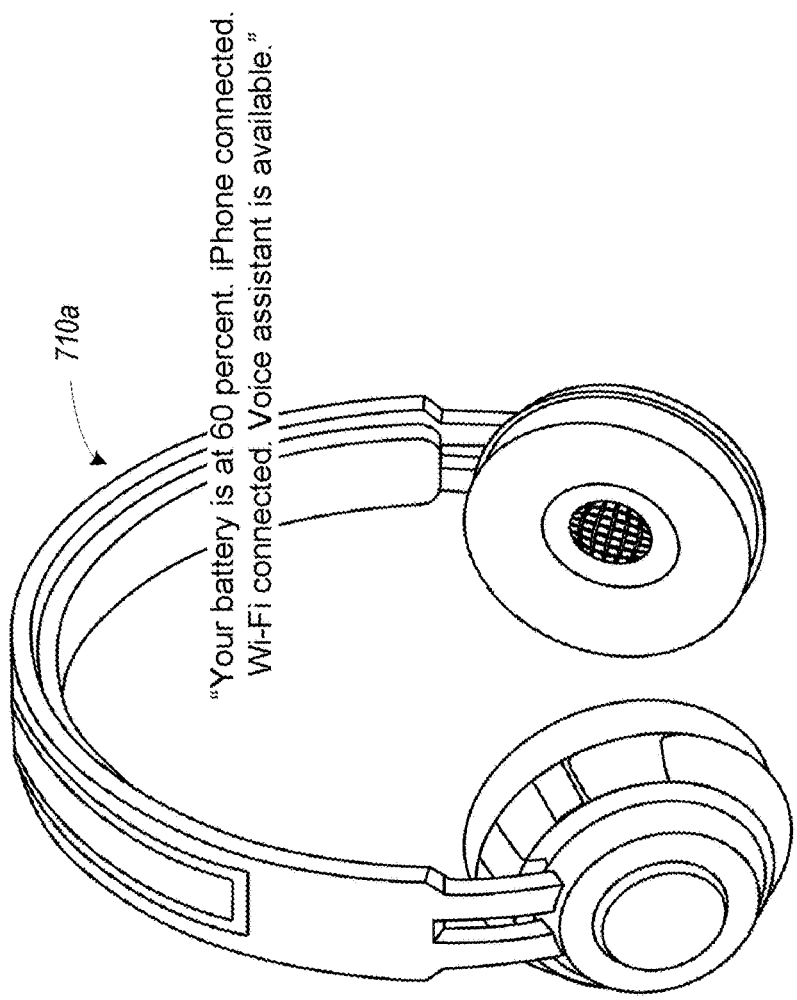
FIG. 17B is a diagram illustrating example voice guidance corresponding to a first condition of a first model.

FIG. 17B is a diagram illustrating example voice guidance corresponding to a first condition of a first model. In particular, after power-on, the headphones 710a may play a status report. As shown in FIG. 17B, the status report may include information such as the battery level of the headphones 710a, the Bluetooth and Wi-Fi connection status', and the voice assistant availability (which, as noted above, may depend upon connection status).

In some examples, the voice guidance recordings are pre-recorded and stored in data storage of the headphones 710a. For instance, with respect to battery level, the headphones 710a may store recordings corresponding to 100%, 90%, 80%, and so on, and then play the recording corresponding most closely to the current battery level. For instance if the battery level is 41%, the status report may include voice guidance such as "Your battery is at 40 percent . . . "

Further, the status report may include multiple recordings. In the FIG. 17B example, the status report includes four different recordings corresponding to battery level, Bluetooth status, Wi-Fi status, and voice assistant availability.

FIG. 17C is a diagram illustrating example voice guidance corresponding to a second condition of the first model. In particular, the headphones 710a may play back voice guidance indicating that a voice assistant is available when the voice assistant becomes available for the first time.

Figure 17D:
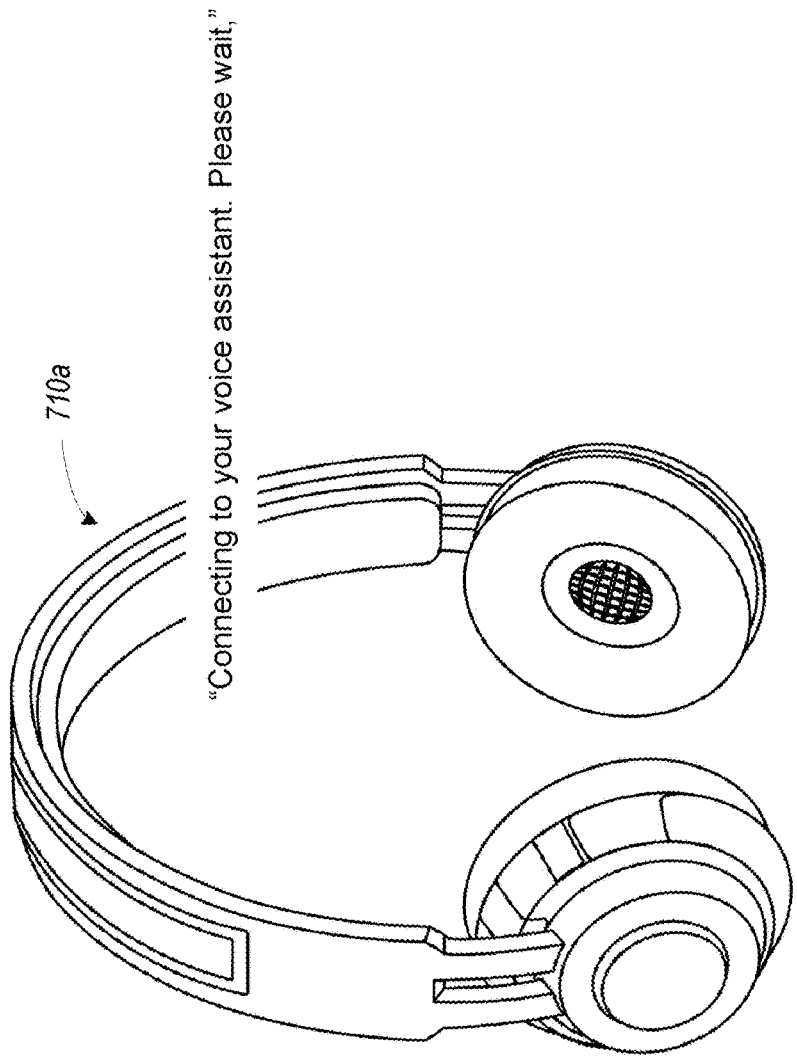
FIG. 17D is a diagram illustrating example voice guidance corresponding to a third condition of the first model.

FIG. 17D is a diagram illustrating example voice guidance corresponding to a third condition of the first model. As shown in FIG. 17D, if the headphones 710a detect that a connection to the active voice assistant service is taking longer than a threshold period of time, the headphones 710a may play back voice guidance indicating that the connection is taking longer than expected.

FIG. 17E is a diagram illustrating example voice guidance corresponding to a fourth condition of the first model. In particular, if a user attempts to initiate a voice assistant interaction without having first configuring the voice assistant on the headphones 710a or a Bluetooth connection to a mobile device with a native voice assistant, the headphones 710a may play back voice guidance indicating how to set-up a voice assistant.

Figure 17F:
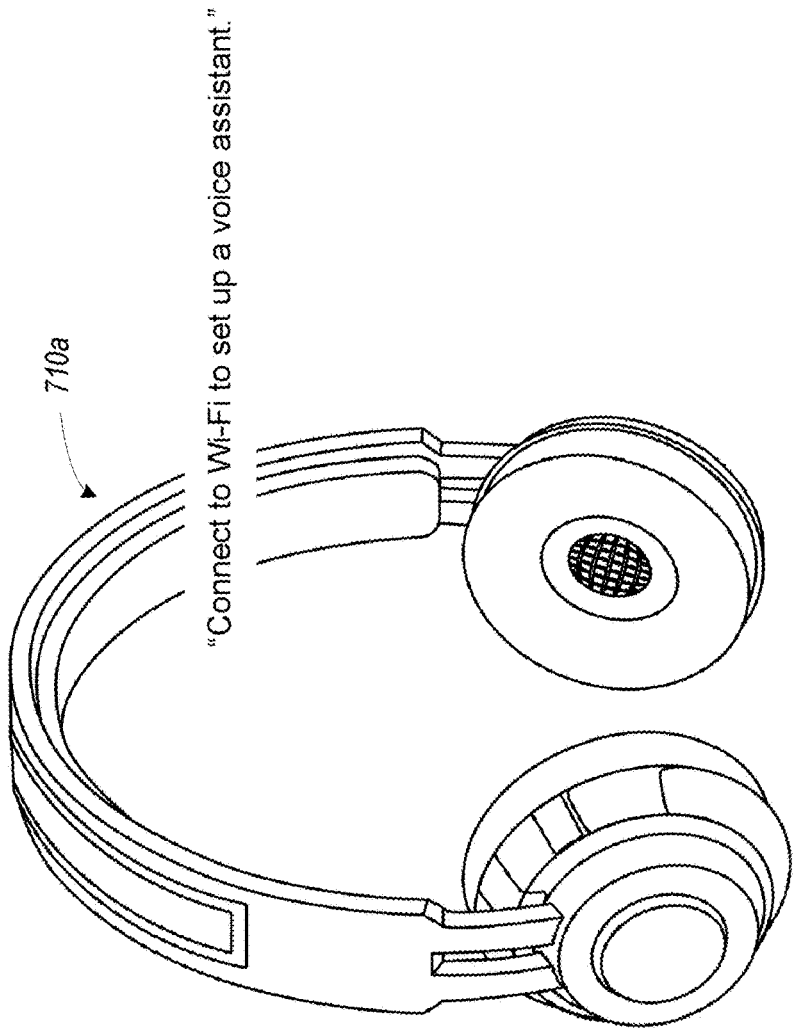
FIG. 17F is a diagram illustrating example voice guidance corresponding to a fifth condition of the first model.

FIG. 17F is a diagram illustrating example voice guidance corresponding to a fifth condition of the first model. As shown in FIG. 17F, if a user attempts to initiate a voice assistant interaction when (i) a native voice assistant is not set-up, (ii) Wi-Fi® is set-up (ii) the headphones 710a are not connected to Wi-Fi®, and (iv) a Bluetooth® connection to a mobile device with a native voice assistant Wi-Fi® is not set-up, the headphones 710a may play back voice guidance indicating that to set-up the native voice assistant, the user should connect the headphones 710a to Wi-Fi®.

Figure 17G:
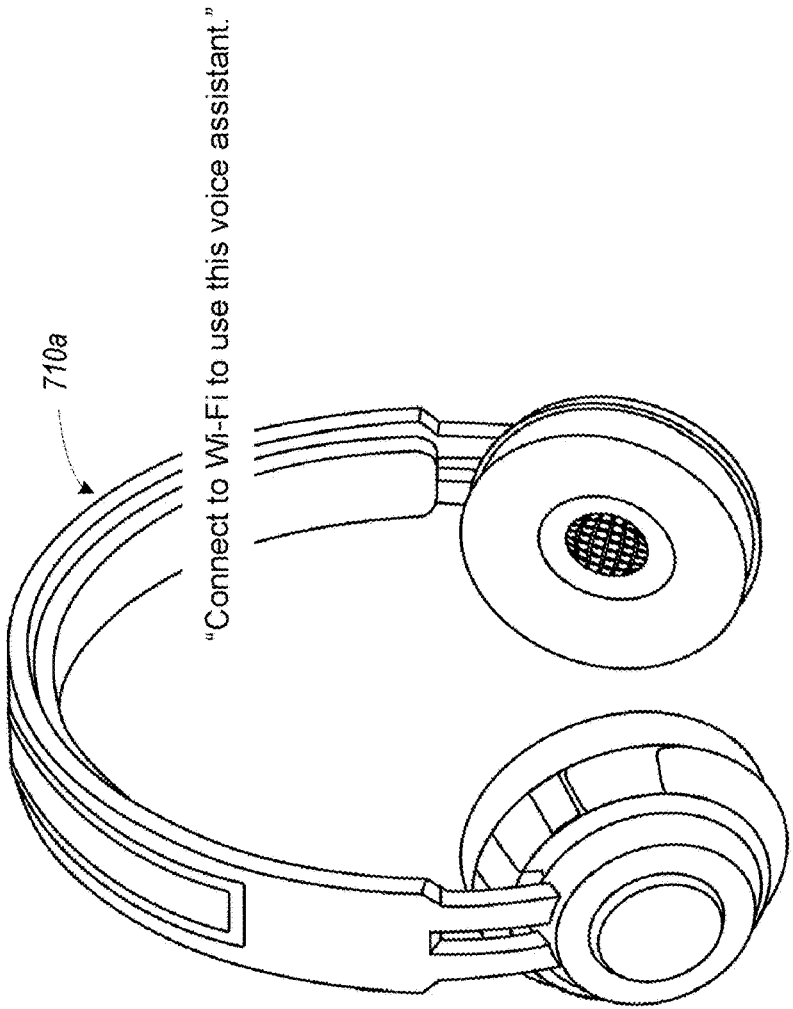
FIG. 17G is a diagram illustrating example voice guidance corresponding to a sixth condition of the first model.

FIG. 17G is a diagram illustrating example voice guidance corresponding to a sixth condition of the first model. As shown in FIG. 17G, if a user attempts to initiate a voice assistant interaction when (i) a native voice assistant is set-up and (ii) the headphones 710a are not connected to Wi-Fi®, the headphones 710a may play back voice guidance to connect to Wi-Fi® to use the native voice assistant of the headphones 710a.

Figure 17H:
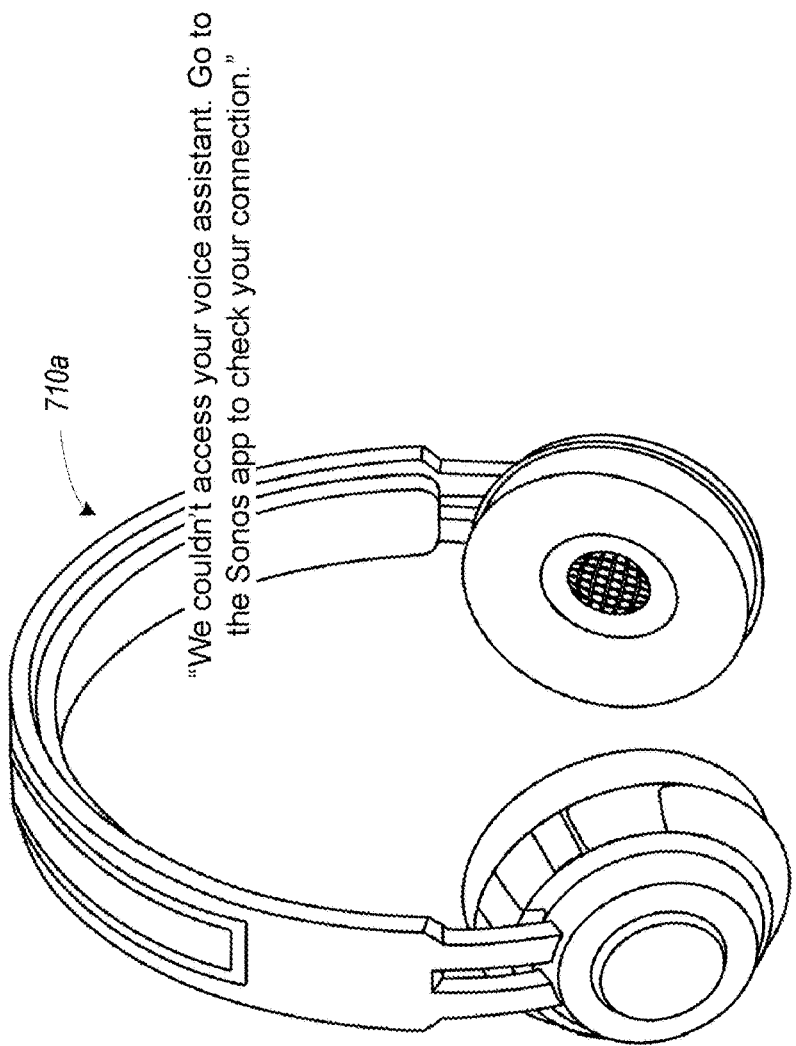
FIG. 17H is a diagram illustrating example voice guidance corresponding to a seventh condition of the first model.

FIG. 17H is a diagram illustrating example voice guidance corresponding to a seventh condition of the first model. In particular, if the headphones 710a detect an error in accessing the native voice assistant of the headphones 710a, the headphones 710a may play back voice guidance indicating that the headphones 710a couldn't access the native voice assistant and that the user should check the control application on their mobile device to verify their Wi-Fi connection.

Figure 18A:
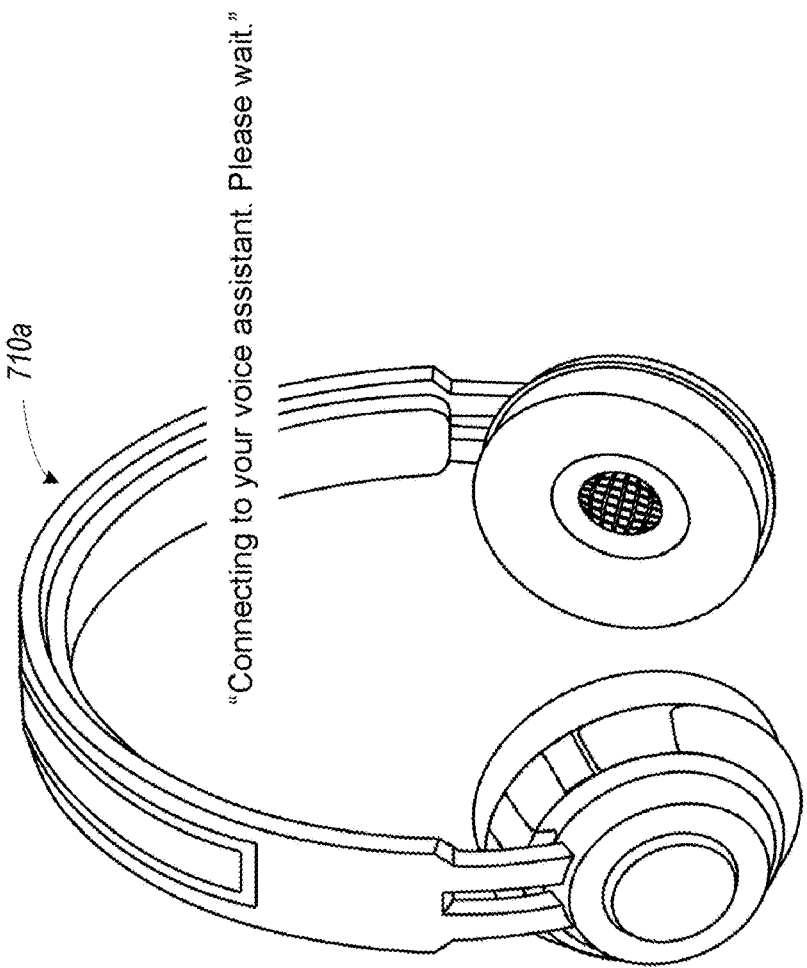
FIG. 18A is a diagram illustrating example voice guidance corresponding to a firth condition of a second model.

FIG. 18A is a diagram illustrating example voice guidance corresponding to a firth condition of a second model. As shown in FIG. 18A, if the headphones 710a receive an input representing a trigger to initiate a voice assistant interaction while (i) the native voice assistant is set-up and (ii) Wi-Fi is connected, but (iii) the voice assistant service is taking longer than a threshold period of time to respond, the headphones 710a may play back voice guidance notifying the user that the headphones 710a are attempting to connect to the voice assistant service.

Figure 18B:
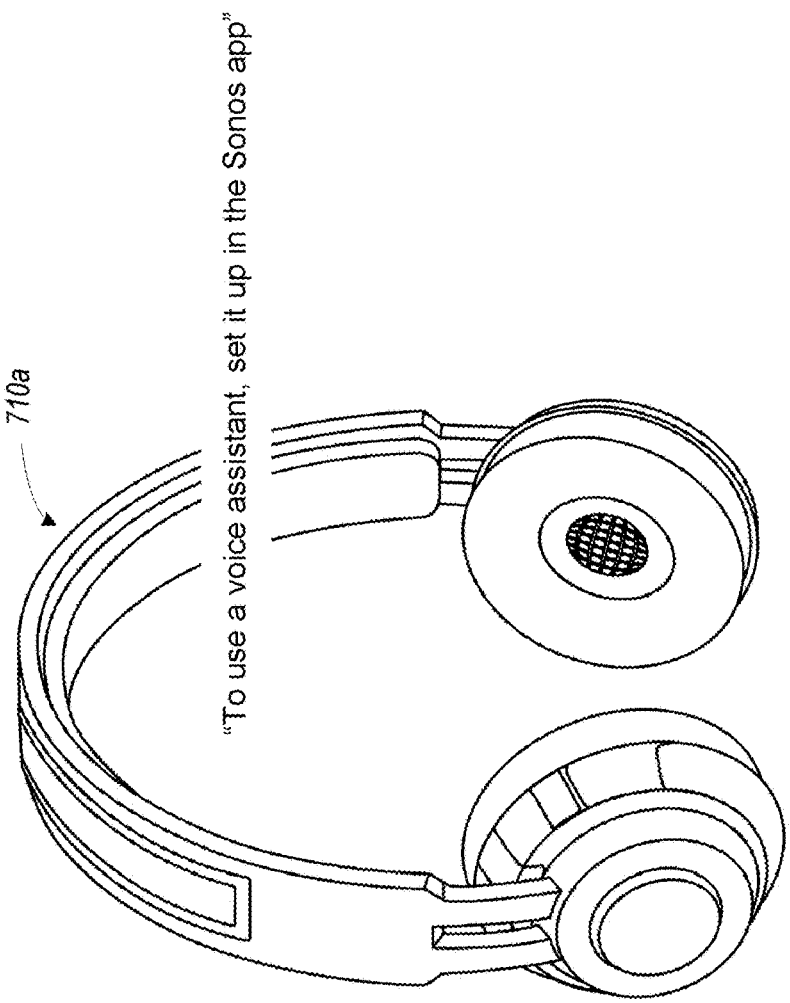
FIG. 18B is a diagram illustrating example voice guidance corresponding to a second condition of the second model.

FIG. 18B is a diagram illustrating example voice guidance corresponding to a second condition of the second model. In particular, if the headphones 710a receive an input representing a trigger to initiate a voice assistant interaction while (i) the native voice assistant is not set-up and (ii) Wi-Fi is connected, the headphones 710a may play back voice guidance notifying the user that they should use the control application on their mobile device to set-up the native voice assistant on the headphones 710a.

Figure 18C:
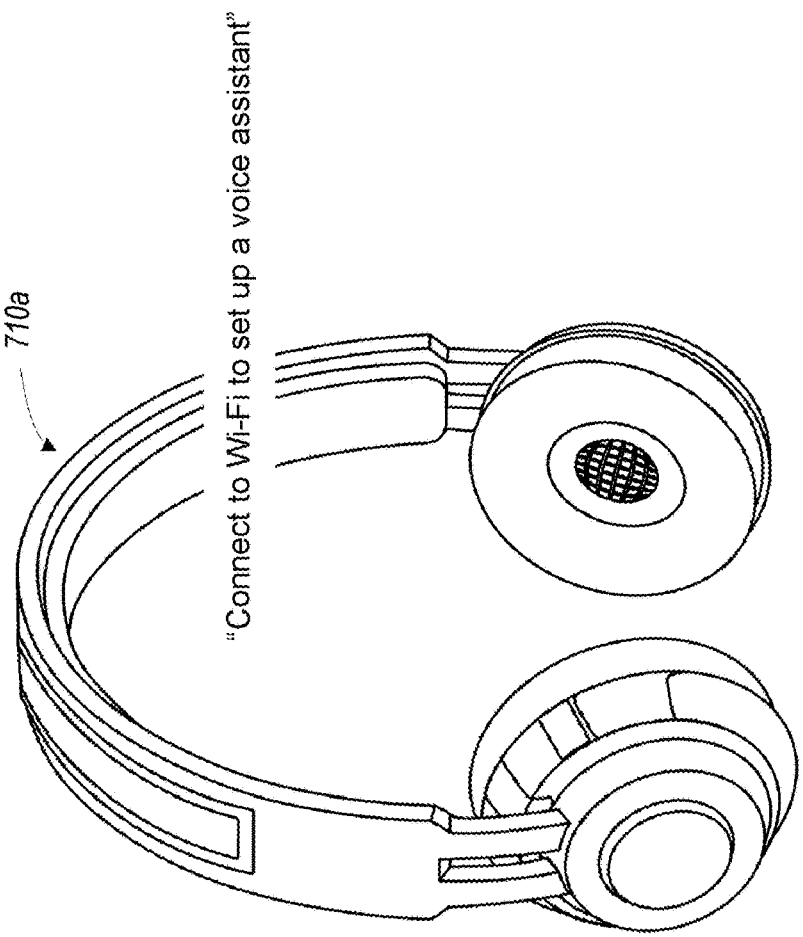
FIG. 18C is a diagram illustrating example voice guidance corresponding to a third condition of the second model.

FIG. 18C is a diagram illustrating example voice guidance corresponding to a third condition of the second model. As shown in FIG. 18C, if headphones 710a receive an input representing a trigger to initiate a voice assistant interaction while (i) the native voice assistant is not set-up and (ii) neither Wi-Fi or Bluetooth is connected, the headphones 710a may play back voice guidance notifying the user that they should connect the headphones 710a to Wi-Fi to set-up the native voice assistant on the headphones 710a.

Figure 18D:
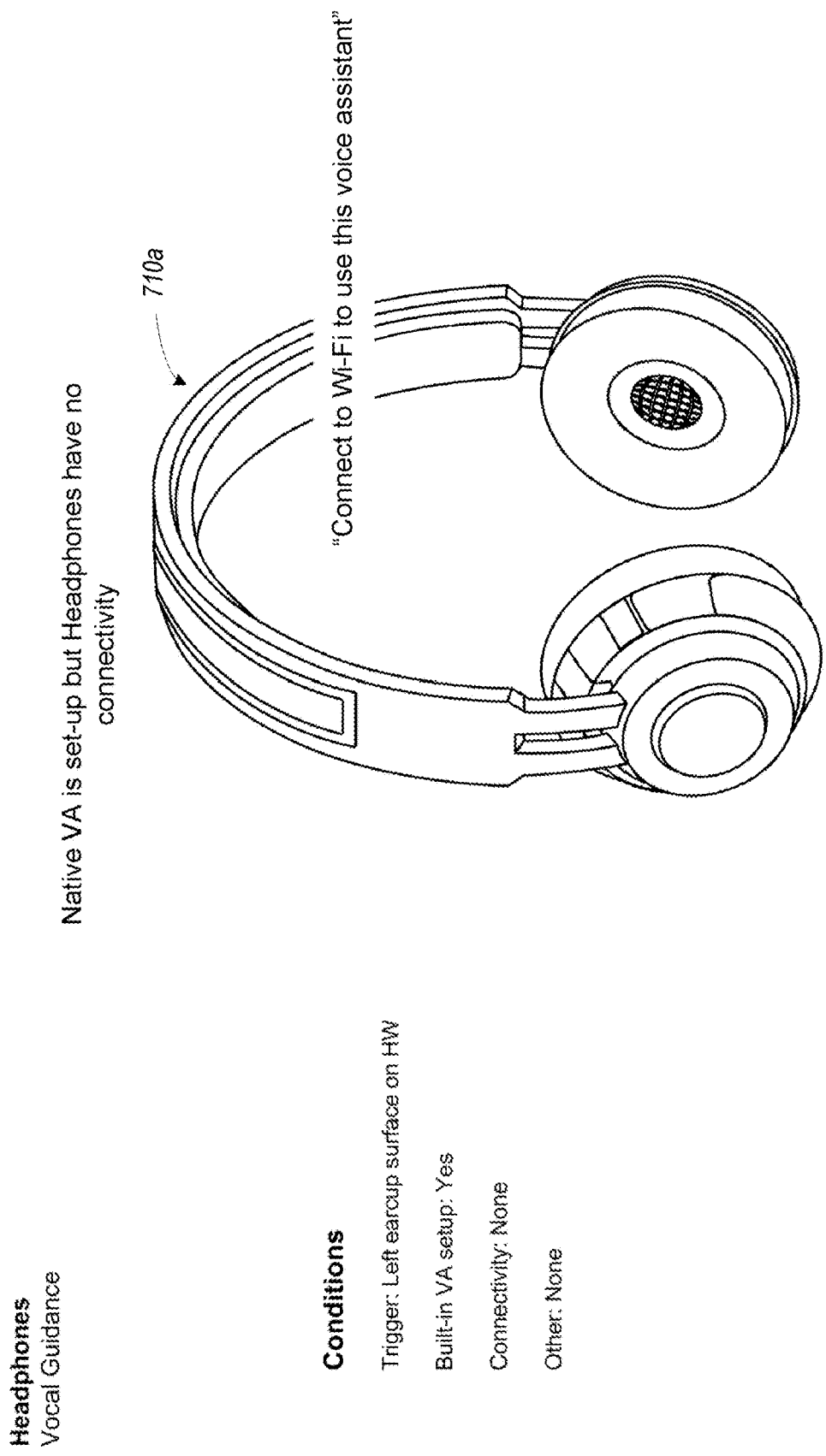
FIG. 18D is a diagram illustrating example voice guidance corresponding to a fourth condition of the second model.

FIG. 18D is a diagram illustrating example voice guidance corresponding to a fourth condition of the second model. As shown in FIG. 18D, if headphones 710a receive an input representing a trigger to initiate a voice assistant interaction while (i) the native voice assistant is set-up and (ii) neither Wi-Fi® or Bluetooth® is connected, the headphones 710a may play back voice guidance notifying the user that they should connect the headphones 710a to Wi-Fi® to use the native voice assistant on the headphones 710a.

Figure 18E:
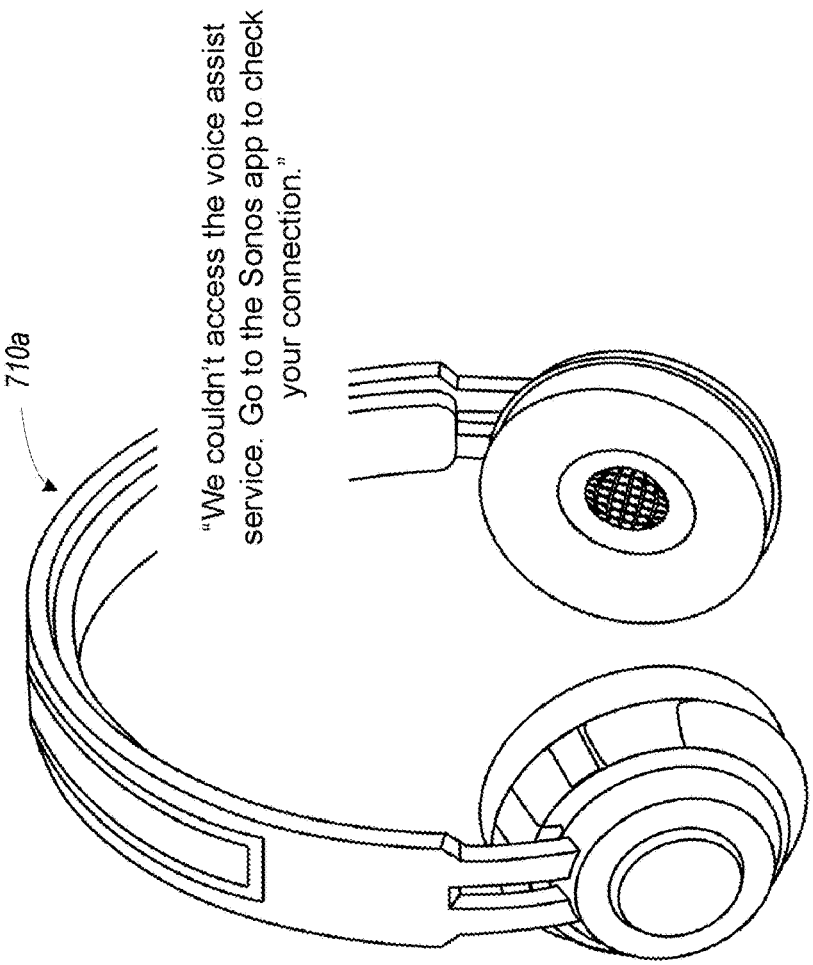
FIG. 18E is a diagram illustrating example voice guidance corresponding to a fifth condition of the second model.

FIG. 18E is a diagram illustrating example voice guidance corresponding to a fifth condition of the second model. As shown in FIG. 18E, if headphones 710a receive an input representing a trigger to initiate a voice assistant interaction while (i) the native voice assistant is set-up and (ii) Wi-Fi® is connected, but (iii) some unknown issue occurred, the headphones 710a may play back voice guidance notifying the user that they should use the control application on their mobile device to check the Wi-Fi® connection of the headphones 710a.

X. Conclusion

The above discussions relating to portable playback devices, playback devices, control devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

EXAMPLE 1

A method to be performed by a system comprising a portable playback device, the method comprising: while in a first connection mode of a set of connection modes, detecting a first input to invoke voice assistance, wherein the set of connection modes comprises: (i) the first connection mode wherein the portable playback device connects to a wireless local area network (WLAN) via a first network interface, (ii) a second connection mode wherein the portable playback device connects to a personal area network (PAN) via a second network interface, and (iii) a concurrent connection mode wherein the portable playback device concurrently connects to the WLAN via the first network interface and the PAN via the second network interface; in response to detecting the first input, invoking a first voice assistant of a set of voice assistants, the first voice assistant corresponding to the first connection mode, wherein the first voice assistant is native to the portable playback device; after invoking the first voice assistant, capturing a first voice input via at least one microphone; processing the first voice input via the first voice assistant; switching to the second connection mode; while in the second connection mode, detecting a second input to invoke voice assistance; in response to detecting the second input, invoking a second voice assistant of the set of voice assistants, the second voice assistant corresponding to the second connection mode, wherein the second voice assistant is native to a mobile device connected to the portable playback device over the PAN; after invoking the second voice assistant, capturing a second voice input via the at least one microphone; and sending, over the PAN via the second network interface to the mobile device, data representing the second voice input for processing of the second voice input.

EXAMPLE 2

The method of Example 1, wherein the first voice assistant comprises cloud-based natural language understanding (NLU), and wherein processing the first voice input via the first voice assistant comprises: sending, via the first network interface, data representing the first voice input to a computing system for processing of the first voice input via the cloud-based NLU.

EXAMPLE 3

The method of Example 2, wherein the first voice assistant further comprises local NLU configured to recognize a set of local keywords, and wherein processing the first voice input further comprises: determining, via the local NLU, that portions of the captured first voice input correspond to keywords that are not in the set of local keywords, wherein the portable playback device sends the data representing the first voice input to the computing system in response to the determining.

EXAMPLE 4

The method of Example 3, further comprising: after invoking the first voice assistant, capturing a third voice input via the at least one microphone; determining, via the local NLU, that portions of the captured third voice input correspond to keywords that in the set of local keywords; and in response to the determining, processing the third voice input via the local NLU.

EXAMPLE 5

The method of Example 4, wherein the local NLU comprises service keywords corresponding to control of playback from a particular streaming media service, and wherein processing the third voice input via the local NLU comprises: determining that portions of the third voice input match one or more service keywords corresponding to one or more particular media playback commands; and playing back audio content from one or more servers of the particular streaming media service according to the one or more particular media playback commands.

EXAMPLE 6

The method of Example 3, wherein the set of local keywords correspond to media playback transport commands, and wherein the cloud-based NLU is configured to determine intent of voice inputs representing other commands.

EXAMPLE 7

The method of Example 3, wherein the second voice assistant comprises (i) the local NLU and (ii) an additional cloud-based NLU, and wherein the method further comprises: determining, via the local NLU, that portions of the captured second voice input correspond to keywords that are not in the set of local keywords, wherein the portable playback device in response to the determining sends the data representing the second voice input to an additional computing system for processing via the additional cloud-based NLU.

EXAMPLE 8

The method of any of Examples 1-7, wherein the portable playback device comprises a touch control interface carried on an exterior surface of the housing, wherein detecting the first input to invoke voice assistance comprises detecting a particular set of one or more touch inputs to the touch control interface, and wherein detecting the second input to invoke voice assistance comprises detecting the same particular set of one or more touch inputs to the touch control interface.

EXAMPLE 9

The method of any of Examples 1-8, wherein detecting the first input to invoke voice assistance comprises receiving data representing a particular input to a control interface on the mobile device, and wherein detecting the second input to invoke voice assistance comprises detecting the same particular input to the control interface on the mobile device.

EXAMPLE 10

The method of any of Examples 1-8, further comprising: switching to the concurrent connection mode; while in the concurrent connection mode, detecting an additional input to invoke voice assistance; in response to detecting the additional input, invoking the first voice assistant of the set of voice assistants, the first voice assistant corresponding to the concurrent connection mode; after invoking the first voice assistant, capturing an additional voice input via the at least one microphone; and processing the additional voice input via the first voice assistant.

EXAMPLE 11

A method to be performed by a system comprising a portable playback device, the method comprising: while in a first connection mode of a set of connection modes, detecting a first trigger event of a set of trigger events, wherein the set of connection modes comprises: (i) the first connection mode wherein the portable playback device connects to a wireless local area network (WLAN) via a first network interface, (ii) a second connection mode wherein the portable playback device connects to a personal area network (PAN) via a second network interface, and (iii) a concurrent connection mode wherein the portable playback device concurrently connects to the WLAN via the first network interface and the PAN via the second network interface; in response to detecting the first trigger event, playing back one or more first vocal guidance messages via at least one audio transducer, the one or more first vocal guidance messages corresponding to (a) the first trigger event, (b) the first connection mode, and (c) a first audio guidance mode of a set of audio guidance modes, wherein the set of audio guidance mode comprises: (i) the first audio guidance mode wherein the portable playback device plays back respective vocal guidance messages corresponding to the trigger events and (ii) a second audio guidance mode wherein the portable playback device plays back earcons corresponding to the trigger events; switching to the second connection mode; while in the second connection mode, detecting a second trigger event of the set of trigger events; and in response to detecting the second trigger event, playing back one or more second voice guidance messages via the at least one audio transducer, the one or more second voice guidance messages corresponding to (a) the second trigger event, (b) the second connection mode, and (c) the first audio guidance mode.

EXAMPLE 12

The method of Example 11, wherein a first voice assistant native to the portable playback device is invokable in the first connection mode, wherein a second voice assistant native to a mobile device connected to the portable playback device via the PAN is invokable in the second connection mode, wherein the first trigger event is a power-on event, and wherein playing back the one or more first vocal guidance messages comprises playing back a vocal guidance message indicating a successful connection to the WLAN and a vocal guidance message indicating availability of the first voice assistant.

EXAMPLE 13

The method of Example 12, wherein the second trigger event is the power-on event, and wherein playing back the one or more second vocal guidance messages comprises playing back a vocal guidance message indicating a unsuccessful connection to the PAN and a vocal guidance message indicating unavailability of the second voice assistant.

EXAMPLE 14

The method of Example 12, further comprising: while in the second connection mode, detecting a third trigger event of the set of trigger events, wherein the third trigger event is a switch from the second connection mode to the concurrent connection mode, wherein the first voice assistant native to the portable playback device is invokable in the first connection mode; and in response to detecting the third trigger event, playing back one or more third voice guidance messages via the at least one audio transducer, the one or more third voice guidance messages corresponding to (a) the third trigger event, (b) the concurrent connection mode, and (c) the first audio guidance mode, wherein playing back one or more third vocal guidance messages comprises playing back a vocal guidance message indicating the availability of the first voice assistant.

EXAMPLE 15

The method of any of Examples 11-14, wherein the first trigger event is an input representing a command to swap playback from the portable playback device to one or more additional playback devices connected to the WLAN, and wherein playing back one or more first vocal guidance messages comprises playing back a vocal guidance message indicating that playback is being swapped and after the playback is swapped, a vocal guidance message indicating that playback was swapped.

EXAMPLE 16

The method of Example 15, further comprising: switching to the second audio guidance mode; while in the first connection mode of the set of connection modes, detecting an additional trigger event of the set of trigger events, wherein the additional trigger event is an input representing a command to swap playback from the one or more additional playback devices to the portable playback device; and wherein the portable playback device has previously established a connection to a mobile device via the PAN, wherein the second trigger event is a connection lost event, and wherein playing back the one or more first vocal guidance messages comprises playing back a voice guidance message indicating the connection to the mobile device was lost.

EXAMPLE 17

The method of any of Examples 11-16, wherein the portable playback device has previously established a connection to a mobile device via the PAN, wherein the second trigger event is a connection lost event, and wherein playing back the one or more first vocal guidance messages comprises playing back a voice guidance message indicating the connection to the mobile device was lost.

EXAMPLE 18

The method of any of Examples 11-17, wherein the first trigger event is an initial power-on event, and playing back the one or more first vocal guidance messages comprises playing back a voice guidance message comprising a welcome message and a message to download a control application to a mobile device, wherein the control application comprises a control interface to control the portable playback device in (a) the first connection mode and (b) the second connection mode.

EXAMPLE 19

The method of any of Examples 11-18, wherein the first audio guidance mode is a default audio guidance mode, and wherein the method further comprises: detecting input representing a command to switch to the second audio guidance mode, wherein the portable playback device switches to the second audio guidance mode in response to detecting the input representing a command to switch to the second audio guidance mode.

EXAMPLE 20

The system of claim 1, wherein the set of audio guidance modes further comprises a third audio guidance mode wherein the portable playback device plays back vocal guidance messages corresponding to a subset of the trigger events, and wherein the method further comprises: while in the second connection mode, switching to the third audio guidance mode; while in the third audio guidance mode, detecting an additional instance of the first trigger event of the set of trigger events; and in response to detecting the second trigger event: (i) playing back an additional earcon via the at least one audio transducer, the additional earcon corresponding to (a) the first trigger event, (b) the second connection mode, and (c) the third audio guidance mode.

EXAMPLE 21

A system configured to perform the methods of any of Examples 1-20.

EXAMPLE 22

A tangible, non-transitory, computer-readable medium having instructions stored thereon that are executable by one or more processors to cause a system to perform the methods of any one of Examples 1-20.

EXAMPLE 23

A device configured to perform the methods of any of Examples 1-20.

The invention claimed is:

1. A portable playback device comprising:
a first network interface comprising at least one first antenna;
a second network interface comprising at least one second antenna;
at least one processor;
at least one tangible, non-transitory computer-readable medium comprising program instructions that are executable by the at least one processor such that the portable playback device is configured to:
detect a particular trigger event; and
when detecting the particular trigger event while in a first connection mode of a set of connection modes, play back one or more first voice guidance indicators corresponding to the particular trigger event and the first connection mode, wherein while in the first connection mode, the portable playback device connects to a wireless local area network (WLAN) via the first network interface;
when detecting the particular trigger event while in a second connection mode of the set of connection modes, play back one or more second voice guidance indicators corresponding to the particular trigger event and the second connection mode, wherein while in the second connection mode, the portable playback device connects to a personal area network (PAN) via the second network interface; and
wherein the portable playback device is configured to automatically switch between the first connection mode and the second connection mode based on which network is available to the portable playback device.

2. The portable playback device of claim 1, wherein:
the one or more first voice guidance indicators correspond to a first feature available while the portable playback device is in the first connection mode; and
the one or more second voice guidance indicators correspond to a second feature available while the portable playback device is in the second connection mode.

3. The portable playback device of claim 2, wherein:
the first feature comprises a first voice assistant native to the portable playback device; and
the second feature comprises a second voice assistance native to a mobile device connected to the portable playback device over the PAN via the second network interface.

4. The portable playback device of claim 1, wherein:
the particular trigger event comprises an input via an on-device control interface.

5. The portable playback device of claim 1, wherein:
the particular trigger event corresponds to an event to indicate a status of the portable playback device;
the one or more first voice guidance indicators comprise an indication of availability of at least one first feature available while the portable playback device is in the first connection mode; and
the one or more second voice guidance indicators comprise an indication of availability of at least one second feature available while the portable playback device is in the second connection mode.

6. The portable playback device of claim 1, wherein:
the particular trigger event corresponds to an event to initiate a particular feature of the portable playback device, and wherein the particular feature is only available while the portable playback device is in the first connection mode;
the one or more first voice guidance indicators comprise information corresponding to the particular feature; and
the one or more second voice guidance indicators comprise an indication of an unavailability of the particular feature.

7. The portable playback device of claim 1, wherein:
the one or more first voice guidance indicators and the one or more second voice guidance indicators are part of a set of voice guidance indicators; and
the set of voice guidance indicators comprises speech guidance indicators and earcons guidance indicators.

8. The portable playback device of claim 7, wherein the at least one tangible, non-transitory computer-readable medium further comprises program instructions such that the portable playback device is configured to:
output speech guidance indicators in response to a first type of trigger events and output earcons guidance indicators in response to a second type of trigger events.

9. The portable playback device of claim 1, wherein the particular trigger event is generated in response to at least one of:
- a state of the portable playback device; or
- a user input.

10. A tangible, non-transitory computer-readable medium having stored thereon instructions executable by one or more processors to cause a portable playback device to perform functions comprising:
- detecting a particular trigger event; and
- when detecting the particular trigger event while in a first connection mode of a set of connection modes, playing back one or more first voice guidance indicators corresponding to the particular trigger event and the first connection mode, wherein while in the first connection mode, the portable playback device connects to a wireless local area network (WLAN) via a first network interface comprising at least one first antenna;
- when detecting the particular trigger event while in a second connection mode of the set of connection modes, playing back one or more second voice guidance indicators corresponding to the particular trigger event and the second connection mode, wherein while in the second connection mode, the portable playback device connects to a personal area network (PAN) via a second network interface comprising at least one second antenna; and
- wherein the portable playback device is configured to automatically switch between the first connection mode and the second connection mode based on which network is available to the portable playback device.

11. The tangible, non-transitory computer-readable medium of claim 10, wherein:
- the one or more first voice guidance indicators correspond to a first feature available while the portable playback device is in the first connection mode; and
- the one or more second voice guidance indicators correspond to a second feature available while the portable playback device is in the second connection mode.

12. The tangible, non-transitory computer-readable medium of claim 11, wherein:
- the first feature comprises a first voice assistant native to the portable playback device; and
- the second feature comprises a second voice assistance native to a mobile device connected to the portable playback device over the PAN via the second network interface.

13. The tangible, non-transitory computer-readable medium of claim 10, wherein:
- the particular trigger event comprises an input via an on-device control interface.

14. The tangible, non-transitory computer-readable medium of claim 10, wherein:
- the particular trigger event corresponds to an event to indicate a status of the portable playback device;
- the one or more first voice guidance indicators comprise an indication of availability of at least one first feature available while the portable playback device is in the first connection mode; and
- the one or more second voice guidance indicators comprise an indication of availability of at least one second feature available while the portable playback device is in the second connection mode.

15. The tangible, non-transitory computer-readable medium of claim 10, wherein:
- the particular trigger event corresponds to an event to initiate a particular feature of the portable playback device, and wherein the particular feature is only available while the portable playback device is in the first connection mode;
- the one or more first voice guidance indicators comprise information corresponding to the particular feature; and
- the one or more second voice guidance indicators comprise an indication of an unavailability of the particular feature.

16. The tangible, non-transitory computer-readable medium of claim 10, wherein:
- the one or more first voice guidance indicators and the one or more second voice guidance indicators are part of a set of voice guidance indicators; and
- the set of voice guidance indicators comprises speech guidance indicators and earcons guidance indicators.

17. The tangible, non-transitory computer-readable medium of claim 16, further having stored thereon instructions to cause the portable playback device to perform functions comprising:
- outputting speech guidance indicators in response to a first type of trigger events and outputting earcons guidance indicators in response to a second type of trigger events.

18. The tangible, non-transitory computer-readable medium of claim 10, wherein the particular trigger event is generated in response to at least one of:
- a state of the portable playback device; or
- a user input.

19. A method to be performed by a portable playback device, the method comprising:
- detecting a particular trigger event; and
- when detecting the particular trigger event while in a first connection mode of a set of connection modes, playing back one or more first voice guidance indicators corresponding to the particular trigger event and the first connection mode, wherein while in the first connection mode, the portable playback device connects to a wireless local area network (WLAN) via a first network interface comprising at least one first antenna;
- when detecting the particular trigger event while in a second connection mode of the set of connection modes, playing back one or more second voice guidance indicators corresponding to the particular trigger event and the second connection mode, wherein while in the second connection mode, the portable playback device connects to a personal area network (PAN) via a second network interface comprising at least one second antenna; and
- wherein the portable playback device is configured to automatically switch between the first connection mode and the second connection mode based on which network is available to the portable playback device.

20. The method of claim 19, wherein:
- the one or more first voice guidance indicators correspond to a first feature available while the portable playback device is in the first connection mode; and
- the one or more second voice guidance indicators correspond to a second feature available while the portable playback device is in the second connection mode.

* * * * *